(12) United States Patent
Mino et al.

(10) Patent No.: US 11,657,303 B2
(45) Date of Patent: May 23, 2023

(54) DATA GENERATING APPARATUS, DATA GENERATING METHOD, DATA GENERATING PROGRAM AND SENSING APPARATUS

(71) Applicant: OMRON Corporation, Kyoto (JP)

(72) Inventors: Hiroyuki Mino, Osaka (JP); Ryusuke Sakai, Kyoto (JP); Naotsugu Ueda, Funabashi (JP)

(73) Assignee: OMRON CORPORATION, Kyoto (JP)

( * ) Notice: Subject to any disclaimer, the term of this patent is extended or adjusted under 35 U.S.C. 154(b) by 311 days.

(21) Appl. No.: 16/768,712

(22) PCT Filed: Nov. 28, 2018

(86) PCT No.: PCT/JP2018/043762
§ 371 (c)(1),
(2) Date: Jun. 1, 2020

(87) PCT Pub. No.: WO2019/107404
PCT Pub. Date: Jun. 6, 2019

(65) Prior Publication Data
US 2021/0174225 A1  Jun. 10, 2021

(30) Foreign Application Priority Data
Dec. 1, 2017  (JP) .............................. JP2017-232034

(51) Int. Cl.
*G06N 5/04* (2023.01)
*G06N 20/00* (2019.01)
(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS

| 2010/0050025 A1 | 2/2010 | Grichnik et al. |
| 2014/0013339 A1 | 1/2014 | Lee et al. |

(Continued)

FOREIGN PATENT DOCUMENTS

| JP | 2008-059160 A | 3/2008 |
| JP | 2011-180946 A | 9/2011 |

(Continued)

OTHER PUBLICATIONS

International Preliminary Report on Patentability of the international application PCT/JP2018/043762 dated Jun. 11, 2020.

(Continued)

*Primary Examiner* — James A Edwards
(74) *Attorney, Agent, or Firm* — Metrolex IP Law Group, PLLC

(57) ABSTRACT

A data generating apparatus includes a selector configured to select, from a plurality of criteria determined for situation items which are determination targets, one criterion corresponding to first virtual sensing data representative of a first determination result with respect to a situation in a surrounding of the physical sensor; and a determination unit configured to determine the situation in the surrounding of the physical sensor with respect to each of the situation items, based on physical sensing data, by using the selected criterion, and to generate second virtual sensing data representative of a second determination result with respect to the situation.

20 Claims, 39 Drawing Sheets

(56) References Cited

U.S. PATENT DOCUMENTS

| | | | |
|---|---|---|---|
| 2014/0149060 A1 | 5/2014 | Meduna et al. | |
| 2014/0214726 A1* | 7/2014 | Minato | H04W 4/50 709/217 |
| 2016/0217674 A1* | 7/2016 | Stewart | F24F 11/30 |
| 2016/0360980 A1* | 12/2016 | Sinha | A61B 5/7264 |

FOREIGN PATENT DOCUMENTS

| | | |
|---|---|---|
| JP | 2013-162258 A | 8/2013 |
| JP | 2013-172247 A | 9/2013 |
| JP | 2014-045242 A | 3/2014 |
| WO | 2013/024673 A1 | 2/2013 |

OTHER PUBLICATIONS

Kawakami, Tomoya et al., "Distributed Sensor Information Management System Based on Semantic Analysis of Sensor Data" Transactions of Information Processing Society of Japan, Feb. 15, 2013, pp. 730-739, vol. 54, No. 2, Relevance is indicated in the (translated) ISR/WO issued on Feb. 26, 2019.

International Search Report ("ISR") of the international application PCT/JP2018/043762 dated Feb. 26, 2019.

Written Opinion ("WO") of the international application PCT/JP2018/043762 dated Feb. 26, 2019.

* cited by examiner

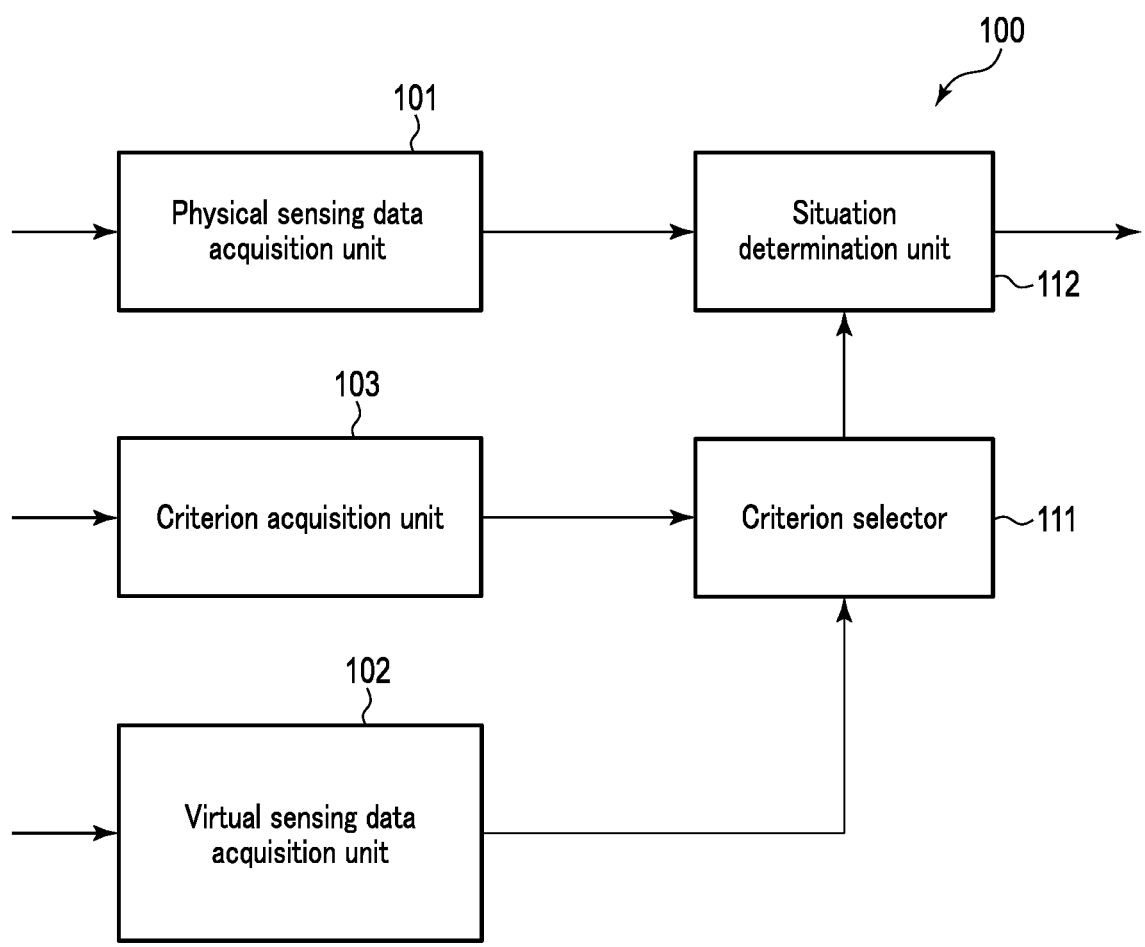
F I G. 1

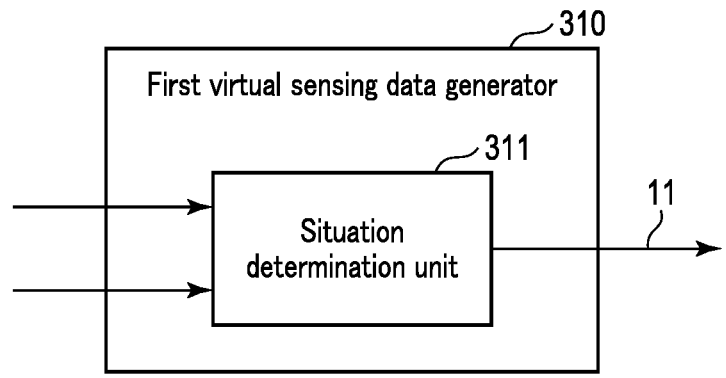

FIG. 5

Situation relating to person

| Physical sensing data | Virtual sensing data |
|---|---|
| Illuminance·sound ·acceleration·gas | Presence of person |
| Temperature·sound ·acceleration·gas | Plural persons |
| Sound·acceleration | Action of person |
| Atmospheric pressure ·acceleration | Door opening/closing |

FIG. 6

Situation relating to nature

| Physical sensing data | Virtual sensing data |
|---|---|
| Time | Morning/noon/night |
| Temperature·illuminance | Insolation |
| Humidity | Occurrence of dew condensation |

FIG. 7

Operational situation of peripheral device

| Physical sensing data | Virtual sensing data |
|---|---|
| Temperature・humidity | Air-conditioning |
| Humidity・sound | Humidifier |
| Illuminance | Illumination |
| Atmospheric pressure・sound | Ventilating fan |
| Sound・temperature・humidity・gas | Stove |
| Temperature・humidity | Microwave oven |
| Sound・temperature・humidity | Thermos |
| Temperature・sound | Refrigerator |
| Temperature・sound | TV |
| Sound | Cleaner |
| Sound | Washing machine |
| Sound | Massaging tool |

FIG. 8

Life situation of person

| Physical sensing data | Virtual sensing data |
|---|---|
| Sound・illuminance | Sleep |
| Sound・gas | Meal |
| Sound | Change of clothes |
| Temperature・atmospheric pressure・sound・illuminance・gas | Cooking |
| Temperature・humidity | Bath |
| Sound | Toilet |

FIG. 9

Situation relating to installation space of physical sensor

| Physical sensing data | Virtual sensing data |
|---|---|
| Acceleration | Direction of installation |
| Illuminance | Near wall |

F I G. 10

|  | Raw value | Maximum | Minimum | Variance | Variation |
|---|---|---|---|---|---|
| Temperature | 25 | 35 | 22 | 5 | 1 |
| Humidity | 55 | 75 | 53 | 10 | −4 |
| Illuminance | 280 | 300 | 260 | 5 | −2 |
| Atmospheric pressure | 1000 | 1060 | 980 | 10 | 3 |
| Sound pressure | 40 | 60 | 35 | 3 | 2 |
| Gas | 3 | 5 | 2 | 0.5 | −0.1 |
| Vibration | 321 | 400 | 200 | 10 | −3 |
| Magnetic field | 210 | 220 | 200 | 2 | 2 |

F I G. 11

|  | Raw value | Maximum | Minimum | Variance | Variation |
|---|---|---|---|---|---|
| Temperature | − | 40 | − | 5 | 12 |
| Humidity | − | 80 | − | 10 | −4 |
| Illuminance | 10 | 300 | 260 | 5 | −2 |
| Atmospheric pressure | − | − | − | 10 | 0.3 |
| Sound pressure | 35 | 55 | 35 | 3 | 2 |
| Gas | 1 | 5 | 2 | 0.5 | −0.1 |
| Vibration | − | − | − | − | − |
| Magnetic field | − | − | − | − | − |

F I G. 12

|  | Raw value | Maximum | Minimum | Variance | Variation |
|---|---|---|---|---|---|
| Temperature | − | × | − | × | × |
| Humidity | − | × | − | × | ○ |
| Illuminance | ○ | × | × | × | × |
| Atmospheric pressure | − | − | − | × | ○ |
| Sound pressure | ○ | ○ | × | ○ | × |
| Gas | ○ | × | × | × | × |
| Vibration | − | − | − | − | − |
| Magnetic field | − | − | − | − | − |

F I G. 13

|  | Raw value | Ratio | Variation | Variation number |
|---|---|---|---|---|
| Illuminance | 0lx | 0% | 1lx | 0 times |
| Sound pressure | 35dB | 0% | 2dB | 0 times |
| Gas | 0ppm | 0% | 0ppm | 0 times |

F I G. 15

|  | Raw value | Ratio | Variation | Variation number |
|---|---|---|---|---|
| Illuminance | 200lx | – | – | – |
| Sound pressure | – | 50% | – | 5 times |
| Gas | 50ppm | – | – | – |

F I G. 16

|  | Raw value | Ratio | Variation | Variation number |
|---|---|---|---|---|
| Illuminance | × | – | – | – |
| Sound pressure | – | × | – | × |
| Gas | × | – | – | – |

F I G. 17

|  | Raw value | Ratio | Variation | Variation number |
|---|---|---|---|---|
| Illuminance | 350lx | 80% | 5lx | 0 times |
| Sound pressure | 80dB | 75% | 30dB | 12 times |
| Gas | 150ppm | 40% | 5ppm | 0 times |

F I G. 18

|  | Raw value | Ratio | Variation | Variation number |
|---|---|---|---|---|
| Illuminance | 200lx | - | - | - |
| Sound pressure | - | 70% | - | 10 times |
| Gas | 50ppm | - | - | - |

F I G. 19

|  | Raw value | Ratio | Variation | Variation number |
|---|---|---|---|---|
| Illuminance | O | - | - | - |
| Sound pressure | - | O | - | O |
| Gas | O | - | - | - |

F I G. 20

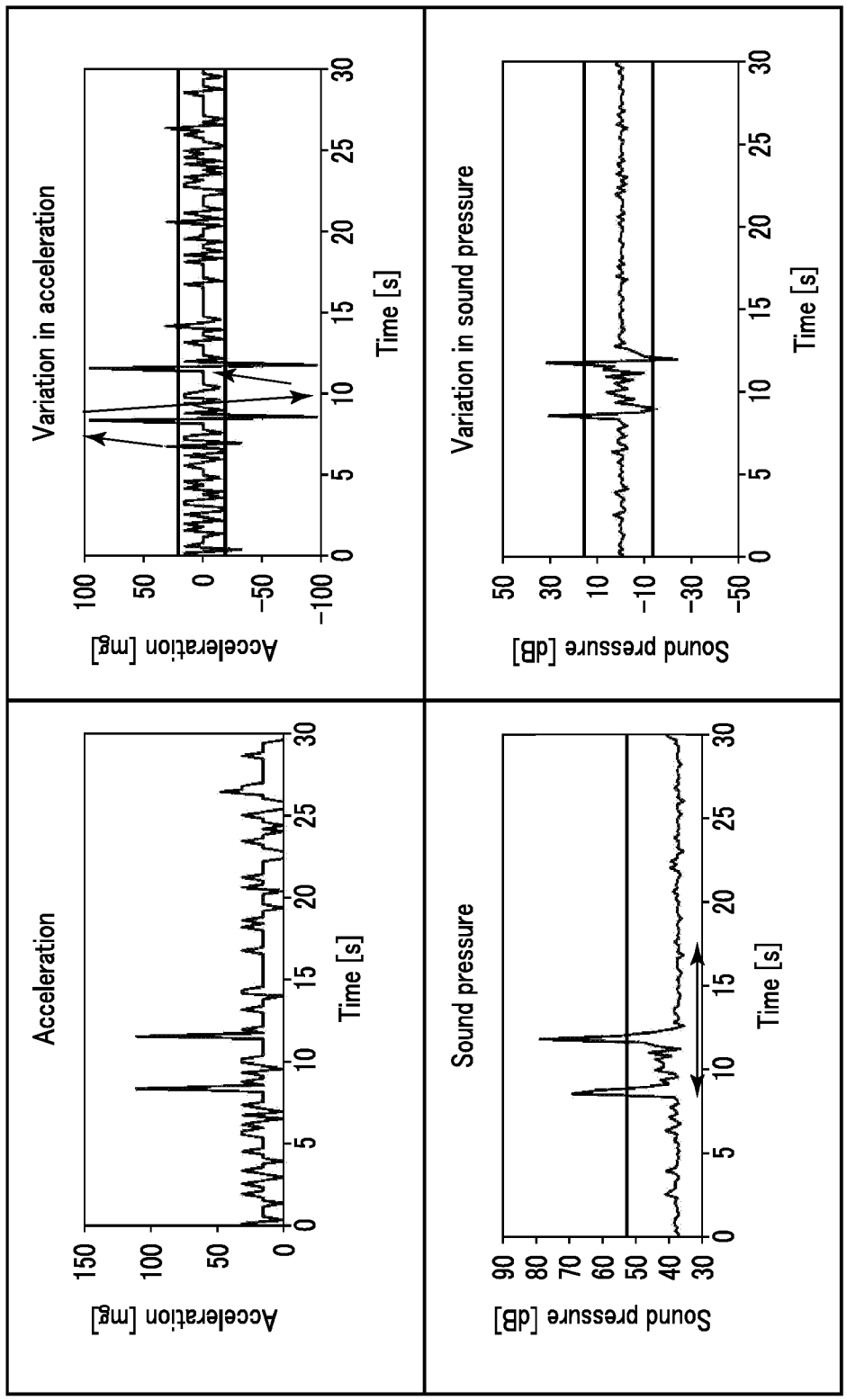
F I G. 21

|  | Raw value | Raw value number | Variation | Variation number |
|---|---|---|---|---|
| Acceleration | 80mg | 2 times | 5mg | 4 times |
| Sound pressure | 70dB | 2 times | 30dB | 4 times |

F I G. 22

|  | Raw value | Raw value number | Variation | Variation number |
|---|---|---|---|---|
| Acceleration | − | 2 times | − | 4 times |
| Sound pressure | 50dB | 2 times | − | 4 times |

F I G. 23

|  | Raw value | Raw value number | Variation | Variation number |
|---|---|---|---|---|
| Acceleration | − | ○ | − | ○ |
| Sound pressure | ○ | ○ | − | ○ |

F I G. 24

|  | Raw value | Variation | Variation number |
|---|---|---|---|
| Illuminance | 350lx | 100lx | 0 times |
| Sound pressure | 30dB | 28dB | 1 time |

FIG. 26

|  | Raw value | Variation | Variation number |
|---|---|---|---|
| Illuminance | 200lx | 50lx | - |
| Sound pressure | - | - | 1 time |

FIG. 27

|  | Raw value | Variation | Variation number |
|---|---|---|---|
| Illuminance | ○ | ○ | - |
| Sound pressure | - | - | ○ |

FIG. 28

|  | Raw value | Variation |
|---|---|---|
| Atmospheric pressure | 1000.17hPa | 0.04hPa |
| Sound pressure | 52dB | 18dB |

F I G. 30

|  | Raw value | Variation |
|---|---|---|
| Atmospheric pressure | – | 0.02hPa |
| Sound pressure | – | 10dB |

F I G. 31

|  | Raw value | Variation |
|---|---|---|
| Atmospheric pressure | – | O |
| Sound pressure | – | O |

F I G. 32

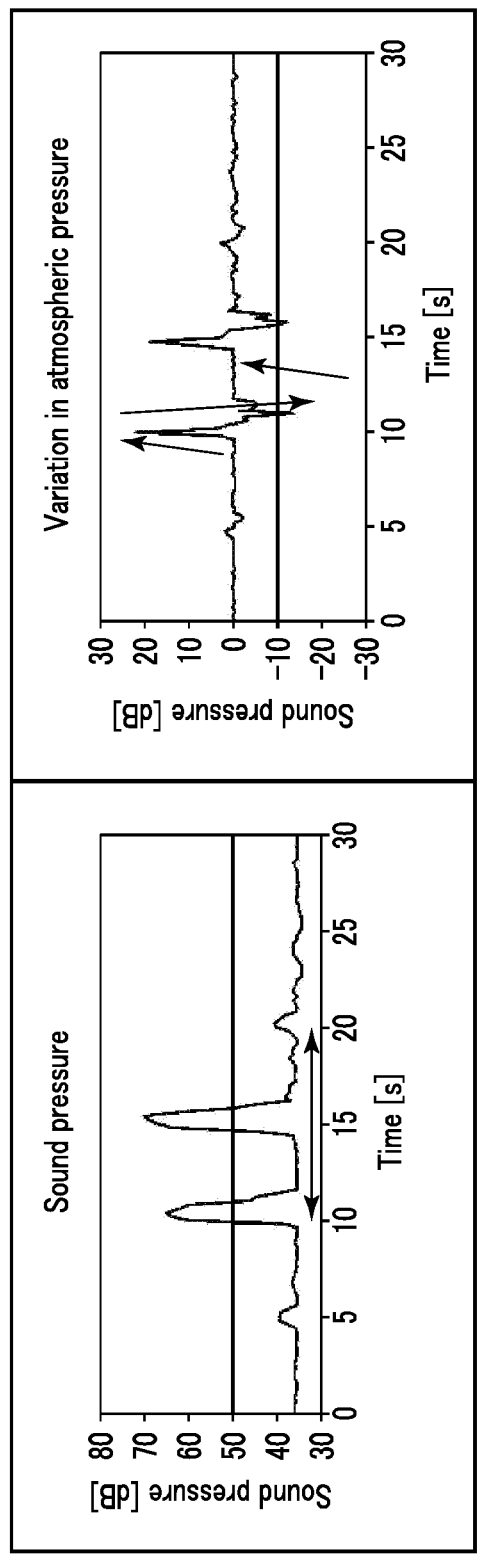
F I G. 33

| | Raw value | Raw value number | Variation | Variation number |
|---|---|---|---|---|
| Sound pressure | 70dB | 2 times | 30dB | 2 times |

FIG. 34

| | Raw value | Raw value number | Variation | Variation number |
|---|---|---|---|---|
| | – | 2 times | – | 2 times |

FIG. 35

| | Raw value | Raw value number | Variation | Variation number |
|---|---|---|---|---|
| Sound pressure | – | ○ | – | ○ |

FIG. 36

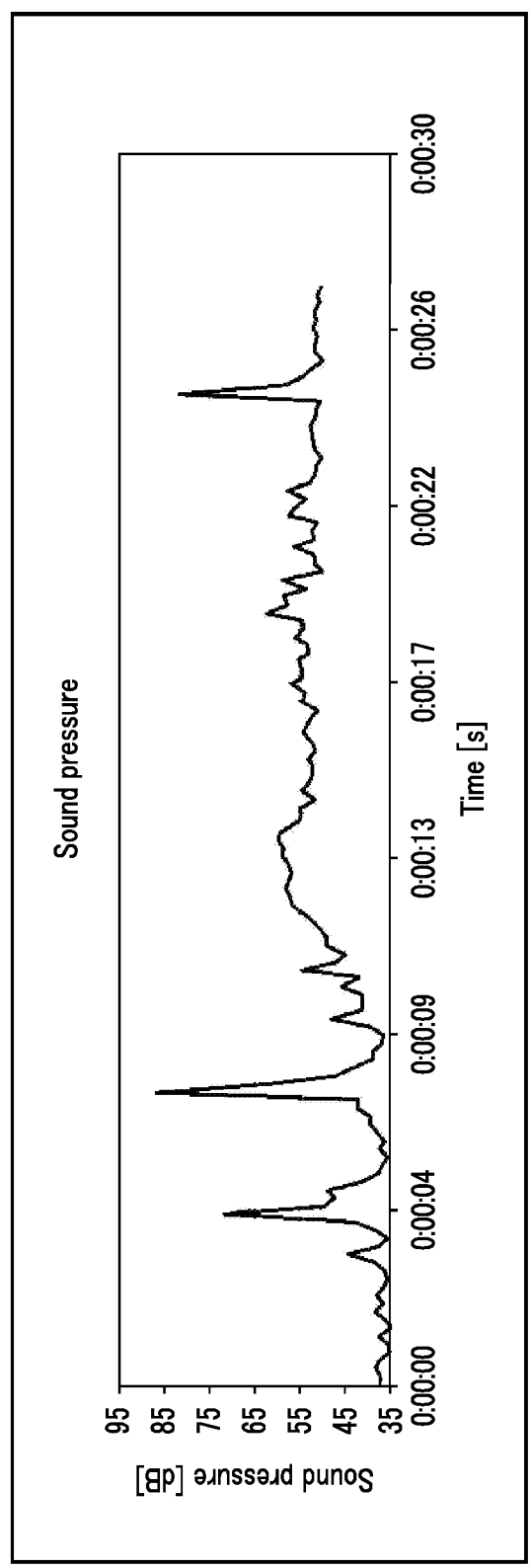
F I G. 37

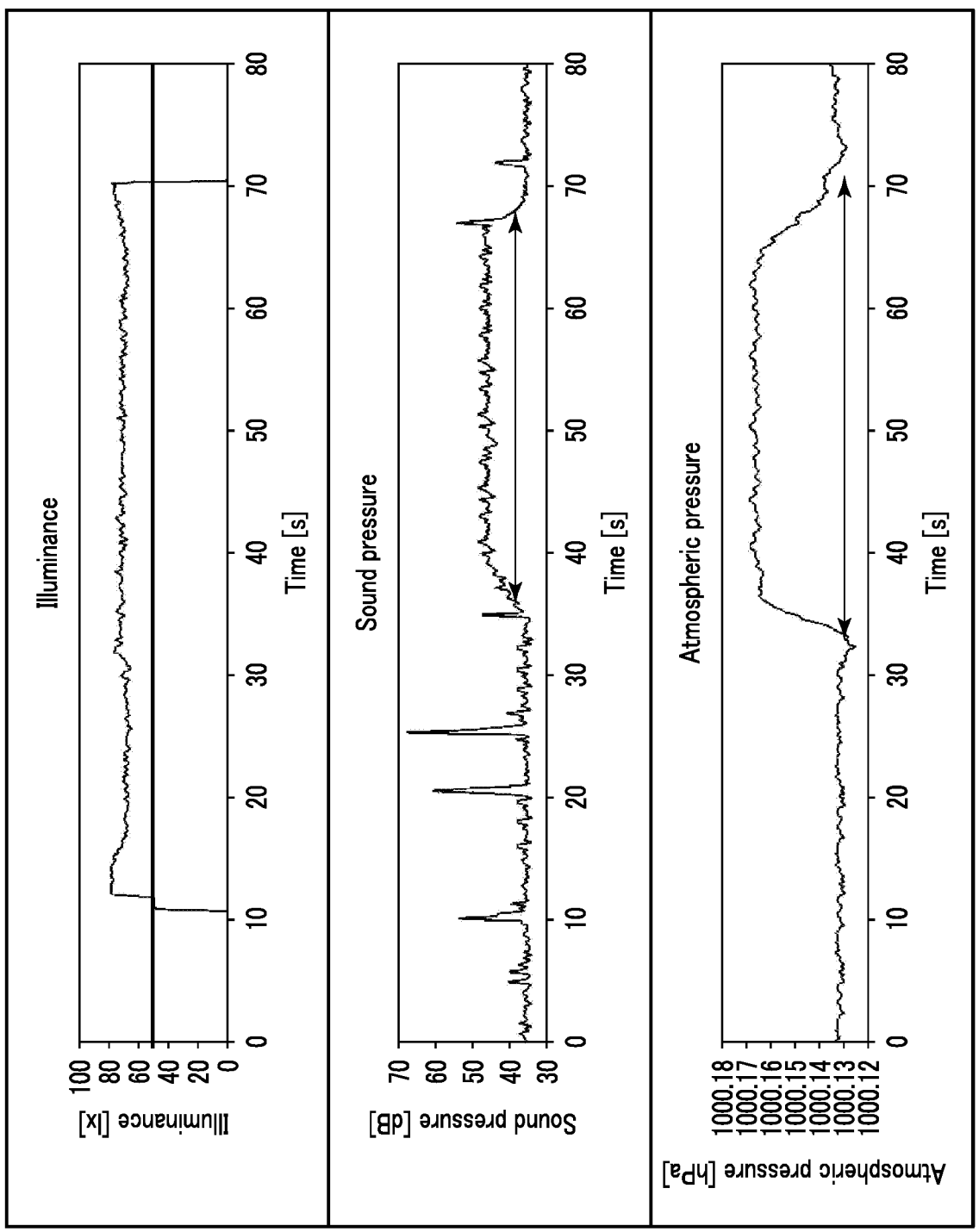
F I G. 38

|  | Raw value | Variation1 | Variation number 1 | Raw value number | Variation number 2 | Variation 2 |
|---|---|---|---|---|---|---|
| Illuminance | 75lx | 5lx | 0 times | 0 times | 0 times | 10lx |
| Sound pressure | 48dB | 5dB | 1 time | 2 times | 2 times | 13dB |
| Atmospheric pressure | 1000.166hPa | 0.02hPa | 1 time | 0 times | 1 time | 0.035hPa |

F I G. 39

|  | Raw value | Variation1 | Variation number 1 | Raw value number | Variation number 2 | Variation 2 |
|---|---|---|---|---|---|---|
| Illuminance | 50lx | 50lx | - | - | - | - |
| Sound pressure | - | - | 1 time | 2 times | 2 times | 10dB |
| Atmospheric pressure | - | - | - | - | - | 0.02hPa |

F I G. 40

|  | Raw value | Variation1 | Variation number 1 | Raw value number | Variation number 2 | Variation 2 |
|---|---|---|---|---|---|---|
| Illuminance | O | x | - | - | - | - |
| Sound pressure | - | - | O | O | O | O |
| Atmospheric pressure | - | - | - | - | - | O |

F I G. 41

|  | Raw value |
|---|---|
| Illuminance | 0lx |
| Sound pressure | 32dB |
F I G. 43
|  | Raw value |
|---|---|
| Illuminance | 0lx |
| Sound pressure | 35dB |
F I G. 44
|  | Raw value |
|---|---|
| Illuminance | ○ |
| Sound pressure | ○ |
F I G. 45
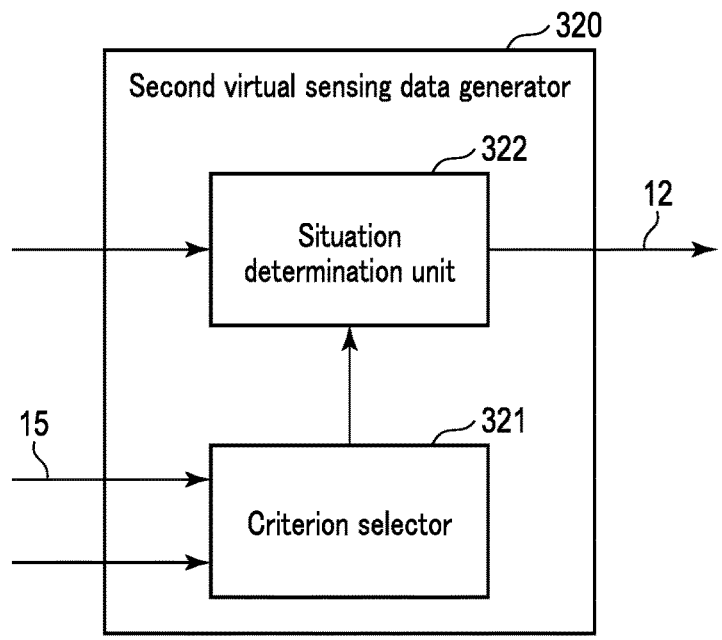
F I G. 46

Situation relating to person

| Physical sensing data | First virtual sensing data | Second virtual sensing data |
|---|---|---|
| Illuminance・sound ・acceleration・gas | Presence of person | Presence of person |
| Temperature・sound ・acceleration・gas | Number of persons | Plural persons |
| Sound・acceleration | Information of action of person | Action of person |
| Atmospheric pressure ・acceleration | Information of door opening/closing | Door opening/closing |

FIG. 47

Situation relating to nature

| Physical sensing data | First virtual sensing data | Second virtual sensing data |
|---|---|---|
| Time | Time | Morning/noon/night |
| Temperature・illuminance | Situation of insolation | Insolation |
| Humidity | Information of dew condensation | Occurrence of dew condensation |

FIG. 48

Operational situation of peripheral device

| Physical sensing data | First virtual sensing data | Second virtual sensing data |
|---|---|---|
| Temperature・humidity | Operation information | Air-conditioning |
| Humidity・sound | Operation information | Humidifier |
| Illuminance | Operation information | Illumination |
| Atmospheric pressure・sound | Operation information | Ventilating fan |
| Sound・temperature ・humidity・gas | Operation information | Stove |
| Temperature・humidity | Operation information | Microwave oven |
| Sound・temperature・humidity | Operation information | Thermos |
| Temperature・sound | Operation information | Refrigerator |
| Temperature・sound | Operation information | TV |
| Sound | Operation information | Cleaner |
| Sound | Operation information | Washing machine |
| Sound | Operation information | Massaging tool |

FIG. 49

Life situation of person

| Physical sensing data | First virtual sensing data | Second virtual sensing data |
|---|---|---|
| Sound·illuminance | Sleep | Sleep |
| Sound·gas | Meal | Meal |
| Sound | Change of clothes | Change of clothes |
| Temperature·atmospheric pressure·sound·illuminance·gas | Cooking | Cooking |
| Temperature·humidity | Bath | Bath |
| Sound | Toilet | Toilet |

F I G. 50

Situation relating to installation space of physical sensor

| Physical sensing data | First virtual sensing data | Second virtual sensing data |
|---|---|---|
| Acceleration | Installation place | Direction of installation |
| Illuminance | Installation place | Near wall |

F I G. 51

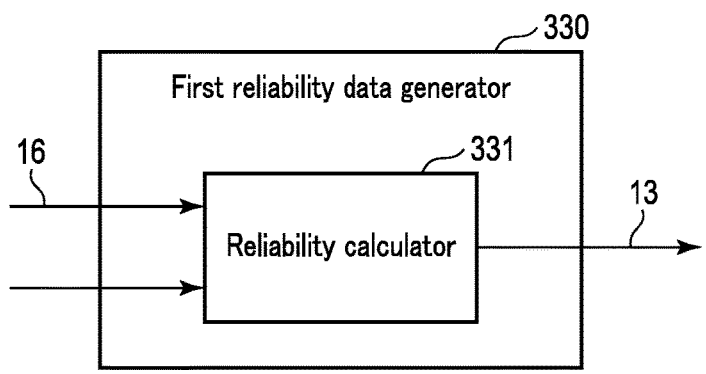

F I G. 52

| Virtual sensing data | Reliability data | | | | | | | | |
|---|---|---|---|---|---|---|---|---|---|
| | Temperature | Humidity | Illuminance | Atmospheric pressure | Sound pressure | Gas | Discomfort index | Vibration | Number of persons・attributes |
| Presence of person | A | | A | A | A | A | A | A | A |
| Plural persons | A | | A | | A | A | A | A | A |
| Action of person | A | | | | A | A | A | A | A |
| Door opening/closing | A | | | A | A | A | A | A | A |
| Sleep | | | A | | | | | | |
| Meal | | | | | A | A | A | | A |
| Change of clothes | | | | | A | | | | |
| Cooking | A | A | | | A | A | A | | A |
| Bath | A | A | | | A | A | A | | A |
| Toilet | | | | | A | A | A | | A |
| Air-conditioning | C | | | B | B | | B | | B |
| Humidifier | | C | | | B | | B | | B |
| Illumination | B | | C | | | | B | | B |
| Ventilating fan | B | | | B | B | B | B | | B |
| Stove | B | B | | | B | B | | | |
| Microwave oven | B | | | | | | | | |
| Thermos | B | B | | | B | | | | |
| Refrigerator | B | | | | B | | | B | B |
| TV | B | | B | | B | | B | | B |
| Cleaner | B | | | | B | | | B | B |
| Washing machine | B | | | | B | | | B | B |
| Massaging tool | | | | | B | | | | |
| Insolation | B | | B | | | | B | | |
| Occurrence of dew condensation | B | B | | | B | | | | B |
| Direction of installation | D | | D | | D | | | | D |
| Near wall | D | | D | | D | D | | | D |
| Presence of person | E | | E | E | E | E | E | E | E |
| Plural persons | E | | E | | E | E | E | E | E |
| Action of person | E | | | | E | E | E | E | E |
| Door opening/closing | E | | | E | E | E | E | E | E |
| Morning/noon/night | E | E | E | E | E | | E | | E |

F I G. 54

| Virtual sensing data | Contribution rate filter | | | | | | |
|---|---|---|---|---|---|---|---|
| | Temperature | Humidity | Illuminance | Atmospheric pressure | Sound pressure | Gas | Vibration |
| Presence of person | 0.2 | | 0.5 | 0.1 | 0.1 | 0.1 | 0.1 |
| Plural persons | 0.05 | | 0.3 | | 0.1 | 0.2 | 0.3 |
| Action of person | 0.2 | | | | 0.1 | 0.1 | 0.4 |
| Door opening/closing | 0.15 | | | 0.4 | 0.2 | 0.1 | 0.2 |
| Sleep | | | 0.2 | | | | |
| Meal | | | | | 0.1 | 0.2 | |
| Change of clothes | | | | | 0.1 | | |
| Cooking | 0.1 | 0.2 | | 0.5 | 0.1 | 0.1 | |
| Bath | 0.3 | 0.8 | | | 0.1 | 0.1 | |
| Toilet | | | | | 0.1 | 0.1 | |

FIG. 55

| Virtual sensing data | Contribution rate filter | | | | | | |
|---|---|---|---|---|---|---|---|
| | Temperature | Humidity | Illuminance | Atmospheric pressure | Sound pressure | Gas | Vibration |
| Air-conditioning | | | | 0.2 | 0.05 | | |
| Humidifier | | | | | 0.05 | | |
| Illumination | 0.03 | | 0.8 | | | | |
| Ventilating fan | 0.02 | | | | 0.1 | 0.5 | |
| Stove | 0.2 | 0.4 | | | 0.05 | 0.5 | |
| Microwave oven | 0.2 | | | | | | |
| Thermos | 0.2 | 0.5 | | | 0.05 | | |
| Refrigerator | 0.05 | | | | 0.05 | | 0.3 |
| TV | 0.05 | | 0.3 | | 0.2 | | |
| Cleaner | 0.05 | | | | 0.2 | | 0.4 |
| Washing machine | 0.05 | | | | 0.2 | | 0.3 |
| Massaging tool | | | | | 0.05 | | |
| Insolation | 0.1 | | 0.7 | | | | |
| Occurrence of dew condensation | 0.05 | 0.1 | | | | | |

FIG. 56

| Virtual sensing data | Contribution rate filter | | |
|---|---|---|---|
| | Temperature | Humidity | Illuminance |
| Air-conditioning | 1 | | |
| Humidifier | | 1 | |
| Illumination | | | 1 |

F I G. 57

| Virtual sensing data | Contribution rate filter | | | | | | |
|---|---|---|---|---|---|---|---|
| | Temperature | Humidity | Illuminance | Atmospheric pressure | Sound pressure | Gas | Vibration |
| Direction of installation | 0.5 | | 0.8 | | 0.4 | | |
| Near wall | 0.5 | | 0.2 | | 0.6 | 1 | |

F I G. 58

| Situation item | Value of virtual sensing data | | Contribution rate filter | | Contribution rate |
|---|---|---|---|---|---|
| Presence of person | 1 | | 0.2 | | 0.2 |
| Plural persons | 0 | | 0.05 | | 0 |
| Action of person | 1 | | 0.2 | | 0.2 |
| Door opening/closing | 1 | | 0.15 | | 0.15 |
| Sleep | 0 | × | 0 | = | 0 |
| Meal | 1 | | 0 | | 0 |
| Change of clothes | 0 | | 0 | | 0 |
| Cooking | 1 | | 0.1 | | 0.1 |
| Bath | 0 | | 0.3 | | 0 |
| Toilet | 0 | | 0 | | 0 |

F I G. 59

| Physical sensing data | Reliability data | | | | |
|---|---|---|---|---|---|
| Raw data of temperature | Reliability of temperature data with respect to A | Reliability of temperature data with respect to B | Reliability of temperature data with respect to C | Reliability of temperature data with respect to D | Reliability of temperature data with respect to E |
| 2byte | 2byte | 2byte | 2byte | 2byte | 2byte |
| Raw data of humidity | Reliability of humidity data with respect to A | Reliability of humidity data with respect to B | Reliability of humidity data with respect to C | Reliability of humidity data with respect to D | Reliability of humidity data with respect to E |
| 2byte | 2byte | 2byte | 2byte | 2byte | 2byte |
| Raw data of illuminance | Reliability of illuminance data with respect to A | Reliability of illuminance data with respect to B | Reliability of illuminance data with respect to C | Reliability of illuminance data with respect to D | Reliability of illuminance data with respect to E |
| 2byte | 2byte | 2byte | 2byte | 2byte | 2byte |
| Raw data of atmospheric pressure | Reliability of atmospheric pressure data with respect to A | Reliability of atmospheric pressure data with respect to B | Reliability of atmospheric pressure data with respect to C | Reliability of atmospheric pressure data with respect to D | Reliability of atmospheric pressure data with respect to E |
| 2byte | 2byte | 2byte | 2byte | 2byte | 2byte |
| Raw data of sound pressure | Reliability of sound pressure data with respect to A | Reliability of sound pressure data with respect to B | Reliability of sound pressure data with respect to C | Reliability of sound pressure data with respect to D | Reliability of sound pressure data with respect to E |
| 2byte | 2byte | 2byte | 2byte | 2byte | 2byte |
| Raw data of gas | Reliability of gas data with respect to A | Reliability of gas data with respect to B | Reliability of gas data with respect to C | Reliability of gas data with respect to D | Reliability of gas data with respect to E |
| 2byte | 2byte | 2byte | 2byte | 2byte | 2byte |
| Raw data of vibration | Reliability of vibration data with respect to A | Reliability of vibration data with respect to B | Reliability of vibration data with respect to C | Reliability of vibration data with respect to D | Reliability of vibration data with respect to E |
| 2byte | 2byte | 2byte | 2byte | 2byte | 2byte |

F I G. 60

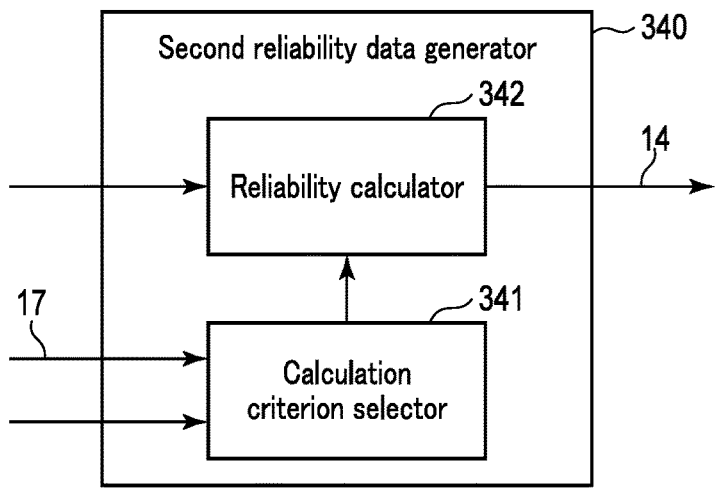
F I G. 61
|  | Sampling frequency | Precision | Resolution |
|---|---|---|---|
| Temperature | 1 | 0.01 | 0.1 |
| Atmospheric pressure | 10 | 1 | 1 |
| Sound pressure | 40 | 5 | 10 |
| Vibration | 100 | 2 | 1 |
F I G. 62
|  | Noise frequency | Noise width | Variation width |
|---|---|---|---|
| Temperature | 0.01 | 0.01 | 0.01 |
| Atmospheric pressure | 0 | 1 | 1 |
| Sound pressure | 10 | 10 | 10 |
| Vibration | 200 | 5 | 5 |
F I G. 63
|  | Sampling frequency | Precision | Resolution |
|---|---|---|---|
| Temperature | ○ | ○ | × |
| Atmospheric pressure | ○ | ○ | ○ |
| Sound pressure | ○ | ○ | ○ |
| Vibration | × | ○ | ○ |
F I G. 64

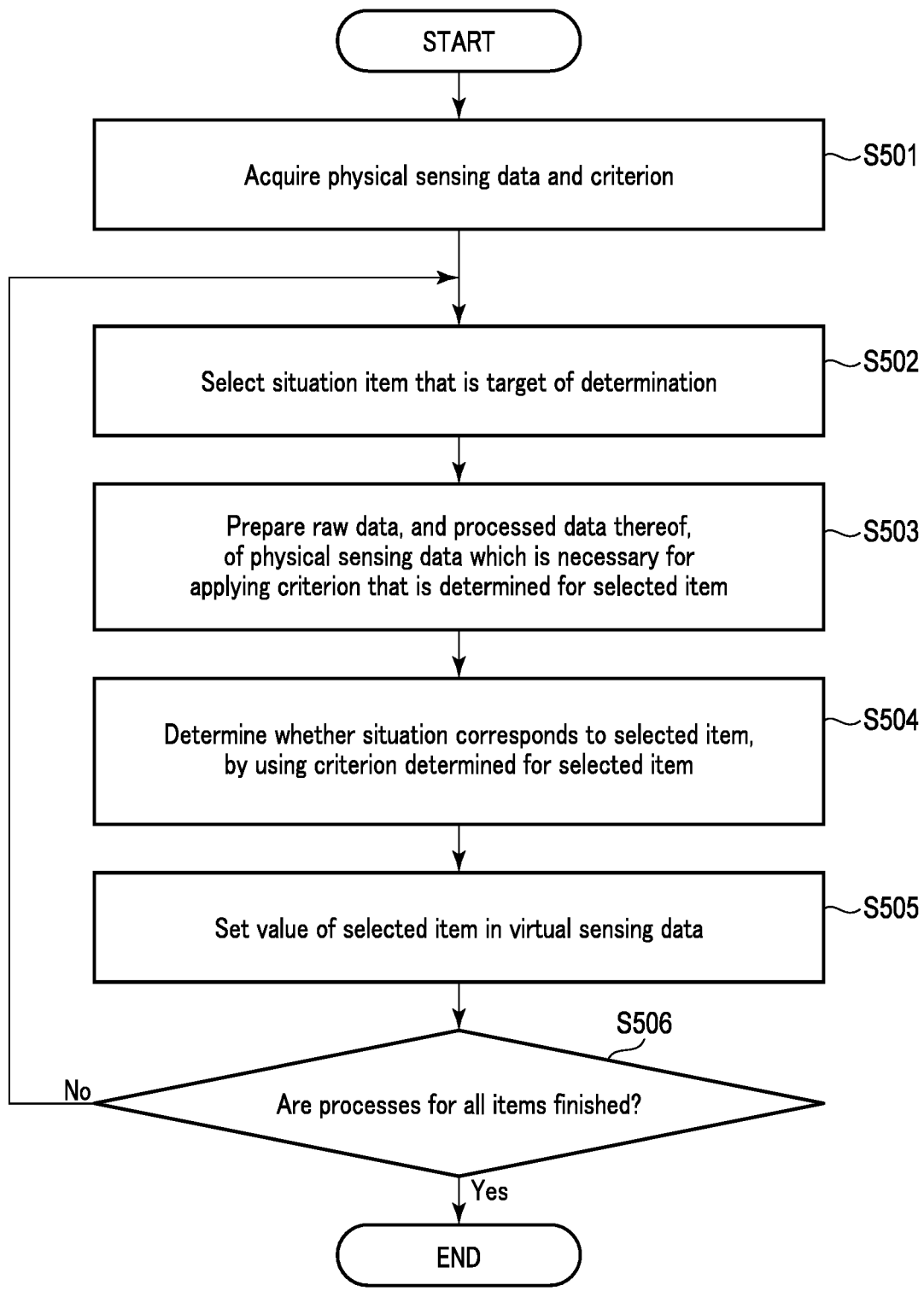
F I G. 65

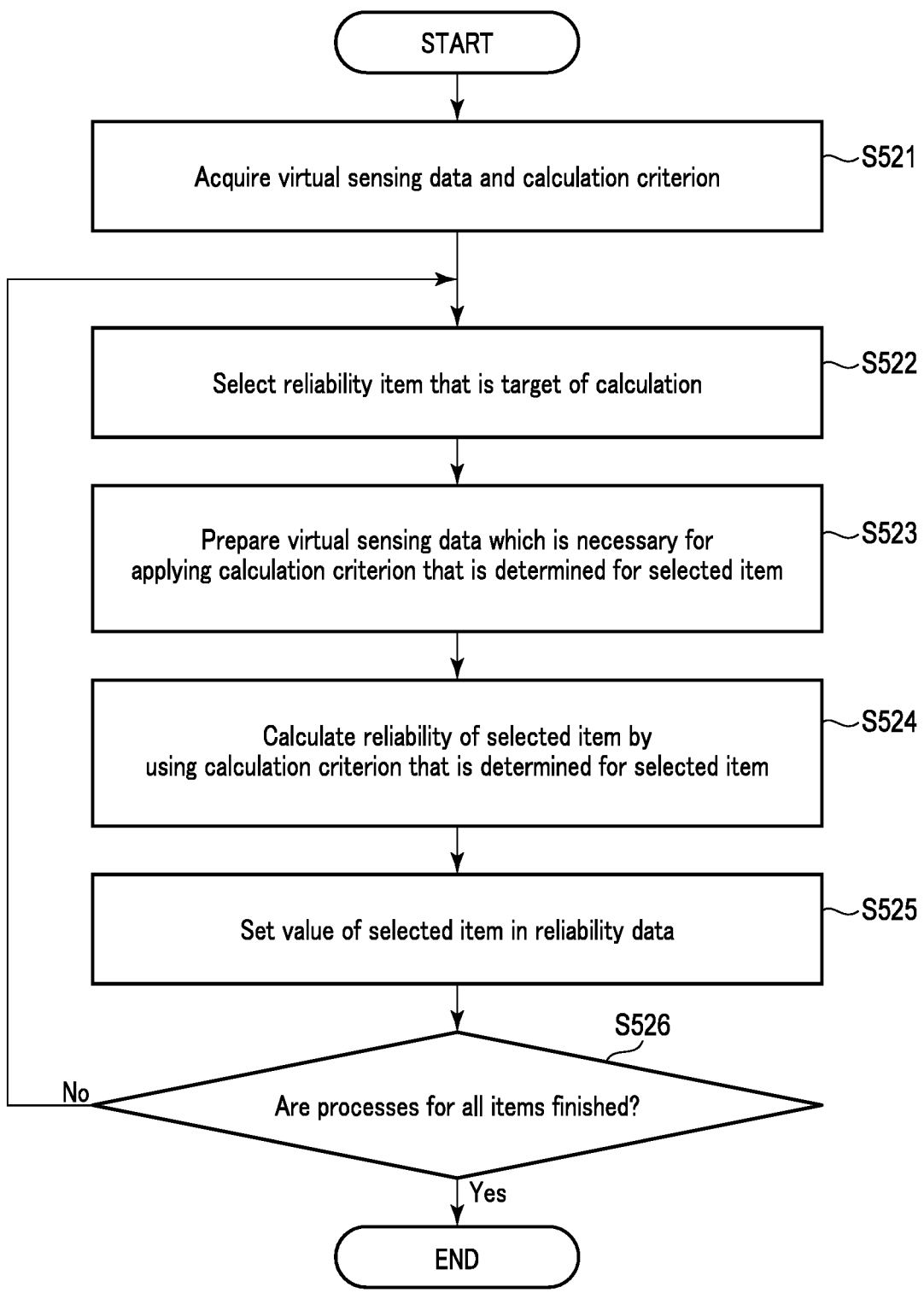
F I G. 67

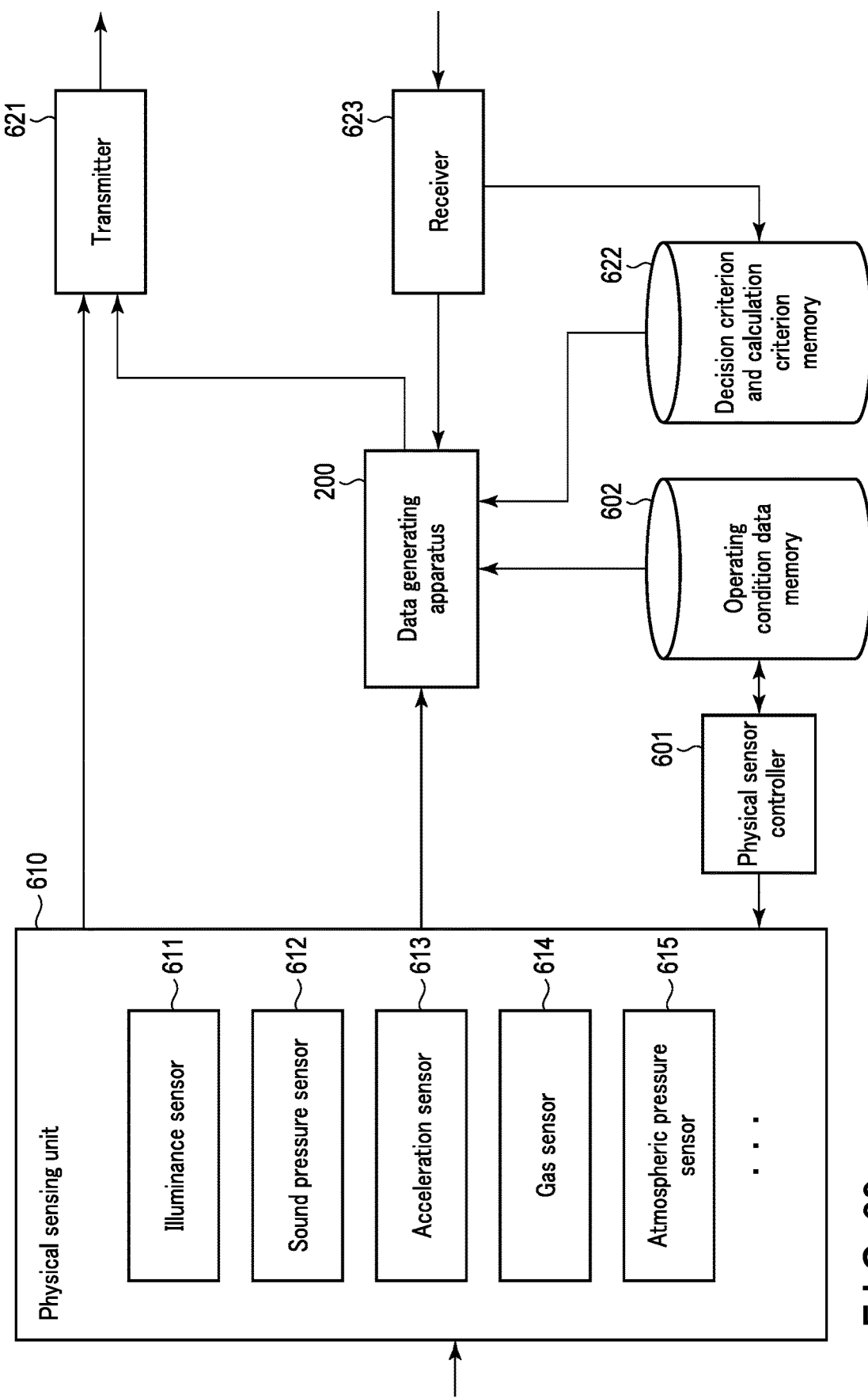
F I G. 69

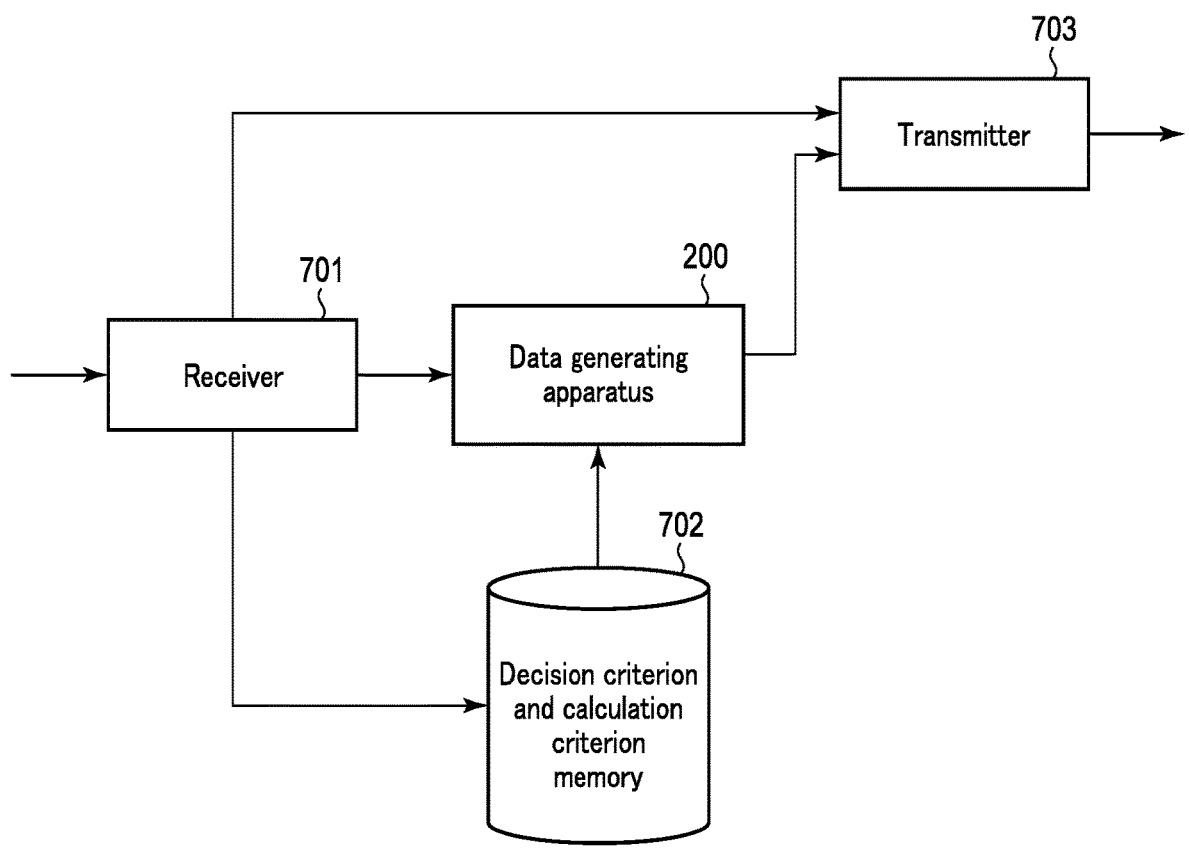
F I G. 70

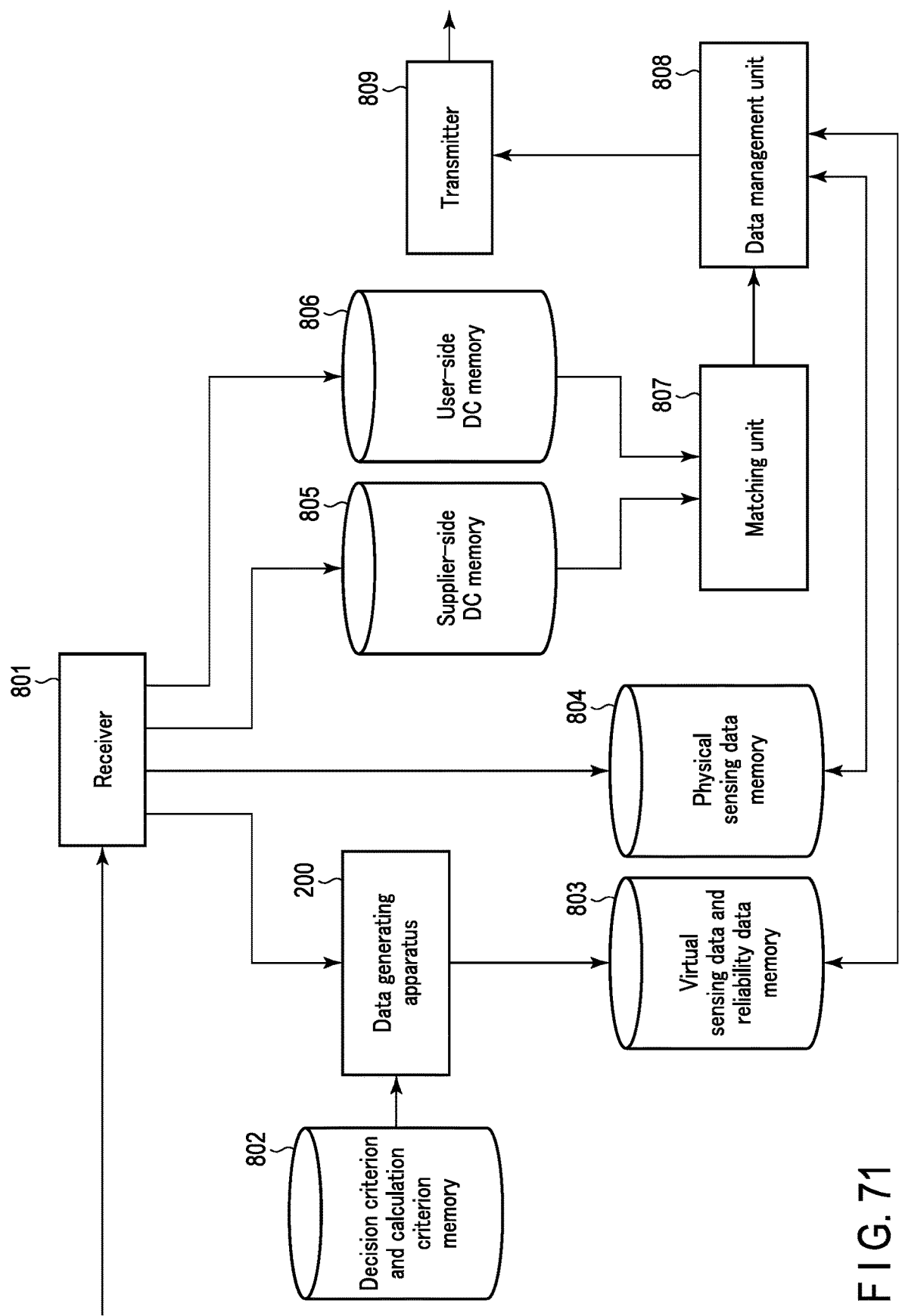
F I G. 71

DATA GENERATING APPARATUS, DATA GENERATING METHOD, DATA GENERATING PROGRAM AND SENSING APPARATUS

CROSS REFERENCE

This is a U.S. national phase application under 35 USC 371 of International Application PCT/JP2018/043762 (not published in English), filed Nov. 28, 2018.

FIELD

The present disclosure relates to a data generating apparatus, a data generating method, a data generating program and a sensing apparatus.

BACKGROUND

Aside from a sensor (physical sensor) that is actually disposed, there is known a technology (program module) of a virtual sensor which generates new sensing data (virtual sensing data) by analyzing and processing sensing data (physical sensing data) that is generated by one or a plurality of physical sensors observing a sensing target thereof (see, e.g. Jpn. Pat. Appln. KOKAI Publication No. 2014-045242). If a virtual sensor, which generates sensing data complying with a user's request, is designed, the user can utilize desired sensing data even if such a physical sensor does not actually exist.

SUMMARY

A virtual sensor may be designed, for example, so as to generate sensing data indicative of a situation in a surrounding of a physical sensor. However, the situation is constituted by various elements. Therefore, when determination is performed with respect to a certain element of the situation, based on physical sensing data, noise or the like by another element may exert influence.

The object of the present disclosure is to provide a technology of generating virtual sensing data which is indicative of a situation in a surrounding of a physical sensor.

A data generating apparatus according to a first aspect of the present disclosure includes a first acquisition unit configured to acquire physical sensing data acquired by a physical sensor observing a sensing target; a second acquisition unit configured to acquire first virtual sensing data representative of a first determination result with respect to a situation in a surrounding of the physical sensor; a third acquisition unit configured to acquire a plurality of criteria determined for situation items which are determination targets; a first selector configured to select one of the acquired criteria, which corresponds to the first virtual sensing data; and a determination unit configured to determine the situation in the surrounding of the physical sensor with respect to each of the situation items, based on the acquired physical sensing data, by using the selected criterion, and to generate second virtual sensing data representative of a second determination result with respect to the situation.

According to this data generating apparatus, since the criterion, in which the influence of noise, etc. due to the situation indicated by the first virtual sensing data is taken into account, can be used, the situation in the surrounding of the physical sensor can exactly be determined.

In the data generating apparatus according to the first aspect, the criterion may include a criterion value for at least one of raw data, and processed data thereof, of the physical sensing data. Thereby, the situation can be determined by comparing a criterion value included in the criterion and raw data, or processed data thereof, of the physical sensing data corresponding to the criterion value.

In the data generating apparatus according to the first aspect, the criterion may include a pre-trained model created by performing machine learning that determines a situation from physical sensing data for learning, which is generated under a situation indicated by the first virtual sensing data associated with the criterion.

Thereby, the situation can be determined by giving raw data, or processed data thereof, of physical sensing data as input data to a neural network in which a pre-trained model is set.

In the data generating apparatus according to the first aspect, the second acquisition unit may further acquire third virtual sensing data representative of a third determination result with respect to the situation in the surrounding of the physical sensor, and the data generating apparatus may further include a fourth acquisition unit configured to acquire a first calculation criterion; and a first calculator configured to calculate a reliability of sensing data, based on the acquired third virtual sensing data, by using the acquired first calculation criterion, and to generate first reliability data. According to this data generating apparatus (hereinafter, referred to as "data generating apparatus according to a second aspect of the present disclosure"), the reliability of sensing data can be estimated from virtual sensing data.

In the data generating apparatus according to the second aspect, the first reliability data may be indicative of the reliability of the sensing data with respect to each of at least one factor influencing the reliability of the sensing data. Thereby, the first reliability data can be generated which describes the reliability of physical sensing data with respect to a factor influencing the reliability of the sensing data, which is recognized from the virtual sensing data.

In the data generating apparatus according to the second aspect, the first calculation criterion may include a weighting factor which is allocated to each of situation items included in the third virtual sensing data, and the first calculator may perform calculation by using a value of each situation item in the third virtual sensing data and the weighting factor allocated to the situation item, and may calculate the reliability of the sensing data, based on a result of the calculation. Thereby, the reliability of sensing data can be calculated by taking a contribution rate of each situation item into account.

In the data generating apparatus according to the second aspect, the first calculation criterion may include a pre-trained model created by performing machine learning which calculates, from virtual sensing data for learning, a reliability of sensing data generated under a situation indicated by the virtual sensing data for learning. Thereby, the reliability can be calculated by giving the third virtual sensing data as input data to a neural network in which the pre-trained model is set.

In the data generating apparatus according to the second aspect, the second acquisition unit may further acquire fourth virtual sensing data representative of a fourth determination result with respect to the situation in the surrounding of the physical sensor, the fourth acquisition unit may further acquire a plurality of second calculation criteria, and the data generating apparatus may further include a fifth acquisition unit configured to acquire operating condition data indicative of an operating condition of the physical sensor; a second selector configured to select one of the second calculation criteria, which corresponds to the fourth virtual sensing data; and a second calculator configured to calculate the reliability of the sensing data, based on the acquired operating condition data, by using the selected second calculation criterion, and to generate second reliability data. According to this data generating apparatus (hereinafter, referred to as "data generating apparatus according to a third aspect of the present disclosure"), the second reliability data can be generated which describes the reliability of physical sensing data with respect to noise, which is recognized from the operating condition of the physical sensor.

In the data generating apparatus according to the third aspect, the second reliability data may be indicative of the reliability of the physical sensing data with respect to noise, the physical sensing data being generated by a physical sensor which operates according to an operating condition indicated by the operating condition data under a situation indicated by the fourth virtual sensing data. Thereby, information can be described as to whether the physical sensing data is reliable or not with respect to noise.

In the data generating apparatus according to the third aspect, the second calculation criterion may include a criterion value for at least one of operating conditions indicated by the operating condition data. Thereby, the reliability can be calculated by comparing a criterion value included in the second calculation criterion and a value of the operating condition data corresponding to the criterion value.

In the data generating apparatus according to the third aspect, the second calculation criterion may include a pre-trained model created by performing machine learning which calculates, from operating condition data for learning, a reliability of sensing data generated by a physical sensor complying with an operating condition indicated by the operating condition data for learning. Thereby, the reliability can be calculated by giving the operating condition data as input data to a neural network in which the pre-trained model is set.

A sensing apparatus according to a fourth aspect of the present disclosure includes the data generating apparatus of any one of the first to third aspects, and the physical sensor. Thereby, there can be provided an intelligent sensing apparatus which generates virtual sensing data and/or reliability data, in addition to physical sensing data.

A data generating method according to a fifth aspect of the present disclosure includes acquiring, by a computer, physical sensing data acquired by a physical sensor observing a sensing target; acquiring, by the computer, first virtual sensing data representative of a first determination result with respect to a situation in a surrounding of the physical sensor; acquiring, by the computer, a plurality of criteria determined for situation items which are determination targets; selecting, by the computer, one of the acquired criteria, which corresponds to the first virtual sensing data; and determining, by the computer, the situation in the surrounding of the physical sensor with respect to each of the situation items, based on the acquired physical sensing data, by using the selected criterion, and generating second virtual sensing data representative of a second determination result with respect to the situation.

According to this data generating method, since the criterion, in which the influence of noise, etc. due to the situation indicated by the first virtual sensing data is taken into account, can be used, the situation in the surrounding of the physical sensor can exactly be determined.

A data generating program according to a sixth aspect of the present disclosure causes a computer to execute acquiring physical sensing data acquired by a physical sensor observing a sensing target; acquiring first virtual sensing data representative of a first determination result with respect to a situation in a surrounding of the physical sensor; acquiring a plurality of criteria determined for situation items which are determination targets; selecting one of the acquired criteria, which corresponds to the first virtual sensing data; and determining the situation in the surrounding of the physical sensor with respect to each of the situation items, based on the acquired physical sensing data, by using the selected criterion, and generating second virtual sensing data representative of a second determination result with respect to the situation.

According to this data generating program, since the criterion, in which the influence of noise, etc. due to the situation indicated by the first virtual sensing data is taken into account, can be used, the situation in the surrounding of the physical sensor can exactly be determined.

According to the present disclosure, there can be provided a technology of generating virtual sensing data which is indicative of a situation in a surrounding of a physical sensor.

BRIEF DESCRIPTION OF THE DRAWINGS

FIG. 1 is a block diagram illustrating an application example of a data generating apparatus according an embodiment.

FIG. 5 is a block diagram exemplarily illustrating a first virtual sensing data generator of FIG. 3.

FIG. 6 is a view exemplarily illustrating situation items of virtual sensing data, and physical sensing data which is used for determination with respect to the situation items.

FIG. 7 is a view exemplarily illustrating situation items of virtual sensing data, and physical sensing data which is used for determination with respect to the situation items.

FIG. 8 is a view exemplarily illustrating situation items of virtual sensing data, and physical sensing data which is used for determination with respect to the situation items.

FIG. 9 is a view exemplarily illustrating situation items of virtual sensing data, and physical sensing data which is used for determination with respect to the situation items.

FIG. 10 is a view exemplarily illustrating situation items of virtual sensing data, and physical sensing data which is used for determination with respect to the situation items.

FIG. 11 is a view exemplarily illustrating a data chart which is used for determination with respect to a situation item "cooking".

FIG. 12 is a view exemplarily illustrating a criterion which is used for determination with respect to the situation item "cooking".

FIG. 13 is a view illustrating a comparison result between the data chart of FIG. 11 and the criterion of FIG. 12.

FIG. 15 is a view exemplarily illustrating a data chart which is used for determination with respect to the situation item "presence of person".

FIG. 16 is a view exemplarily illustrating a criterion which is used for determination with respect to the situation item "presence of person".

FIG. 17 is a view illustrating a comparison result between the data chart of FIG. 15 and the criterion of FIG. 16.

FIG. 18 is a view exemplarily illustrating a data chart which is used for determination with respect to the situation item "number of persons".

FIG. 19 is a view exemplarily illustrating a criterion which is used for determination with respect to the situation item "number of persons".

FIG. 20 is a view illustrating a comparison result between the data chart of FIG. 18 and the criterion of FIG. 19.

FIG. 21 is a graph exemplarily illustrating raw data, and processed data thereof, of physical sensing data used for determination with respect to a situation item "door opening/closing".

FIG. 22 is a view exemplarily illustrating a data chart which is used for determination with respect to the situation item "door opening/closing".

FIG. 23 is a view exemplarily illustrating a criterion which is used for determination with respect to the situation item "door opening/closing".

FIG. 24 is a view illustrating a comparison result between the data chart of FIG. 22 and the criterion of FIG. 23.

FIG. 26 is a view exemplarily illustrating a data chart which is used for determination with respect to the situation item "illumination".

FIG. 27 is a view exemplarily illustrating a criterion which is used for determination with respect to the situation item "illumination".

FIG. 28 is a view illustrating a comparison result between the data chart of FIG. 26 and the criterion of FIG. 27.

FIG. 30 is a view exemplarily illustrating a data chart which is used for determination with respect to the situation item "ventilating fan".

FIG. 31 is a view exemplarily illustrating a criterion which is used for determination with respect to the situation item "ventilating fan".

FIG. 32 is a view illustrating a comparison result between the data chart of FIG. 30 and the criterion of FIG. 31.

FIG. 33 is a graph exemplarily illustrating raw data, and processed data thereof, of physical sensing data used for determination with respect to a situation item "refrigerator".

FIG. 34 is a view exemplarily illustrating a data chart which is used for determination with respect to the situation item "refrigerator".

FIG. 35 is a view exemplarily illustrating a criterion which is used for determination with respect to the situation item "refrigerator".

FIG. 36 is a view illustrating a comparison result between the data chart of FIG. 34 and the criterion of FIG. 35.

FIG. 37 is a graph exemplarily illustrating physical sensing data used for determination with respect to a situation item "microwave oven".

FIG. 38 is a graph exemplarily illustrating physical sensing data used for determination with respect to the situation item "cooking".

FIG. 39 is a view exemplarily illustrating a data chart which is used for determination with respect to the situation item "cooking".

FIG. 40 is a view exemplarily illustrating a criterion which is used for determination with respect to the situation item "cooking".

FIG. 41 is a view illustrating a comparison result between the data chart of FIG. 39 and the criterion of FIG. 40.

FIG. 43 is a view exemplarily illustrating a data chart which is used for determination with respect to the situation item "sleep".

FIG. 44 is a view exemplarily illustrating a criterion which is used for determination with respect to the situation item "sleep".

FIG. 45 is a view illustrating a comparison result between the data chart of FIG. 43 and the criterion of FIG. 44.

FIG. 46 is a block diagram exemplarily illustrating a second virtual sensing data generator of FIG. 3.

FIG. 47 is a view exemplarily illustrating situation items of second virtual sensing data, corresponding items in first virtual sensing data, and physical sensing data used for supplementing the corresponding items.

FIG. 48 is a view exemplarily illustrating situation items of second virtual sensing data, corresponding items in first virtual sensing data, and physical sensing data used for supplementing the corresponding items.

FIG. 49 is a view exemplarily illustrating situation items of second virtual sensing data, corresponding items in first virtual sensing data, and physical sensing data used for supplementing the corresponding items.

FIG. 50 is a view exemplarily illustrating situation items of second virtual sensing data, corresponding items in first virtual sensing data, and physical sensing data used for supplementing the corresponding items.

FIG. 51 is a view exemplarily illustrating situation items of second virtual sensing data, corresponding items in first virtual sensing data, and physical sensing data used for supplementing the corresponding items.

FIG. 52 is a block diagram exemplarily illustrating a first reliability data generator of FIG. 3.

FIG. 54 is a view schematically illustrating a relationship between situation items of virtual sensing data and reliability items of first reliability data.

FIG. 55 is a view exemplarily illustrating a calculation criterion which is used for calculating the reliability with respect to a reliability item "A. influence by person".

FIG. 56 is a view exemplarily illustrating a calculation criterion which is used for calculating the reliability with respect to a reliability item "B. influence by noise".

FIG. 57 is a view exemplarily illustrating a calculation criterion which is used for calculating the reliability with respect to a reliability item "C. influence by operation of peripheral device".

FIG. 58 is a view exemplarily illustrating a calculation criterion which is used for calculating the reliability with respect to a reliability item "D. influence by installation space of sensor".

FIG. 59 is a view illustrating a calculation example of the reliability of physical sensing data "temperature" with respect to "A. influence by person".

FIG. 60 is a view exemplarily illustrating a data structure of physical sensing data to which first reliability data is added.

FIG. 61 is a block diagram exemplarily illustrating a second reliability data generator of FIG. 3.

FIG. 62 is a view exemplarily illustrating a data chart which is used for calculating the reliability with respect to reliability items of second reliability data.

FIG. 63 is a view exemplarily illustrating a calculation criterion which is used for calculating the reliability with respect to reliability items of second reliability data.

FIG. 64 is a view illustrating a comparison result between the data chart of FIG. 62 and the calculation criterion of FIG. 63.

FIG. 65 is a flowchart exemplarily illustrating an operation of the first virtual sensing data generator of FIG. 5.

FIG. 67 is a flowchart exemplarily illustrating an operation of the first reliability data generator of FIG. 52.

FIG. 69 is a block diagram exemplarily illustrating a sensing apparatus including the data generating apparatus of FIG. 3.

FIG. 70 is a block diagram exemplarily illustrating a communication device including the data generating apparatus of FIG. 3.

FIG. 71 is a block diagram exemplarily illustrating a server including the data generating apparatus of FIG. 3.

DETAILED DESCRIPTION

Figure 2:
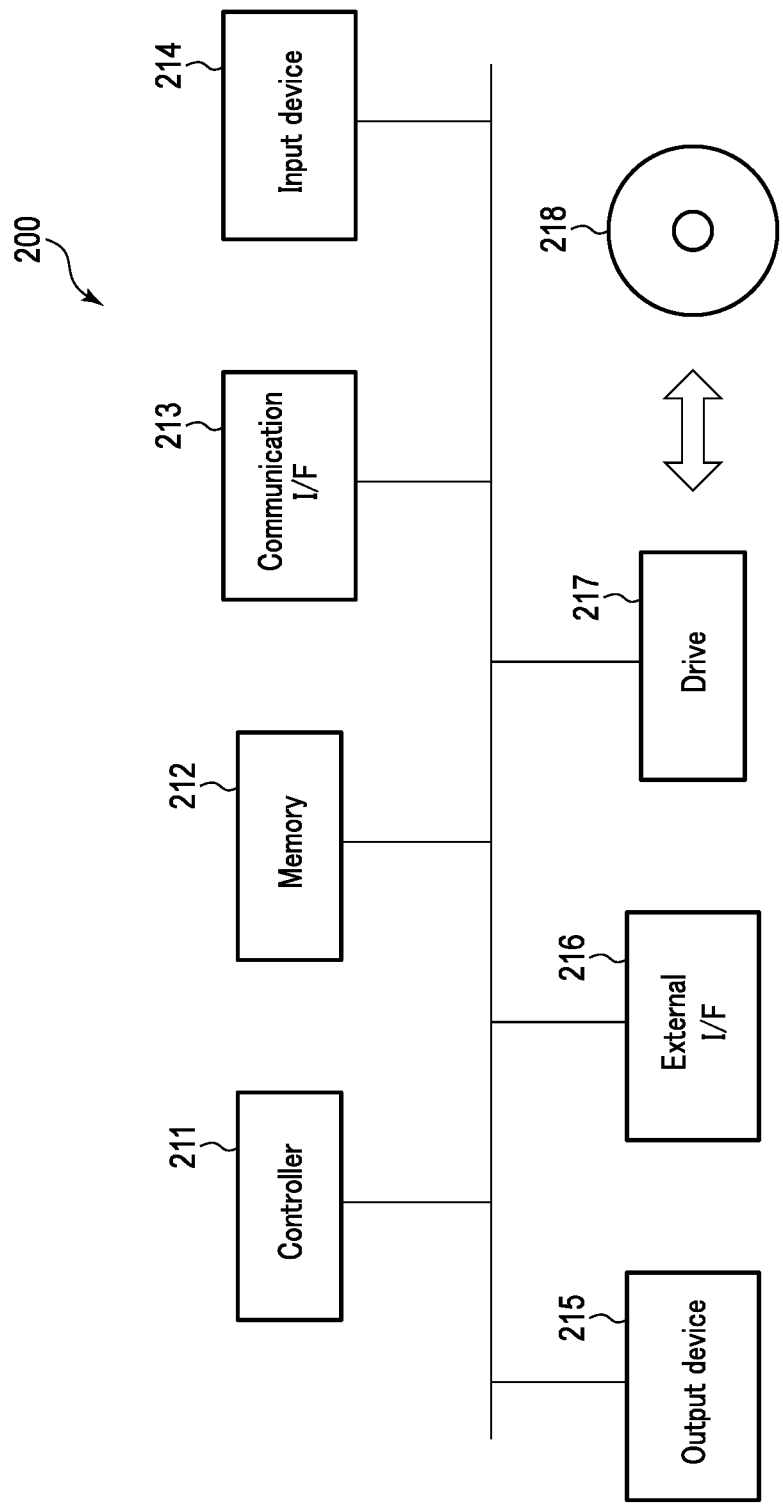
FIG. 2 is a block diagram exemplarily illustrating a hardware configuration of a data generating apparatus according to the embodiment.

An embodiment (hereinafter, also referred to as "present embodiment") according to one aspect of the present disclosure will be described hereinafter with reference to the accompanying drawings.

Hereinafter, elements identical or similar to already described elements are denoted by identical or similar reference signs, and an overlapping description is basically omitted. For example, when there are identical or similar elements, a common reference sign is used in some cases in order to describe the elements without distinguishing the elements, or suffix numbers are added to the common reference sign in other cases in order to describe the elements by distinguishing the elements.

§ 1 Application Example

To begin with, referring to FIG. 1, an application example of the present embodiment will be described. FIG. 1 schematically illustrates an application example of a data generating apparatus according to the present embodiment. The data generating apparatus 100 performs determination of a situation in a surrounding of a physical sensor, based on physical sensing data, with respect to each of a plurality of situation items which are preset as determination targets, and generates virtual sensing data (hereinafter, also referred to as "second virtual sensing data" for the purpose of convenience) having a value corresponding to the determination result.

In the description below, the situation of the surrounding of the physical sensor may include a state of a sensing target of a virtual sensor, for example, a person or some other animate being, or an inanimate being in the space of the surrounding of the physical sensor. In addition, the surrounding of the physical sensor may be determined based on characteristics or the like of operating conditions (e.g. precision, resolution, dynamic range, etc.) of the physical sensor which generates physical sensing data that is directly or indirectly used as a base of input data of a virtual sensor, sensing targets (e.g. light, sound, temperature, etc.) of the physical sensor, and the environment (e.g. in the air, in water, in vacuum, etc.) of the surrounding of the physical sensor.

The situation items may be, for example, items for segmentalizing and describing the situation. Specifically, the situation items may include "presence of person" which deals with information as to whether a person is present in the surrounding of the physical sensor; "air-conditioning", "microwave oven" and "TV" which deal with information of operational situations of air-conditioning, a microwave oven and a TV in the surrounding of the physical sensor; and "cooking" which deals with information as to whether a person is cooking in the surrounding of the physical sensor.

The data generating apparatus 100 includes a physical sensing data acquisition unit 101, a virtual sensing data acquisition unit 102, a criterion acquisition unit 103, a criterion selector 111, and a situation determination unit 112.

The physical sensing data acquisition unit 101 acquires physical sensing data. The physical sensing data may include, for example, illuminance data, sound pressure data, acceleration data, gas data, atmospheric pressure data, temperature data, and humidity data. When the data generating apparatus 100 is assembled in a sensing apparatus, the physical sensing data acquisition unit 101 may acquire physical sensing data from a sensor included in the sensing apparatus. In addition, the physical sensing data acquisition unit 101 may receive physical sensing data generated by a physical sensing unit which is included in an external apparatus.

The virtual sensing data acquisition unit 102 acquires first virtual sensing data which is indicative of a primary determination result with respect to a situation. The first virtual sensing data may be virtual sensing data which is generated by an external apparatus such as a host system, or may be virtual sensing data generated in the data generating apparatus 100.

The criterion acquisition unit 103 acquires a criterion which is preset for a situation item. The criterion is applied in order to generate second virtual sensing data indicative of a secondary determination result of the situation. Note that a plurality of criteria may be determined for a situation item.

Here, although the first virtual sensing data is described as being indicative of the primary determination result, and the second virtual sensing data is described as being indicative of the secondary determination result, the adjectives "primary" and "secondary" simply describe the order of determination of the situation, and intend to define none of relationships including a superiority-inferiority relationship therebetween.

When a plurality of criteria are determined for a given situation item, the criterion selector 111 selects one criterion for the situation item. Specifically, the criterion selector 111 may select a criterion corresponding to the first virtual sensing data.

It is now assumed that criteria for determining a situation item "cooking" include a criterion 1 which is used when a situation item "presence of person" is true (a person is present in the surrounding of the physical sensor); a criterion 2 which is used when a situation item "air-conditioning" is true (air-conditioning in the surrounding of the physical sensor is ON); a criterion 3 which is used when a situation item "microwave oven" is true (a microwave oven in the surrounding of the physical sensor is ON); and a criterion 4 which is used when a situation item "TV" is true (a TV in the surrounding of the physical sensor is ON). Here, when the first virtual sensing data indicates that a person is present in the surrounding of the physical sensor, the criterion selector 111 may select the criterion 1.

Note that the situation items included in the first virtual sensing data may not agree with the situation items included in the second virtual sensing data. When both do not agree, the data generating apparatus 100 may include a data converter for converting values of the situation items of the first virtual sensing data to values of the corresponding items of the second virtual sensing data. For example, when the first virtual sensing data includes a value of a situation item "number of persons" which deals with information of the number of persons existing in the surrounding of the physical sensor, the data converter may convert the value of the "number of persons" to a value of the situation item "presence of person".

The criterion may include a criterion value for at least one of raw data, and processed data thereof, of physical sensing data which is to be referred to in order to perform determination with respect to a situation item. For example, the criterion value may be 200 [lx] for raw data of the illuminance data, or 50 [%] for a time ratio in which sound pressure exceeds 50 [dB] within 30 seconds. The criterion value can be designed, for example, by analyzing raw data, or processed data thereof, of physical sensing data generated under a situation corresponding to a situation item that is a target of the criterion, and raw data, or processed data thereof, of physical sensing data generated not under this situation.

In this case, the situation determination unit 112 prepares necessary data for applying the criterion, i.e. raw data, or processed data thereof, of physical sensing data for which a criterion value is determined. The raw data, or processed data thereof, of physical sensing data may be included in the physical sensing data, or may be calculated by the situation determination unit 112 or some other structural element included in the data generating apparatus 100, or may be calculated by an external apparatus. The situation determination unit 112 compares the thus prepared data with the criterion value, and sets a value of the situation item in the second virtual sensing data in accordance with the comparison result.

Alternatively, the criterion may include a pre-trained model which is used for performing determination with respect to a situation item. The pre-trained model may be created by performing machine learning which determines the situation from physical sensing data for learning. For example, a pre-trained model as the above-described criterion 2 can be created by performing supervised learning by using, as learning data with a correct answer label, raw data, and/or processed data thereof, of each physical sensing data which was generated while the air-conditioning was ON in the surrounding of the physical sensor and a person was cooking in the surrounding of the physical sensor. In addition, raw data, and/or processed data thereof, of each physical sensing data for leaning, which was generated while the air-conditioning was ON in the surrounding of the physical sensor and a person was not cooking in the surrounding of the physical sensor, may be used as learning data with an incorrect answer label.

In this case, the situation determination unit 112 prepares necessary data for applying a criterion, i.e. raw data, or processed data thereof, of physical sensing data for input to a neural network in which a pre-trained model serving as a criterion is set. The situation determination unit 112 gives the thus prepared data to the neural network in which the pre-trained model serving as the criterion is set, and sets the value of the situation item, based on the output value thereof. Note that the pre-trained model may be created through machine learning for acquiring the ability to simultaneously determine a plurality of situation items. In this case, a common criterion is determined between these situation items.

As described above, based on the first virtual sensing data representative of the primary determination result of the situation, the data generating apparatus 100 according to the application example selects the criterion which is used for the secondary determination of the situation. Therefore, according to the data generating apparatus 100, since the criterion, in which the influence of noise, etc. due to the situation indicated by the first virtual sensing data is taken into account, can be used, the situation in the surrounding of the physical sensor can exactly be determined.

§ 2 Configuration Example

[Hardware Configuration]

Next, referring to FIG. 2, a description will be given of an example of a hardware configuration of a data generating apparatus 200 according to the present embodiment. FIG. 2 schematically illustrates an example of the hardware configuration of the data generating apparatus 200 according to the present embodiment.

As exemplarily illustrated in FIG. 2, the data generating apparatus 200 according to the present embodiment may be a computer in which a controller 211, a memory 212, a communication interface 213, an input device 214, an output device 215, an external interface 216, and a drive 217 are electrically connected. Note that in FIG. 2, the communication interface and the external interface are described as "Communication I/F" and "External I/F".

The controller 211 includes a CPU (Central Processing Unit), a RAM (Random Access Memory), and a ROM (Read Only Memory). The CPU loads a program, which is stored in the memory 212, into the RAM. Then, the CPU interprets and executes the program, thereby enabling the controller 211 to execute various information processes, for example, processes or controls of structural elements which will be described in the item of the functional configuration.

The memory 212 is a so-called auxiliary memory device, and may be an internal or external hard disk drive (HDD: Hard Disk Drive), a solid state drive (SSD: Solid State Drive), or a semiconductor memory such as a flash memory. The memory 212 stores a program that is executed by the controller 211 (e.g. a program for causing the controller 211 to execute a data generating process), and data that is used by the controller 211 (e.g. various kinds of physical sensing data, various kinds of virtual sensing data, various kinds of reliability data, criteria, and calculation criteria).

The communication interface 213 may be any kind of wireless communication modules for, for example, BLE (Bluetooth (trademark) Low Energy), mobile communication (3G, 4G, etc.) and WLAN (Wireless Local Area Network), and may be an interface for executing wireless communication via a network. In addition, the communication interface 213 may further include a wired communication module such as a wired LAN module, in addition to the wireless communication module or in place of the wireless communication module.

The input device 214 may include a device for accepting a user input, such as a touch screen, a keyboard or a mouse. In addition, the input device 214 may include a sensor which measures a predetermined physical quantity and generates and inputs physical sensing data. The output device 215 is a device for an output, such as a display or a speaker.

The external interface 216 is a USB (Universal Serial Bus) port, a memory card slot, or the like, and is an interface for a connection to an external apparatus.

The drive 217 is, for example, a CD (Compact Disc) drive, a DVD (Digital Versatile Disc) drive, a BD (Blu-ray (trademark) Disc) drive, or the like. The drive 217 reads in programs and/or data stored in a storage medium 218, and delivers the programs and/or data to the controller 211. Note that a part or all of the programs and data, which have been described as being storable in the above-described memory 212, may be read from the storage medium 218 by the drive 217.

The storage medium 218 is a medium which stores programs and/or data by an electric, magnetic, optical, mechanical or chemical function, in a form readable by machines including a computer. The storage medium 218 is, for example, a detachable disc medium such as a CD, a DVD or a BD, but the storage medium 218 is not limited to this, and may be a flash memory or some other semiconductor memory.

Note that, as regards concrete hardware configurations of the data generating apparatus 200, structural elements can be omitted, replaced or added as appropriate in accordance with embodiments. For example, the controller 211 may include a plurality of processors. The data generating apparatus 200 may be an information processing apparatus which is designed exclusively for services to be provided, or a general-purpose information processing apparatus such as a smartphone, a tablet PC (Personal Computer), a laptop PC, or a desktop PC. In addition, the data generating apparatus 200 may be composed of a plurality of information processing apparatuses.

[Functional Configuration]

Figure 3:
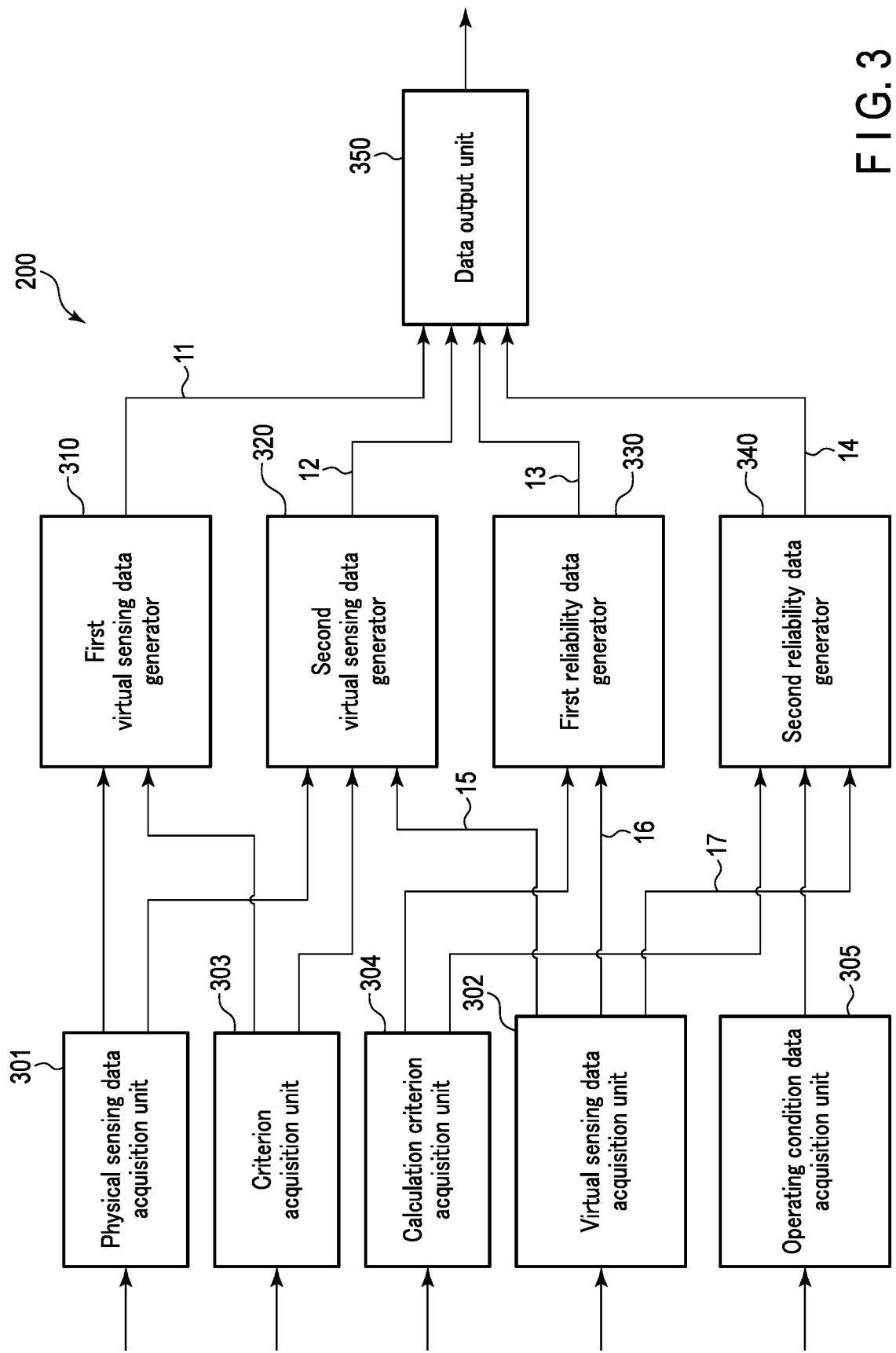
FIG. 3 is a block diagram exemplarily illustrating a functional configuration of the data generating apparatus according to the embodiment.

Next, referring to FIG. 3, a description will be given of an example of a functional configuration of the data generating apparatus 200 according to the present embodiment. FIG. 3 schematically illustrates an example of the functional configuration of the data generating apparatus 200.

As illustrated in FIG. 3, the data generating apparatus 200 includes a physical sensing data acquisition unit 301, a virtual sensing data acquisition unit 302, a criterion acquisition unit 303, a calculation criterion acquisition unit 304, an operating condition data acquisition unit 305, a first virtual sensing data generator 310, a second virtual sensing data generator 320, a first reliability data generator 330, a second reliability data generator 340, and a data output unit 350.

The data generating apparatus 200 generates virtual sensing data 11, virtual sensing data 12 (corresponding to the above-described second virtual sensing data), reliability data 13 (also referred to as "first reliability data") and reliability data 14 (also referred to as "second reliability data"), and outputs these data.

Note that the data generating apparatus 200 may not generate a part of the virtual sensing data 11, virtual sensing data 12, reliability data 13 and reliability data 14. When the virtual sensing data 11 is not generated, the first virtual sensing data generator 310 can be omitted. When the virtual sensing data 12 is not generated, the second virtual sensing data generator 320 can be omitted. When the reliability data 13 is not generated, the first reliability data generator 330 can be omitted. When the reliability data 14 is not generated, the second reliability data generator 340 can be omitted.

The virtual sensing data 11 and virtual sensing data 12 can be utilized in various business fields, for example, in marketing activities. In addition, the reliability data 13 and reliability data 14 can be utilized in preprocesses such as filtering, cleansing and normalization of sensing data, which are executed prior to data analysis of the sensing data. Besides, by utilizing the reliability data 13 and reliability data 14, the rearrangement of sensing data, for example, the generation of a table, becomes easier. Furthermore, by utilizing the reliability data 13 and reliability data 14, the detection of an event is enabled.

The virtual sensing data 11, virtual sensing data 12, reliability data 13 and reliability data 14 may be provided directly from the data generating apparatus 200 to the user side, or may be provided to the user side through a data distribution system which will be described below. In any case, the data generating apparatus 200 may be assembled in a (physical) sensor apparatus, a server or an application device, or may be constituted as an information processing apparatus that is independent from these.

As described above, the data generating apparatus 200 may be assembled in any one of various apparatuses which constitute data distribution markets. Specifically, the data generating apparatus 200 may be assembled in a sensing apparatus which generates physical sensing data, may be assembled in a communication device (e.g. a smartphone, any kind of PC, etc.) which relays physical sensing data to a platform server, a matching server or a user-side application device, or may be assembled in a platform server, a matching server or a user-side application device. In this case, the data generating apparatus 200 can use hardware of an apparatus in which the data generating apparatus 200 is assembled. Alternatively, the data generating apparatus 200 may be constituted as an information processing apparatus which is independent from these devices.

Figure 4:
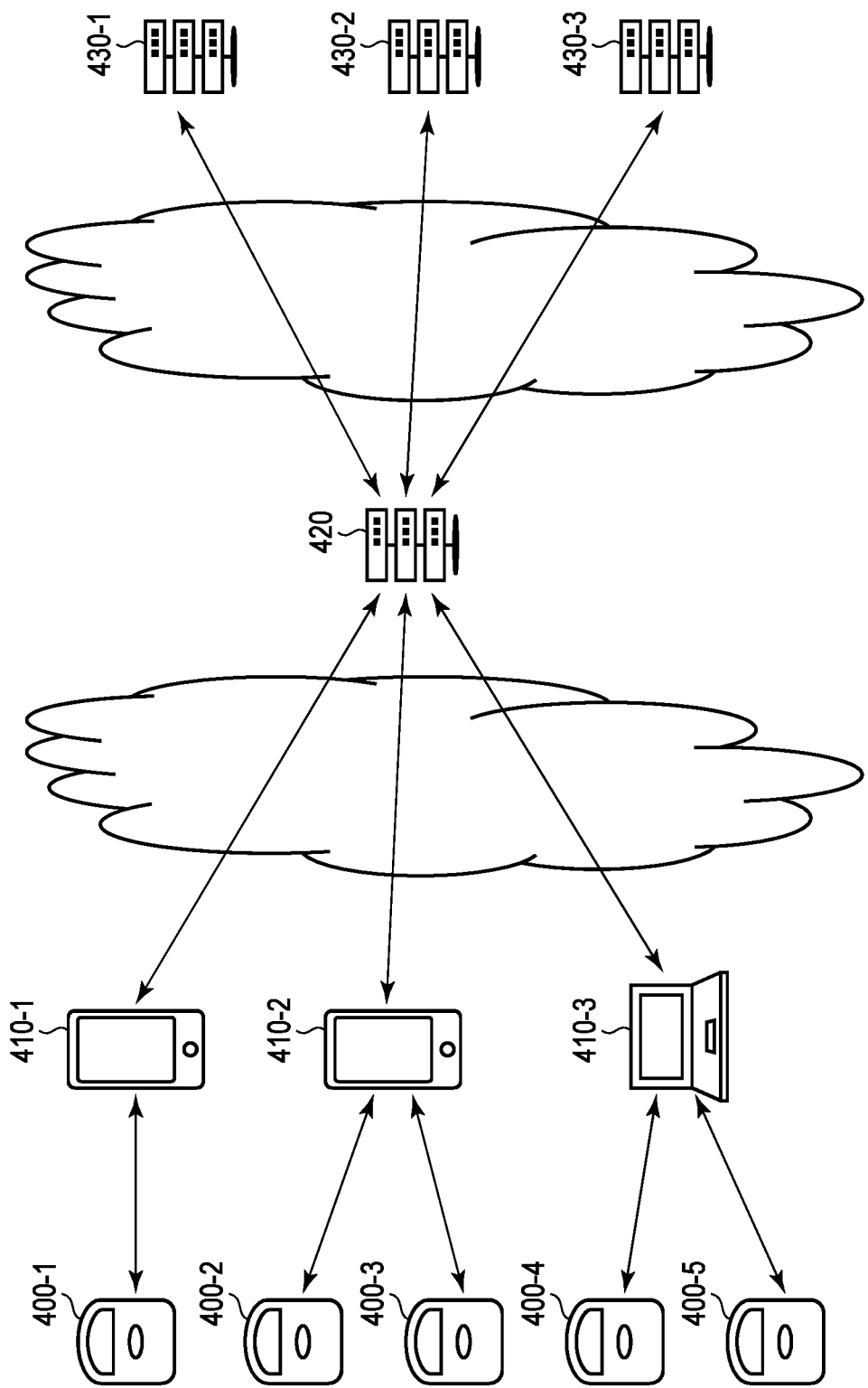
FIG. 4 is a view exemplarily illustrating a data distribution system including the data generating apparatus according to the embodiment.

FIG. 4 schematically illustrates an example of a data distribution system in which the data generating apparatus 200 is included. The data distribution system includes sensing apparatuses 400-1, . . . , 400-5, communication devices 410-1, . . . , 410-3, a server 420, and application devices 430-1, . . . , 430-3. Note that the numbers of respective apparatuses, which are illustrated in FIG. 4, are merely examples. Thus, the description will be continued without especially distinguishing suffix numbers added to the reference signs of the apparatuses.

The sensing apparatus 400 includes a sensor which measures a physical quantity; a communication I/F which sends physical sensing data that is acquired by digitizing a measurement value of the sensor; and a controller which controls the sensor and the communication I/F. The sensing apparatus 400 connects to the communication device 410 by using communication technology such as WBAN (Wireless Body Area Network) or WPAN (Wireless Personal Area Network). The sensing apparatus 400 transmits physical sensing data (and, if any, virtual sensing data and/or reliability data) to the communication device 410.

The communication device 410 may be, for example, a smartphone or any kind of PC. The communication device 410 includes a communication I/F which executes transmission and reception of data, and a controller which controls the communication I/F. The communication device 410 receives the physical sensing data from the sensing apparatus 400. Then, the communication device 410 transmits the physical sensing data (and, if any, virtual sensing data and/or reliability data) to the server 420 via a gateway or a base station, by using communication technology such as WLAN, WMAN (Wireless Metropolitan Area Network), or WWAN (Wireless Wide Area Network). Besides, the communication device 410 may send to the server 420 a supplier-side data catalogue (DC) for performing buying-and-selling matching of sensing data.

The supplier-side data catalogue can include various items such as the number of the data catalogue, the supplier of sensing data, the name of sensing data, the date/time of measurement and the place of measurement of sensing data, an observation target and characteristic, event data specifications, the term of supply of sensing data, a transaction condition, and a data buying-and-selling condition.

The application device 430 may be, for example, a smartphone or any kind of PC or server. The application device 430 includes a communication I/F which executes transmission and reception of data, and a controller which controls the communication I/F. The application device 430 may send to the server 420 a user-side data catalogue (DC) for performing buying-and-selling matching of sensing data.

Here, the user-side data catalogue can include various items such as the identification information of the data catalogue, the user of sensing data, the name of sensing data, the date/time of measurement and the place of measurement of sensing data, an observation target and characteristic, event data specifications, the term of use of sensing data, a transaction condition, and a data buying-and-selling condition.

The application device 430 receives from the server 420 physical sensing data (and, if any, virtual sensing data and/or reliability data) which is purchased through the buying-and-selling matching. In addition, the application device 430 processes the physical sensing data (and, if any, virtual sensing data and/or reliability data) in accordance with individual purposes of utilization.

The server 420 includes a communication I/F which executes transmission and reception of data, a memory which stores data, and a controller which controls the memory and the communication I/F and performs buying-and-selling matching which will be described later. The server 420 receives physical sensing data from the communication device 410. In addition, the server 420 accumulates the physical sensing data (and, if any, virtual sensing data and/or reliability data).

In addition, the server 420acquires and stores the supplier-side data catalogue and the user-side data catalogue, and performs buying-and-selling matching by comparing both. The supplier-side data catalogue and the user-side data catalogue may be acquired by receiving them from the communication device 410, application device 430, or other communication devices, or may be acquired by other means such as a direct input. When the server 420 discovers the supplier-side data catalogue which matches with the user-side data catalogue, the server 420 supplies the physical sensing data (and, if any, virtual sensing data and/or reliability data), which corresponds to the supplier-side data catalogue, to the user side. Specifically, the server 420 transmits the physical sensing data (and, if any, virtual sensing data and/or reliability data) to the application device 430.

Note that the mode of the data distribution system is not limited to the example of FIG. 4. For example, the sensing apparatus 400 may directly transmit the physical sensing data, virtual sensing data, and/or reliability data to the server 420 or application device 430 via a gateway or a base station, without intervention of the communication device 410, by using communication technology such as WLAN, WMAN or WWAN.

In addition, the server 420 may not transmit the physical sensing data, virtual sensing data and/or reliability data immediately after the establishment of the buying-and-selling matching, and may once request approval of buying-and-selling from the supplier side or the user side. Besides, the server 420 may not transmit the physical sensing data, virtual sensing data and/or reliability data to the application device 430, and may execute data flow control. For example, the server 420 may instruct the sensing apparatus 400 or communication device 410 to transmit the physical sensing data, virtual sensing data and/or reliability data to the application device 430 which purchased the physical sensing data, virtual sensing data and/or reliability data. Alternatively, the server 420 may be divided into a server which performs buying-and-selling matching and a server which accumulates the physical sensing data, virtual sensing data and/or reliability data.

Further, the server 420 may not directly perform buying-and-selling matching, and may entrust buying-and-selling matching to a matching server (not shown). This matching server may realize a distribution market which does not distinguish platforms, by performing buying-and-selling matching across the platforms, or may realize a distribution market which does not distinguish origins of data, by adding the physical sensing data, virtual sensing data and/or reliability data (e.g. data collected from the sensing apparatus 400 which is personally installed), which is supplied without intervention of platforms, to the targets of buying-and-selling matching.

Hereinafter, the individual structural elements of the data generating apparatus 200 illustrated in FIG. 3 will be described.

The physical sensing data acquisition unit 301 acquires physical sensing data, and sends the physical sensing data to the first virtual sensing data generator 310 and second virtual sensing data generator 320. The physical sensing data may include, for example, illuminance data, sound pressure data, acceleration data, gas data, atmospheric pressure data, temperature data, and humidity data. The physical sensing data may be raw data, or processed data of the raw data, or may be a combination thereof.

When the data generating apparatus 200 is assembled in the sensing apparatus 400, the physical sensing data acquisition unit 301 may acquire physical sensing data from the sensor included in the sensing apparatus 400. On the other hand, when the data generating apparatus 200 is not assembled in the sensing apparatus 400, the physical sensing data acquisition unit 301 can acquire physical sensing data by receiving from an external apparatus the physical sensing data, the transmission source of which is the sensing apparatus 400. Note that it is not necessary that all of the physical sensing data be acquired from an identical sensing apparatus 400, and, for example, certain physical sensing data and other sensing data may be acquired from different sensing apparatuses 400.

The virtual sensing data acquisition unit 302 acquires virtual sensing data 15 (i.e. the first virtual sensing data) which is indicative of a primary determination result with respect to a situation, and sends the virtual sensing data 15 to the second virtual sensing data generator 320. The virtual sensing data 15 may be virtual sensing data which is generated by an external apparatus such as a host system, sensing apparatus 400, communication device 410, server 420 or application device 430, or may be virtual sensing data 11 generated by the first virtual sensing data generator 310.

Alternatively, the virtual sensing data acquisition unit 302 may acquire, as the virtual sensing data 15, the virtual sensing data 12 which is generated by the second virtual sensing data generator 320. For example, when the second virtual sensing data generator 320 repeatedly determines a given situation, it is assumed that the generated virtual sensing data 12 is repeatedly utilized. Specifically, the second virtual sensing data generator 320 may repeatedly utilize the virtual sensing data 12 and may determine the situation in a stepwise manner from a simple or general situation item to a complex or detailed situation item.

In addition, the virtual sensing data acquisition unit 302 acquires virtual sensing data 16 and virtual sensing data 17 for the first reliability data generator 330 and second reliability data generator 340, and sends the virtual sensing data 16 and virtual sensing data 17. The virtual sensing data 16 and virtual sensing data 17 may be identical or different. Besides, the virtual sensing data 16 and virtual sensing data 17 may be identical to or different from the virtual sensing data 15. Specifically, the virtual sensing data 16 and virtual sensing data 17 may be the virtual sensing data 12 (i.e. second virtual sensing data) which is ultimately generated by the second virtual sensing data generator 320.

The criterion acquisition unit 303 acquires criteria which are preset for situation items. The criteria include a criterion (hereinafter, also referred to as "first criterion") which is applied in order to generate the virtual sensing data 11, and a criterion (hereinafter, also referred to as "second criterion") which is applied in order to generate the virtual sensing data 12. Criterion acquisition units may be individually provided for the first criterion and the second criterion. The first criteria and the second criteria may be partly common, or may be completely different. The criterion acquisition unit 303 sends the first criterion to the first virtual sensing data generator 310, and sends the second criterion to the second virtual sensing data generator 320.

The criterion acquisition unit 303 may acquire the criteria by reading out criteria stored in a criterion memory (not shown in FIG. 3) which is built in the data generating apparatus 200, or may acquire the criteria by receiving criteria which are transmitted from an external apparatus.

The calculation criterion acquisition unit 304 acquires calculation criteria which are preset for reliability items. The calculation criteria include a criterion (hereinafter, also referred to as "first calculation criterion") which is applied in order to generate the reliability data 13, and a criterion (hereinafter, also referred to as "second calculation criterion") which is applied in order to generate the reliability data 14. Therefore, calculation criterion acquisition units may be individually provided for the first calculation criterion and the second calculation criterion. The calculation criterion acquisition unit 304 sends the first calculation criterion to the first reliability data generator 330, and sends the second calculation criterion to the second reliability data generator 340.

The calculation criterion acquisition unit 304 may acquire the calculation criteria by reading out calculation criteria stored in a calculation criterion memory (not shown in FIG. 3) which is built in the data generating apparatus 200, or may acquire the calculation criteria by receiving calculation criteria which are transmitted from an external apparatus.

The operating condition data acquisition unit 305 acquires operating condition data which is indicative of an operating condition of the physical sensor that measured a physical quantity represented by physical sensing data, and sends the operating condition data to the second reliability data generator 340. The operating condition data may include, for example, sampling frequencies, precisions, resolutions, dynamic ranges, sensitivities, etc. of various kinds of physical sensors.

When the data generating apparatus 200 is assembled in the sensing apparatus 400, the operating condition data acquisition unit 305 may acquire operating condition data by reading out the operating condition data from an operating condition data memory (not shown in FIG. 3) which is built in the sensing apparatus 400. On the other hand, when the data generating apparatus 200 is not assembled in the sensing apparatus 400, the operating condition data acquisition unit 305 can acquire operating condition data by receiving from an external apparatus the operating condition data, the transmission source of which is the sensing apparatus 400.

The first virtual sensing data generator 310 receives physical sensing data from the physical sensing data acquisition unit 301, and receives a criterion (first criterion) from the criterion acquisition unit 303. Using the criterion, the first virtual sensing data generator 310 determines the situation, based on the physical sensing data, and generates the virtual sensing data 11. The virtual sensing data 11 may indicate, for example, a determination result relating to the situation with respect to each situation item. The first virtual sensing data generator 310 sends the virtual sensing data 11 to the data output unit 350.

Although a concrete generation method of the virtual sensing data 11 will be described later, for example, when the criterion that is set for a certain situation item includes a criterion value for raw data of physical sensing data or processed data of the raw data, the first virtual sensing data generator 310 may perform determination with respect to the situation item by preparing raw data, or processed data thereof, of physical sensing data corresponding to the criterion value, and comparing both. Alternatively, when the criterion is a pre-trained model for performing determination with respect to one or a plurality of situation items, the first virtual sensing data generator 310 may perform determination by setting the pre-trained model in a neural network, preparing raw data, or processed data thereof, of physical sensing data which is set as input data of the neural network, and giving the prepared data to the neural network.

The second virtual sensing data generator 320 receives physical sensing data from the physical sensing data acquisition unit 301, receives virtual sensing data 15 from the virtual sensing data acquisition unit 302, and receives a criterion (second criterion) from the criterion acquisition unit 303. When a plurality of criteria are set for a given situation item, the second virtual sensing data generator 320 selects one of the criteria, which corresponds to the virtual sensing data 15. In addition, using the selected criterion, the second virtual sensing data generator 320 determines the situation, based on the physical sensing data, and generates the virtual sensing data 12. The virtual sensing data 12 may indicate, for example, a determination result relating to the situation with respect to each situation item. The second virtual sensing data generator 320 sends the virtual sensing data 12 to the data output unit 350.

Although a concrete generation method of the virtual sensing data 12 will be described later, for example, when the criterion that is set for a certain situation item includes a criterion value for raw data or, processed data thereof, of physical sensing data, the second virtual sensing data generator 320 may perform determination with respect to the situation item by preparing raw data, or processed data thereof, of physical sensing data corresponding to the criterion value, and comparing both. Alternatively, when the criterion is a pre-trained model for performing determination with respect to one or a plurality of situation items, the second virtual sensing data generator 320 may perform determination by setting the pre-trained model in a neural network, preparing raw data, or processed data thereof, of physical sensing data which is set as input data of the neural network, and giving the prepared data to the neural network.

The first reliability data generator 330 receives virtual sensing data 16 from the virtual sensing data acquisition unit 302, and receives a calculation criterion (first calculation criterion) from the calculation criterion acquisition unit 304. Using the calculation criterion, the first reliability data generator 330 calculates the reliability of sensing data, based on the virtual sensing data 16, and generates reliability data 13. The reliability data 13 may indicate, for example, the reliability of physical sensing data with respect to each of factors which influence the reliability of sensing data. The first reliability data generator 330 sends the reliability data 13 to the data output unit 350.

Although a concrete generation method of the reliability data 13 will be described later, for example, when the calculation criterion includes a weighting factor (a contribution rate filter coefficient) which is allocated to each of the situation items included in the virtual sensing data 16, the first reliability data generator 330 may calculate a weighted sum by multiplying the value of each situation item in the virtual sensing data 16 by the weighting factor allocated to the situation item, and may calculate the reliability of sensing data, based on the weighted sum. Alternatively, when the calculation criterion is a pre-trained model for calculating the reliability with respect to one or a plurality of situation items, the first reliability data generator 330 may calculate the reliability by setting the pre-trained model in a neural network, preparing a value of the virtual sensing data 16, which is input to the neural network, and giving the prepared data to the neural network.

The second reliability data generator 340 receives virtual sensing data 17 from the virtual sensing data acquisition unit 302, receives a calculation criterion (second calculation criterion) from the calculation criterion acquisition unit 304, and receives operating condition data from the operating condition data acquisition unit 305. When a plurality of calculation criteria are set for a given reliability item, the second reliability data generator 340 selects one of the calculation criteria, which corresponds to the virtual sensing data 17. Then, using the selected calculation criterion, the second reliability data generator 340 calculates the reliability of sensing data, based on the operating condition data, and generates the reliability data 14. The reliability data 14 may indicate, for example, the reliability of physical sensing data with respect to noise, the physical sensing data being generated by the physical sensor which operates according to the operating condition indicated by the operating condition data (under the situation indicated by the virtual sensing data 17). The second reliability data generator 340 sends the reliability data 14 to the data output unit 350.

Although a concrete generation method of the reliability data 14 will be described later, for example, when a calculation criterion selected for a certain reliability item includes a criterion value for operating condition data, the second reliability data generator 340 may calculate the reliability for the reliability item by preparing a value of the operating condition data corresponding to the criterion value, and comparing both. Alternatively, when the calculation criterion is a pre-trained model for calculating the reliability with respect to one or a plurality of situation items, the second reliability data generator 340 may calculate the reliability by setting the pre-trained model in a neural network, preparing a value of the operating condition data, which is input to the neural network, and giving the prepared data to the neural network.

The data output unit 350 receives the virtual sensing data 11 from the first virtual sensing data generator 310, receives the virtual sensing data 12 from the second virtual sensing data generator 320, receives the reliability data 13 from the first reliability data generator 330, and receives the reliability data 14 from the second reliability data generator 340. The data output unit 350 outputs the received data to the outside of the data generating apparatus 200. In addition, the data output unit 350 may form data, or may control the output timing of data.

Hereinafter, referring to FIG. 5 to FIG. 45, the first virtual sensing data generator 310 will further be described.

As illustrated in FIG. 5, the first virtual sensing data generator 310 includes a situation determination unit 311. The situation determination unit 311 receives the physical sensing data from the physical sensing data acquisition unit 301, and receives the criterion (first criterion) from the criterion acquisition unit 303. Using the criterion, the condition determination unit 311 determines the situation, based on the physical sensing data, and generates the virtual sensing data 11. The situation determination unit 311 sends the virtual sensing data 11 to the data output unit 350.

Situation items, which may be included in the virtual sensing data 11, can be rearranged into some middle items, for example, as illustrated in FIG. 6 to FIG. 10. Note that situation items illustrated in FIG. 6 to FIG. 10 are merely examples, and situation items different from these may be used. In addition, the rearrangement of middle items illustrated here is merely an example, and there is room for interpreting a situation item, which is assumed to belong to a certain middle item, as belonging to another middle item, and rearrangement using different middle items is possible, and, in the first place, the rearrangement using middle items may not be performed.

FIG. 6 illustrates situation items belonging to a middle item "situation relating to person", and physical sensing data that is used to perform determination with respect to the situation items. FIG. 7 illustrates situation items belonging to a middle item "situation relating to nature", and physical sensing data that is used to perform determination with respect to the situation items. FIG. 8 illustrates situation items belonging to a middle item "operational situation of peripheral device", and physical sensing data that is used to perform determination with respect to the situation items. FIG. 9 illustrates situation items belonging to a middle item "life situation of person", and physical sensing data that is used to perform determination with respect to the situation items. FIG. 10 illustrates situation items belonging to a middle item "situation relating to installation space of physical sensor", and physical sensing data that is used to perform determination with respect to the situation items.

Note that in FIG. 6 to FIG. 10, physical sensing data listed in the column of the physical sensing data is not limited to raw data, and may include processed data thereof. Here, examples of the processed data may include a statistics value of raw data, a frequency spectrum generated by applying Fourier transform to raw data, a degree of risk of heatstroke calculated from raw data of temperature data and humidity data, and a seismic intensity calculated from raw data of acceleration. Similarly, the physical sensing data listed in the column of physical sensing data is merely exemplarily illustrated.

For example, it is assumed that the situation determination unit 311 acquired a determination chart illustrated in FIG. 12 as a criterion with respect to a situation item "cooking". Here, the determination chart is, for example, a table of criterion values used for determination. The criterion value can be designed, for example, by analyzing raw data, or processed data thereof, of physical sensing data generated under a situation corresponding to a situation item that is a target of the criterion, and raw data, or processed data thereof, of physical sensing data generated not under this situation.

The situation determination unit 311 may prepare, as a data chart illustrated in FIG. 11, raw data, or processed data thereof, of at least physical sensing data whose criterion values are determined in FIG. 12 (i.e. physical sensing data used for determination with respect to the situation item "cooking"). Here, the data chart is, for example, a table of raw data, or processed data thereof, of physical sensing data used for determination. Note that when the physical sensing data does not include processed data of raw data, the situation determination unit 311 may generate necessary processed data.

The situation determination unit 311 compares the data chart of FIG. 11 and the determination chart of FIG. 12, and obtains a comparison result illustrated in FIG. 13. In FIG. 13, "∘" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

The situation determination unit 311 converts, for example, "∘" and "x" to "1 (true)" and "0 (false)" or vice versa, and sets a value of the situation item by substituting the converted value in a logical expression or a relational expression, which is set as a part of the criterion. The value of the situation item may be set as a binary value, for example, "1 (true)" or "0 (false)", or as a multi-value of 3 or more, such as a probability value, a percentage or a score.

Note that, as described above, the criterion may include a pre-trained model. When the criterion includes a pre-trained model, the situation determination unit 311 may perform determination by setting the pre-trained model in a neural network, preparing raw data of physical sensing data, which is set as input data of the neural network, or processed data of the raw data, and giving the prepared data to the neural network.

The pre-trained model may be created by performing machine learning which determines the situation from physical sensing data for learning. For example, a pre-trained model for performing determination with respect to the situation item "cooking" can be created by performing supervised learning by using, as learning data with a correct answer label, raw data, and/or processed data thereof, of each physical sensing data for leaning which was generated while a person was cooking in the surrounding of the physical sensor. Besides, raw data, and/or processed data thereof, of each physical sensing data for leaning, which was generated while a person was not cooking in the surrounding of the physical sensor, may be used as learning data with an incorrect answer label.

Hereinafter, referring to FIG. 14 to FIG. 45, concrete examples of the determination with respect to various situation items will be described. In all concrete examples described here, the determination using criterion values is performed, but the determination using the pre-trained model, as described above, may be performed as appropriate.

Figure 14:
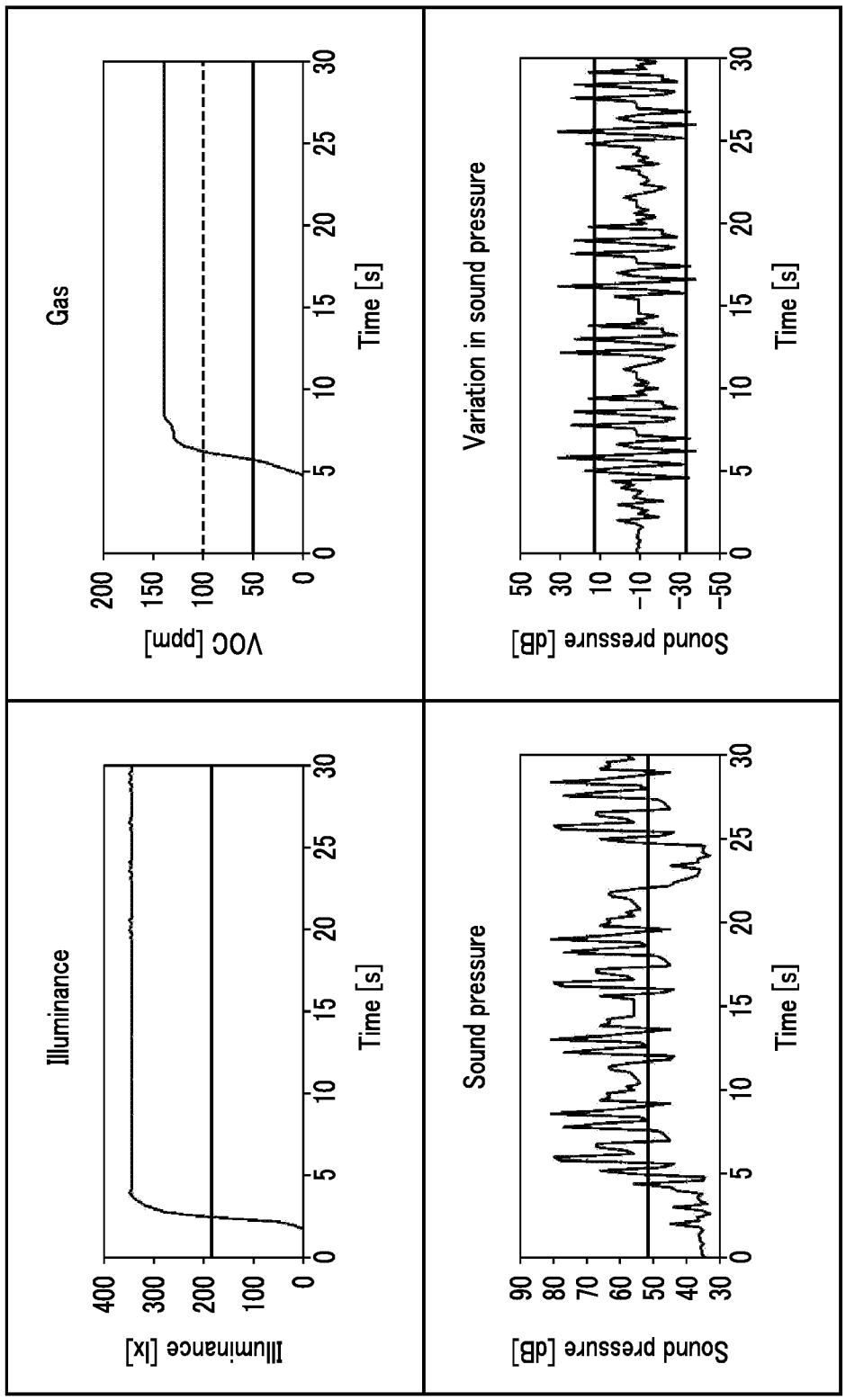
FIG. 14 is a graph exemplarily illustrating raw data, and processed data thereof, of physical sensing data used for determination with respect to situation items "presence of person" and "number of persons".

FIG. 14 illustrates raw data of physical sensing data "illuminance" and "gas" used for performing determination with respect to situation items "presence of person" and "number of persons", and raw data of "sound pressure" and processed data thereof. As described above, the situation item "presence of person" may deal with information as to whether a person is present in the surrounding of the physical sensor.

For example, if a person is present in the surrounding (indoors) of the physical sensor, there is a possibility that the person turns on an illumination for the purpose of an activity. Thus, as regards the raw data of the physical sensing data "illuminance", a value for distinguishing ON/OFF of the illumination, for example, "200 [lx]", may be set as a criterion value.

If a person is present in the surrounding of the physical sensor, there is a possibility that the concentration of a volatile organic compound (VOC) or $CO_2$ in the surrounding increases due to the respiration of the person. Thus, as regards the raw data of the physical sensing data "gas", a value for distinguishing the case where a person is present and the case where a person is not present, for example, "50 [ppm]", may be set as a criterion value. Further, it is possible that as the number of persons existing in the surrounding of the physical sensor becomes larger, the concentration of the VOC or $CO_2$ in the surrounding becomes higher due to the respiration of the persons. Thus, as regards the situation item "number of persons", a value for distinguishing the case where plural persons are present in the surrounding of the physical sensor and the case where plural persons are not present, for example, "100 [ppm]", may be set as a criterion value.

If a person is present in the surrounding of the physical sensor, there is a possibility that a sound pressure due to speaking voice or activity sound is detected. Thus, the situation determination unit 311 may prepare processed data (hereinafter, also referred to simply as "ratio") which is acquired by calculating a time ratio in which raw data of physical sensing data "sound pressure" exceeds 50 [dB], over a predetermined analysis period, for example, for most recent 30 seconds. As regards this ratio, a value for distinguishing the case where a person is present and the case where a person is not present, for example, "50 [%]", may be set as a criterion value. Further, it is possible that as the number of persons existing in the surrounding of the physical sensor becomes larger, the ratio becomes higher. Thus, as regards the situation item "number of persons", a value for distinguishing the case where three or more persons are present in the surrounding of the physical sensor and the case where three or more persons are not present, for example, "70 [%]", may be set as a criterion value.

Similarly, a variation of physical sensing data "sound pressure" (e.g. a difference from a value one second before or other predetermined seconds before) can also be used for determination. Specifically, the situation determination unit 311 may prepare processed data (hereinafter, also referred to simply as "variation number") which is acquired by calculating a variation number, by which a variation of raw data of physical sensing data "sound pressure" exceeds "±20 [dB]", for example, for most recent 30 seconds. As regards the variation number, a value for distinguishing the case where a person is present and the case where a person is not present, for example, "5 [times]", may be set as a criterion value. Further, it is possible that as the number of persons existing in the surrounding of the physical sensor becomes larger, the variation number becomes greater. Thus, as regards the situation item "number of persons", a value for distinguishing the case where three or more persons are present in the surrounding of the physical sensor and the case where three or more persons are not present, for example, "10 [times]", may be set as a criterion value.

Besides, there is a possibility that more exact determination can be performed with respect to the situation item "presence of person" or "number of persons", for example, by recognizing the vibration of the floor due to walking of a person, based on physical sensing data "acceleration", or by recognizing a rise in room temperature due to an increase in the number of persons, based on physical sensing data "temperature".

It is assumed that the situation determination unit 311 acquired a determination chart illustrated in FIG. 16 as a criterion with respect to the situation item "presence of person". The situation determination unit 311 prepares, as a data chart illustrated in FIG. 15, raw data, or processed data thereof, of at least physical sensing data whose criterion values are determined in FIG. 16.

The situation determination unit 311 compares the data chart of FIG. 15 and the determination chart of FIG. 16, and obtains a comparison result illustrated in FIG. 17. In FIG. 17, "○" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

In this example, all of the illuminance, VOC (or $CO_2$) concentration, and the ratio and the variation number of sound pressure are below criterion values. Therefore, the situation determination unit 311 may set, for example, "0 (false)", which indicates that a person is not present in the surrounding of the physical sensor, for the value of the situation item "presence of person".

Similarly, it is assumed that the situation determination unit 311 acquired a determination chart illustrated, for example, in FIG. 19 as a criterion with respect to the situation item "number of persons". Note that the determination chart of FIG. 19 is assumed to be used in order to determine whether three or more persons are present in the surrounding of the physical sensor. The situation determination unit 311 prepares, as a data chart illustrated in FIG. 18, raw data, or processed data thereof, of at least physical sensing data whose criterion values are determined in FIG. 19.

The situation determination unit 311 compares the data chart of FIG. 18 and the determination chart of FIG. 19, and obtains a comparison result illustrated in FIG. 20. In FIG. 20, "○" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

In this example, all of the illuminance, VOC (or $CO_2$) concentration, and the ratio and the variation number of sound pressure are equal to or greater than the criterion values. Therefore, the situation determination unit 311 may set, for example, "1 (true)", which indicates that three or more persons are present in the surrounding of the physical sensor, for the value of the situation item "number of persons".

FIG. 21 illustrates raw data, and processed data thereof, of physical sensing data "acceleration" and "sound pressure" used for performing determination with respect to a situation item "door opening/closing". The situation item "door opening/closing" may deal with information as to whether door opening/closing occurred in the surrounding of the physical sensor, for example, within most recent 30 seconds.

For example, if door opening/closing occurs in the surrounding of the physical sensor, there is a possibility that significant vibration can be detected at a time of opening the door and at a time of closing the door. Thus, the situation determination unit 311 may search for peaks exceeding "50 [mg]" with respect to the raw data of the physical sensing data "acceleration", for example, for most recent 30 seconds, and may prepare processed data (hereinafter, also referred to simply as "raw value number") which is acquired by calculating a maximum number of peaks falling within a region of freely selected 10 seconds of the 30 seconds. As regards the raw value number of the acceleration, a value for distinguishing the case where door opening/closing occurred and the case where door opening/closing did not occur, for example, "2 [times]", may be set. Here, the 10 seconds that is the length of the region is an estimated time needed from the opening to closing of the door, and can be changed as appropriate.

Similarly, a variation of raw data of the physical sensing data "acceleration" can also be used for determination. Specifically, the situation determination unit 311 may search for peaks exceeding "±15 [mg]" with respect to the variations of the raw data of the physical sensing data "acceleration", for example, for most recent 30 seconds, and may prepare processed data (hereinafter, also referred to simply as "variation number") which is acquired by calculating a maximum number of peaks falling within a region of freely selected 10 seconds of the 30 seconds. As regards the variation number of the acceleration, a value for distinguishing the case where door opening/closing occurred and the case where door opening/closing did not occur, for example, "4 [times]", may be set.

If door opening/closing occurs in the surrounding of the physical sensor, there is a possibility that significant sound pressure can be detected at a time of opening the door and at a time of closing the door. Thus, the situation determination unit 311 may search for peaks exceeding "50 [dB]" with respect to the raw data of the physical sensing data "sound pressure", for example, for most recent 30 seconds, and may prepare processed data (hereinafter, also referred to simply as "raw value number") which is acquired by calculating a maximum number of peaks falling within a region of freely selected 10 seconds of the 30 seconds. As regards the raw value number of the sound pressure, a value for distinguishing the case where door opening/closing occurred and the case where door opening/closing did not occur, for example, "2 [times]", may be set. In addition, as regards the raw data of the physical sensing data "sound pressure", "50 [dB]" may be set as a criterion value.

Similarly, a variation of raw data of the physical sensing data "sound pressure" can also be used for determination. Specifically, the situation determination unit 311 may search for peaks exceeding "±15 [dB]" with respect to the variations of the raw data of the physical sensing data "sound pressure", for example, for most recent 30 seconds, and may prepare processed data (hereinafter, also referred to simply as "variation number") which is acquired by calculating a maximum number of peaks falling within a region of freely selected 10 seconds of the 30 seconds. As regards the variation number of the sound pressure, a value for distinguishing the case where door opening/closing occurred and the case where door opening/closing did not occur, for example, "4 [times]", may be set as a criterion value.

Besides, there is a possibility that more exact determination can be performed with respect to the situation item "door opening/closing", for example, by recognizing a variation of atmospheric pressure due to flowing in/out of air due to the opening/closing of the door, based on physical sensing data "atmospheric pressure".

It is assumed that the situation determination unit 311 acquired a determination chart illustrated in FIG. 23 as a criterion with respect to the situation item "door opening/closing". The situation determination unit 311 prepares, as a data chart illustrated in FIG. 22, raw data, or processed data thereof, of at least physical sensing data whose criterion values are determined in FIG. 23.

The situation determination unit 311 compares the data chart of FIG. 22 and the determination chart of FIG. 23, and obtains a comparison result illustrated in FIG. 24. In FIG. 24, "○" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

In this example, all of the raw value number and variation number of the acceleration, and the raw data, raw value number and variation number of the sound pressure are equal to or greater than the criterion values. Therefore, the situation determination unit 311 may set, for example, "1 (true)", which indicates that door opening/closing occurred in the surrounding of the physical sensor, for the value of the situation item "door opening/closing".

Figure 25:
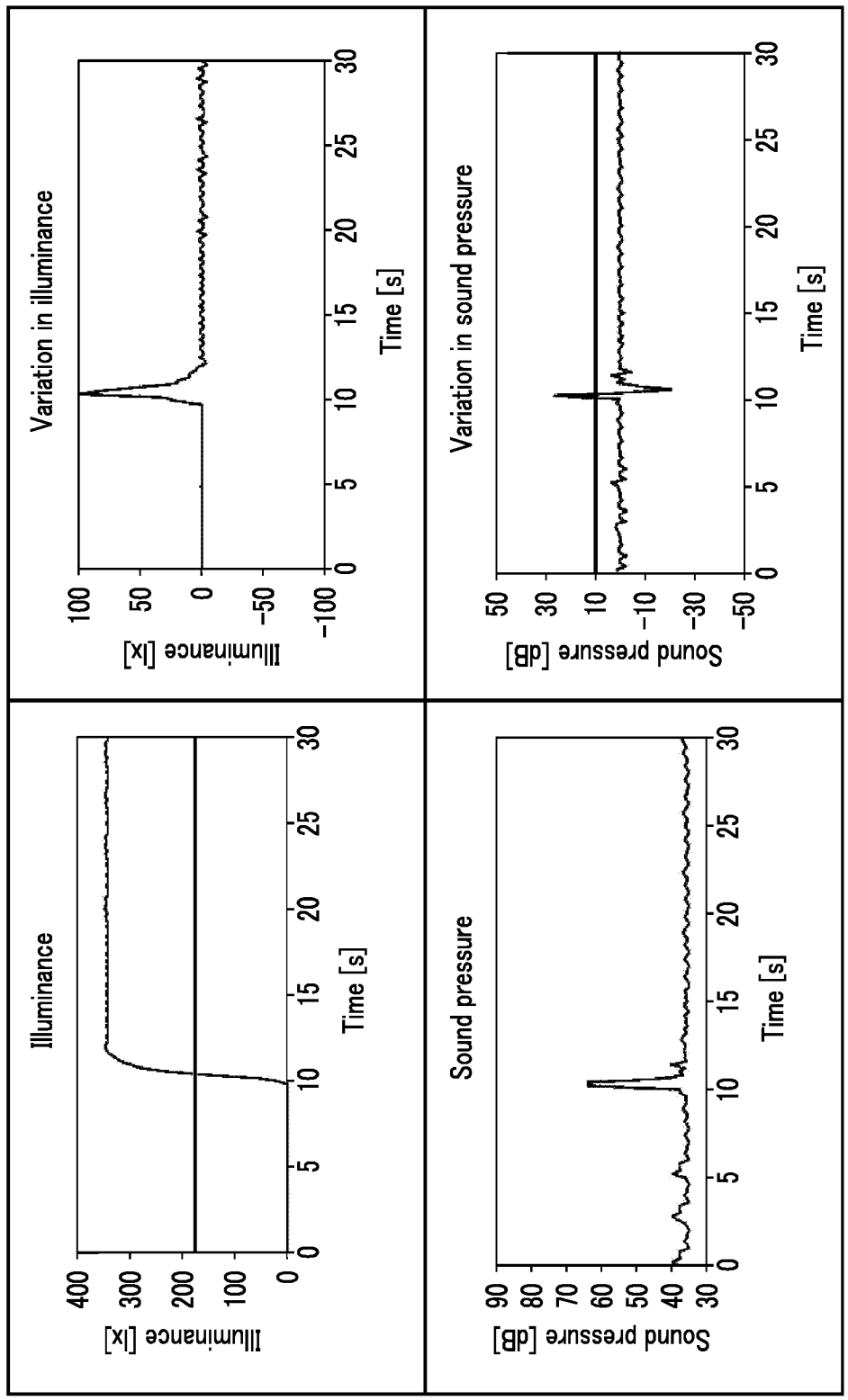
FIG. 25 is a graph exemplarily illustrating raw data, and processed data thereof, of physical sensing data used for determination with respect to a situation item "illumination".

FIG. 25 illustrates raw data, and processed data thereof, of physical sensing data "illumination" and "sound pressure" used for performing determination with respect to a situation item "illumination". The situation item "illumination" may deal with information of an operational situation of an illumination in the surrounding of the physical sensor.

If the illumination is in the ON state in the surrounding of the physical sensor, there is a possibility that the raw data of the physical sensing data "illumination" increases by the illumination light. Thus, as regards the raw data of the physical sensing data "illumination", a value for distinguishing ON/OFF of the illumination, for example, "200 [lx]", may be set as a criterion value.

In addition, if the illumination is switched from the OFF state to ON state in the surrounding of the physical sensor, there is a possibility that a sharp increase in illuminance occurs. Thus, the situation determination unit 311 can also use, for the determination, a variation (here, e.g. a maximum variation in one second) of raw data of physical sensing data "illuminance". As regards the variation of raw data of the physical sensing data "illuminance", for example, "50 [lx]" may be set as a criterion value.

If a switch operation sound occurs when the illumination is switched from the OFF state to ON state in the surrounding of the physical sensor, there is a possibility that significant sound pressure can be detected. Thus, the situation determination unit 311 may search for peaks exceeding "±15 [dB]" with respect to the variations of the raw data of the physical sensing data "sound pressure", for example, for most recent 30 seconds, and may prepare processed data (hereinafter, also referred to simply as "variation number") which is acquired by calculating a maximum number of peaks falling within a region of a freely selected one second of the 30 seconds. As regards the variation number of the sound pressure, a value for distinguishing the case where a switch operation of the illumination was performed and the case where a switch operation of the illumination was not performed, for example, "1 [time]", may be set as a criterion value. The one second, mentioned here, is an example of a time region for recognizing a vertical movement of a pulse-shaped sound pressure due to a switching operation sound.

It is assumed that the situation determination unit 311 acquired a determination chart illustrated in FIG. 27 as a criterion with respect to the situation item "illumination". The situation determination unit 311 prepares, as a data chart illustrated in FIG. 26, raw data, or processed data thereof, of at least physical sensing data whose criterion values are determined in FIG. 27.

The situation determination unit 311 compares the data chart of FIG. 26 and the determination chart of FIG. 27, and obtains a comparison result illustrated in FIG. 28. In FIG. 28, "○" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

In this example, all of the raw data and variation of the illuminance, and the variation number of the sound pressure are equal to or greater than the criterion values. Therefore, the situation determination unit 311 may set, for example, "1 (true)", which indicates that the illumination is in the ON state in the surrounding of the physical sensor or that the illumination was switched from the OFF state to ON state within most recent 30 seconds, for the value of the situation item "illuminance".

Figure 29:
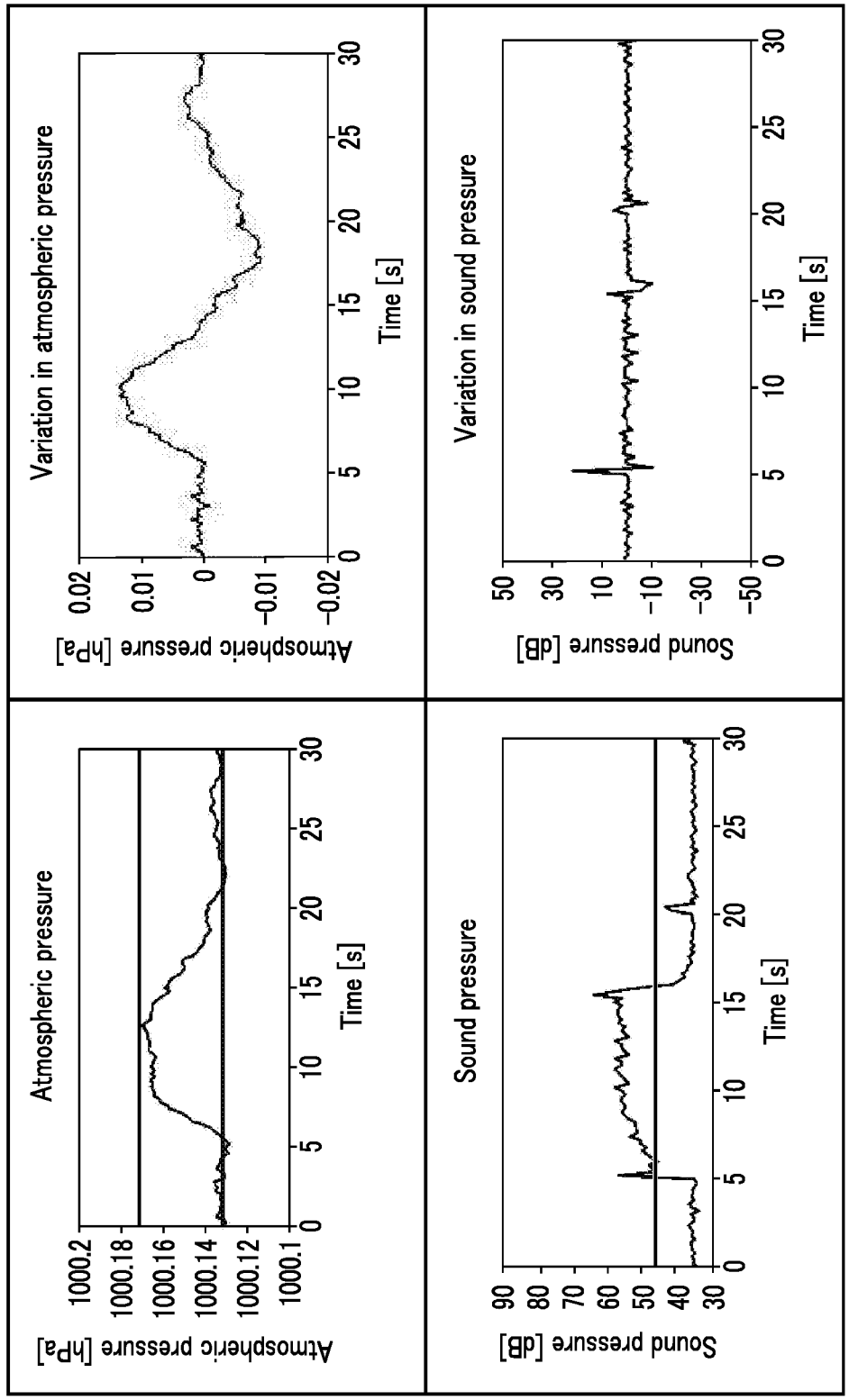
FIG. 29 is a graph exemplarily illustrating raw data, and processed data thereof, of physical sensing data used for determination with respect to a situation item "ventilating fan".

FIG. 29 illustrates raw data, and processed data thereof, of physical sensing data "atmospheric pressure" and "sound pressure" used for performing determination with respect to a situation item "ventilating fan". The situation item "ventilation fan" may deal with information of an operational situation of a ventilating fan in the surrounding of the physical sensor.

If the ventilating fan is in the ON state in the surrounding of the physical sensor, there is a possibility that raw data of the physical sensing data "atmospheric pressure" varies due to the operation of the ventilating fan. For example, if an air-supply-type ventilating fan operates, there is a possibility that an air flow into the indoors increases and the raw data of the physical sensing data "atmospheric pressure" increases. On the other hand, if an exhaust-type ventilating fan operates, there is a possibility that an air flow to the outdoors increases and the raw data of the physical sensing data "atmospheric pressure" decreases. Thus, the situation determination unit 311 can also use, for the determination, a variation (here, e.g. a difference from a value five seconds before) of raw data of physical sensing data "atmospheric pressure". As regards the variation of raw data of the physical sensing data "atmospheric pressure", for example, "0.02 hPa" may be set as a criterion value.

If the ventilating fan is in the ON state in the surrounding of the physical sensor, there is a possibility that the raw data of the physical sensing data "sound pressure" increases due to the operation sound of the ventilating fan. Thus, the situation determination unit 311 can also use a variation of raw data of physical sensing data "sound pressure" for the determination. As regards the variation of raw data of the physical sensing data "sound pressure", for example, "10 [dB]" may be set as a criterion value.

It is assumed that the situation determination unit 311 acquired a determination chart illustrated in FIG. 31 as a criterion with respect to the situation item "ventilating fan". The situation determination unit 311 prepares, as a data chart illustrated in FIG. 30, raw data, or processed data thereof, of at least physical sensing data whose criterion values are determined in FIG. 31.

The situation determination unit 311 compares the data chart of FIG. 30 and the determination chart of FIG. 31, and obtains a comparison result illustrated in FIG. 32. In FIG. 32, "○" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

In this example, all of the variation of the atmospheric pressure and the variation of the sound pressure are equal to or greater than the criterion values. Therefore, the situation determination unit 311 may set, for example, "1 (true)", which indicates that the ventilating fan is in the ON state in the surrounding of the physical sensor or that the ventilating fan was switched from the OFF state to ON state within most recent 30 seconds, for the value of the situation item "ventilating fan".

FIG. 33 illustrates raw data, and processed data thereof, of physical sensing data "sound pressure" used for performing determination with respect to a situation item "refrigerator". The situation item "refrigerator" may deal with information of an operational situation of a refrigerator in the surrounding of the physical sensor, for example, information as to whether the door opening/closing of the refrigerator occurred, for example, within most recent 30 seconds.

If door opening/closing of the refrigerator occurs in the surrounding of the physical sensor, there is a possibility that significant sound pressure can be detected at a time of opening the door of the refrigerator and at a time of closing the door of the refrigerator. Thus, the situation determination unit 311 may search for peaks exceeding "50 [dB]" with respect to the raw data of the physical sensing data "sound pressure", for example, for most recent 30 seconds, and may prepare processed data (hereinafter, also referred to simply as "raw value number") which is acquired by calculating a maximum number of peaks falling within a region of freely selected 10 seconds of the 30 seconds. As regards the raw value number of the sound pressure, a value for distinguishing the case where door opening/closing of the refrigerator occurred and the case where door opening/closing of the refrigerator did not occur, for example, "2 [times]", may be set as a criterion value.

Similarly, a variation of raw data of the physical sensing data "sound pressure" can also be used for determination. Specifically, the situation determination unit 311 may prepare processed data (hereinafter, also referred to simply as "variation number") which is acquired by counting the number of times by which the variation of the raw data of the physical sensing data "sound pressure" exceeds "+10 dB" and then lowers below "−10 [dB]" within 10 seconds therefrom. As regards the variation number of the sound pressure, a value for distinguishing the case where door opening/closing of the refrigerator occurred and the case where door opening/closing of the refrigerator did not occur, for example, "2 [times]", may be set as a criterion value.

Besides, there is a possibility that more exact determination can be performed with respect to the situation item "refrigerator", for example, by recognizing a decrease in temperature due to leakage of cold air in the refrigerator, based on physical sensing data "temperature".

It is assumed that the situation determination unit 311 acquired a determination chart illustrated in FIG. 35 as a criterion with respect to the situation item "refrigerator". The situation determination unit 311 prepares, as a data chart illustrated in FIG. 34, raw data, or processed data thereof, of at least physical sensing data whose criterion values are determined in FIG. 35.

The situation determination unit 311 compares the data chart of FIG. 34 and the determination chart of FIG. 35, and obtains a comparison result illustrated in FIG. 36. In FIG. 36, "○" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

In this example, each of the raw value number and variation number of the sound pressure is equal to or greater than the criterion values. Therefore, the situation determination unit 311 may set, for example, "1 (true)", which indicates that door opening/closing of the refrigerator occurred in the surrounding of the physical sensor, for the value of the situation item "refrigerator".

FIG. 37 illustrates raw data of physical sensing data "sound pressure" used for performing determination with respect to a situation item "microwave oven". The situation item "microwave oven" may deal with information of an operational situation of a microwave oven in the surrounding of the physical sensor.

Examples of the variation of sound pressure due to the operational situation of the microwave oven include a sharp variation of sound pressure at a time of door opening/closing (e.g. at about time [0:00:04] and about time [0:00:07] in FIG. 37), a continuous occurrence of sound pressure during operation, for example, with magnetron being a source of noise (at about time [0:00:09] and about time [0:00:24] in FIG. 37), and a sharp variation of sound pressure due to an operation end sound (e.g. at about [0:00:24] in FIG. 37). For example, the criterion value can be designed by taking a part or all of these factors into account.

Besides, there is a possibility that more exact determination can be performed with respect to the situation item "microwave oven", for example, by recognizing an increase in temperature and humidity due to leakage of steam from the microwave oven when a heated food or the like is taken out, based on the physical sensing data "temperature" and "humidity".

FIG. 38 illustrates raw data, and processed data thereof, of physical sensing data "illuminance", "sound pressure" and "atmospheric pressure" used for performing determination with respect to a situation item "cooking". The situation item "cooking" may deal with information as to whether a person is cooking in the surrounding of the physical sensor.

At a time of cooking, for example, a person turns on the illumination of a kitchen, takes out a foodstuff from the refrigerator, and turns on the ventilating fan. Therefore, by paying attention to these actions, it is possible to determine whether a person is cooking in the surrounding of the physical sensor. In particular, by adding the operational situation of the ventilating fan to the materials for determination, there is a possibility that, for example, a personal activity, such as an action of taking out a drink or storing a food, can be distinguished from cooking. Note that actions of a person at a time of cooking, described here, are merely examples, and criterion values may be designed by taking other various action patterns into account.

If the illumination is in the ON state, there is a possibility that the raw data of the physical sensing data "illumination" increases by the illumination light. Thus, as regards the raw data of the physical sensing data "illumination", a value for distinguishing ON/OFF of the illumination, for example, "50 [lx]", may be set as a criterion value.

In addition, if the illumination is switched from the OFF state to ON state in the surrounding of the physical sensor, there is a possibility that a sharp increase in illuminance occurs. Thus, the situation determination unit 311 can also use, for the determination, a variation (here, e.g. a maximum variation in one second, which is called "variation 1") of raw data of physical sensing data "illuminance". As regards the variation of raw data of the physical sensing data "illuminance", for example, "50 [lx]" may be set as a criterion value.

If a switch operation sound occurs when the illumination or the ventilating fan is switched from the OFF state to ON state in the surrounding of the physical sensor, there is a possibility that significant sound pressure can be detected. Thus, the situation determination unit 311 may prepare processed data (hereinafter, also referred to simply as "variation number 1") which is acquired by counting the number of times by which the variation of the raw data of the physical sensing data "sound pressure" exceeds "+10 dB" and then lowers below "−10 [dB]" within 1 second therefrom. As regards the variation number 1 of the sound pressure, a value for distinguishing the case where a switch operation of the illumination or the ventilating fan occurred and the case where a switch operation of the illumination or the ventilating fan did not occur, for example, "1 [time]", may be set as a criterion value.

If door opening/closing of the refrigerator occurs in the surrounding of the physical sensor, there is a possibility that significant sound pressure can be detected at a time of opening the door of the refrigerator and at a time of closing the door of the refrigerator. Thus, the situation determination unit 311 may search for peaks exceeding "50 [dB]" with respect to the raw data of the physical sensing data "sound pressure", for example, for most recent 60 seconds, and may prepare processed data (hereinafter, also referred to simply as "raw value number") which is acquired by calculating a maximum number of peaks falling within a region of freely selected 10 seconds of the 60 seconds. As regards the raw value number of the sound pressure, a value for distinguishing the case where door opening/closing of the refrigerator occurred and the case where door opening/closing of the refrigerator did not occur, for example, "2 [times]", may be set as a criterion value.

Similarly, a variation of raw data of the physical sensing data "sound pressure" can also be used for determination. Specifically, the situation determination unit 311 may prepare processed data (hereinafter, also referred to simply as "variation number 2") which is acquired by counting the number of times by which the variation of the raw data of the physical sensing data "sound pressure" exceeds "+10 dB" and then lowers below "−10 [dB]" within 10 seconds therefrom. As regards the variation number 2 of the sound pressure, a value for distinguishing the case where door opening/closing of the refrigerator occurred and the case where door opening/closing of the refrigerator did not occur, for example, "2 [times]", may be set as a criterion value.

If the ventilating fan is in the ON state in the surrounding of the physical sensor, there is a possibility that the raw data of the physical sensing data "sound pressure" increases due to the operation sound of the ventilating fan. Thus, the situation determination unit 311 can also use, for the determination, a variation (here, for example, a difference from a value five seconds before, which is called "variation 2") of raw data of physical sensing data "sound pressure". As regards the variation of raw data of the physical sensing data "sound pressure", for example, "10 [dB]" may be set as a criterion value.

If the ventilating fan is in the ON state in the surrounding of the physical sensor, there is a possibility that raw data of the physical sensing data "atmospheric pressure" varies due to the operation of the ventilating fan. For example, if an air-supply-type ventilating fan operates, there is a possibility that an air flow into the indoors increases and the raw data of the physical sensing data "atmospheric pressure" increases. On the other hand, if an exhaust-type ventilating fan operates, there is a possibility that an air flow to the outdoors increases and the raw data of the physical sensing data "atmospheric pressure" decreases. Thus, the situation determination unit 311 can also use a variation 2 of the raw data of physical sensing data "atmospheric pressure" for the determination. As regards the variation 2 of raw data of the physical sensing data "atmospheric pressure", for example, "0.02 hPa" may be set as a criterion value.

Besides, there is a possibility that more exact determination can be performed with respect to the situation item "cooking", for example, by recognizing a use situation of a heat source or a refrigerator, based on the physical sensing data "temperature", or an increase of the VOC (or $CO_2$) concentration due to combustion, based on the physical sensing data "gas".

It is assumed that the situation determination unit 311 acquired a determination chart illustrated in FIG. 40 as a criterion with respect to the situation item "cooking". The situation determination unit 311 prepares, as a data chart illustrated in FIG. 39, raw data, or processed data thereof, of at least physical sensing data whose criterion values are determined in FIG. 40.

The situation determination unit 311 compares the data chart of FIG. 39 and the determination chart of FIG. 40, and obtains a comparison result illustrated in FIG. 41. In FIG. 41, "○" is added when a value in a corresponding field of the data chart is equal to or greater than the criterion value determined in the determination chart, "x" is added when a value in a corresponding field of the data chart is less than the criterion value determined in the determination chart, and "-" is added when there is no criterion value determined in the determination chart.

In this example, the raw data of the illuminance, the variation number 1, raw value number, variation number 2 and variation 2 of the sound pressure, and the variation 2 of the atmospheric pressure are equal to or greater than the criterion values, but the variation 1 of the illuminance is less than the criterion value. Since the raw data of the illuminance is equal to or greater than the criterion value, and the variation 1 of the illuminance is less than the criterion value, it is assumed that although the illumination is currently in the ON state, a long time has passed since the illumination was switched from the OFF state to ON state, or that the illumination is currently in the OFF state since such a level of ambient light as to require no illumination can be obtained. Therefore, for example, it is possible to set up such a hypothesis that a person continues cooking, forgetting to turn off the illumination of the kitchen, or that a person is cooking in the daytime. Therefore, the situation determination unit 311 may set, for example, "1 (true)", which indicates that a person is cooking in the surrounding of the physical sensor, for the value of the situation item "cooking". However, the determination result described here is merely an example, and a different determination result may be obtained, depending on the criterion (e.g. the above-described logical expression or relational expression) of the situation item "cooking".

Figure 42:
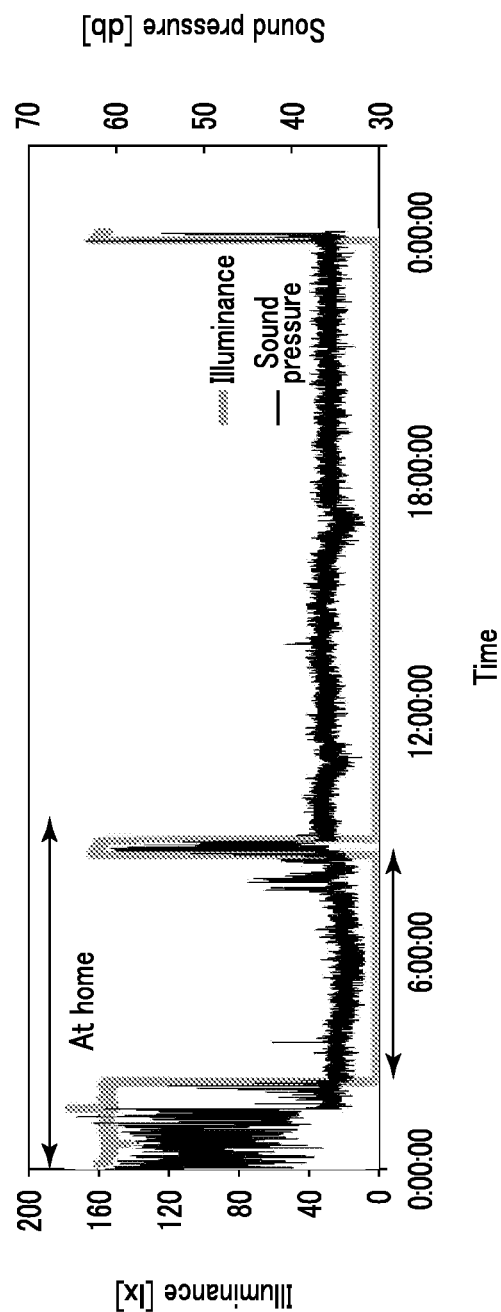
FIG. 42 is a graph exemplarily illustrating physical sensing data used for determination with respect to a situation item "sleep".

FIG. 42 illustrates raw data of physical sensing data "illuminance" and "sound pressure" used for performing determination with respect to a situation item "sleep". The situation item "sleep" may deal with information as to whether a person is sleeping in the surrounding of the physical sensor.

Note that the situation item "sleep" presupposes that a person is present in the surrounding of the physical sensor (e.g. being at home). Therefore, the situation determination unit 311 may perform determination with respect to the situation item "sleep", with respect to only the sensor data which is confirmed to be obtained under the situation in which a person is present in the surrounding of the physical sensor, by the value of the above-described situation item "presence of person", or by other means. This is also applicable to other situation items belonging to the "life situation of person" illustrated in FIG. 9.

For example, if a person is sleeping in the surrounding of the physical sensor, there is a possibility that the illumination is set in the OFF state. Thus, as regards the raw data of the physical sensing data "illuminance", a value indicating that the illumination is in the OFF state, for example, "0 [lx]", may be set as a criterion value. Although in all concrete examples described above, the criterion values are lower-limit values imposed on the raw data of the corresponding sensor data or the processed data thereof, the criterion values in this example correspond to not the lower-limit value but the upper-limit value.

If a person is sleeping in the surrounding of the physical sensor, sound may occur due to snoring, grinding of the teeth, sleep talking, body movement, or the like, but it is considered that the sound is silent, compared to a time when a person is in action. Thus, as regards the raw data of the physical sensing data "sound pressure", "35 [dB]" may be set as a criterion value.

It is assumed that the situation determination unit 311 acquired a determination chart illustrated in FIG. 44 as a criterion with respect to the situation item "sleep". The situation determination unit 311 prepares, as a data chart illustrated in FIG. 43, raw data, or processed data thereof, of at least physical sensing data whose criterion values are determined in FIG. 44.

The situation determination unit 311 compares the data chart of FIG. 43 and the determination chart of FIG. 44, and obtains a comparison result illustrated in FIG. 45. In FIG. 45, "○" is added when a value in a corresponding field of the data chart is equal to or less than the criterion value determined in the determination chart, "x" is added when a value in a corresponding field of the data chart is greater than the criterion value determined in the determination chart, and "-" is added when there is no criterion value determined in the determination chart.

In this example, each of the raw data of the illumination and the raw data of the sound pressure is equal to or less than the criterion value. Therefore, the situation determination unit 311 may set, for example, "1 (true)", which indicates that a person is sleeping in the surrounding of the physical sensor, for the value of the situation item "sleep".

Hereinafter, referring to FIG. 46 to FIG. 51, the second virtual sensing data generator 320 will further be described.

As illustrated in FIG. 46, the second virtual sensing data generator 320 includes a criterion selector 321, and a situation determination unit 322.

The criterion selector 321 receives the virtual sensing data 15 from the virtual sensing data acquisition unit 302, and receives the criterion (second criterion) from the criterion acquisition unit 303. When a plurality of criteria are determined for a given situation item, the criterion selector 321 selects one of the criteria, which corresponds to the virtual sensing data 15, and sends the selected criterion to the situation determination unit 322.

The situation determination unit 322 receives physical sensing data from the physical sensing data acquisition unit 301, and receives the selected criterion from the criterion selector 321. Using the selected criterion, the situation determination unit 322 determines the situation, based on the physical sensing data, and generates the virtual sensing data 12. The situation determination unit 322 sends the virtual sensing data 12 to the data output unit 350.

Like the virtual sensing data 11, situation items, which may be included in the virtual sensing data 12, may be rearranged into some middle items, for example, as illustrated in FIG. 6 to FIG. 10. Note that the situation items illustrated in FIG. 6 to FIG. 10 are merely examples, and situation items different from these may be used. In addition, the rearrangement of middle items illustrated here is merely an example, and there is room for interpreting a situation item, which is assumed to belong to a certain middle item, as belonging to another middle item, and rearrangement using different middle items is possible, and, in the first place, the rearrangement using middle items may not be performed.

Note that in FIG. 6 to FIG. 10, the physical sensing data listed in the column of the physical sensing data is not limited to raw data, and may include processed data thereof. Similarly, the physical sensing data listed in the column of physical sensing data is merely exemplarily illustrated.

For example, with respect to the situation item "cooking", it is assumed that the criterion selector 321 acquired, as determination charts, a criterion 1 which is used when the situation item "presence of person" is true, a criterion 2 which is used when the situation item "air-conditioning" is true, a criterion 3 which is used when the situation item "microwave oven" is true, and a criterion 4 which is used when the situation item "TV" is true. Here, the determination chart is, for example, a table of criterion values used for determination. The criterion value included in the criterion can be designed, for example, by analyzing (1) raw data, or processed data thereof, of physical sensing data generated under a situation corresponding to a situation item that is a target of the criterion, and (2) raw data, or processed data thereof, of physical sensing data generated under a situation which does not correspond to a situation item that is a target of the criterion. When the virtual sensing data 15 indicates that a person is present in the surrounding of the physical sensor, the criterion selector 321 may select the criterion 1.

The situation determination unit 322 may prepare, as a data chart, raw data, or processed data thereof, of at least physical sensing data whose criterion values are determined in the determination chart selected by the criterion selector 321. Here, the data chart is, for example, a table of raw data, or processed data thereof, of physical sensing data used for determination. Note that when the physical sensing data does not include processed data of raw data, the situation determination unit 322 may generate necessary processed data.

The situation determination unit 322 compares the data chart and the determination chart, and obtains a comparison result. The situation determination unit 322 converts the comparison result with respect to each criterion value to "1 (true)" or "0 (false)", or vice versa, and sets a value of the situation item by substituting the converted value in a logical expression or a relational expression, which is set as a part of the criterion. The value of the situation item may be set as a binary value, for example, "1 (true)" or "0 (false)", or as a multi-value of 3 or more, such as a probability value, a percentage or a score.

Note that, as described above, the criterion may include a pre-trained model. When the criterion includes a pre-trained model, the situation determination unit 322 may perform determination by setting the pre-trained model in a neural network, preparing raw data, or processed data thereof, of physical sensing data which is set as input data of the neural network, and giving the prepared data to the neural network.

The pre-trained model may be created by performing machine learning which determines the situation from physical sensing data for learning. For example, a pre-trained model for performing determination with respect to the situation item "cooking" when the value of the situation item "TV" in the virtual sensing data 15 is true (a TV existing in the surrounding of the physical sensor is ON) can be created by performing supervised learning by using, as learning data with a correct answer label, raw data, and/or processed data thereof, of each physical sensing data for leaning which was generated while a person was cooking in the surrounding of the physical sensor. Besides, raw data, and/or processed data thereof, of each physical sensing data for leaning, which was generated while a person was not cooking in the surrounding of the physical sensor, may be used as learning data with an incorrect answer label.

Note that the situation determination unit 322 may not perform the determination using a criterion with respect to a part or all of the situation items included in the virtual sensing data 12. Specifically, with respect to the part or all of the situation items, the situation determination unit 322 may perform the determination, based on virtual sensing data 15 acquired from the virtual sensing data acquisition unit 302.

For example, the situation determination unit 322 may use the value of the virtual sensing data 15 as such, or by converting the value of the virtual sensing data 15, as the value of a specific situation item included in the virtual sensing data 12. In addition, the situation determination unit 322 may perform the determination with respect to the situation item included in the virtual sensing data 12, by supplementing, based on physical sensing data, the corresponding item in the virtual sensing data 15.

FIG. 47 illustrates situation items belonging to a middle item "situation relating to person", items of virtual sensing data 15 (first virtual sensing data) corresponding to the situation items, and physical sensing data which is used for supplementing the items.

FIG. 48 illustrates situation items belonging to a middle item "situation relating to nature", items of virtual sensing data 15 corresponding to the situation items, and physical sensing data which is used for supplementing the items.

FIG. 49 illustrates situation items belonging to a middle item "operational situation of peripheral device", items of virtual sensing data 15 corresponding to the situation items, and physical sensing data which is used for supplementing the items.

FIG. 50 illustrates situation items belonging to a middle item "life situation of person", items of virtual sensing data 15 corresponding to the situation items, and physical sensing data which is used for supplementing the items.

FIG. 51 illustrates situation items belonging to a middle item "situation relating to installation space of physical sensor", items of virtual sensing data 15 corresponding to the situation items, and physical sensing data which is used for supplementing the items.

Hereinafter, referring to FIG. 52 to FIG. 60, the first reliability data generator 330 will further be described.

As illustrated in FIG. 52, the first reliability data generator 330 includes a reliability calculator 331. The reliability calculator 331 receives virtual sensing data 16 from the virtual sensing data acquisition unit 302, and receives a calculation criterion (first calculation criterion) from the calculation criterion acquisition unit 304. Using the calculation criterion, the reliability calculator 331 calculates the reliability of sensing data, based on the virtual sensing data 16, and generates reliability data 13. The reliability calculator 331 sends the reliability data 13 to the data output unit 350.

As described above, the reliability data 13 may indicate, for example, the reliability of physical sensing data with respect to each of factors which influence the reliability of sensing data. Here, each of the factors is called "reliability item". The reliability data 13 may include reliability items of "A. influence by person", "B. influence by noise", "C. influence by operation of peripheral device", "D. influence by installation space of sensor", and "E. intentional variation.". Note that these are merely exemplarily illustrated, and reliability items different from these may be used.

Figure 53:
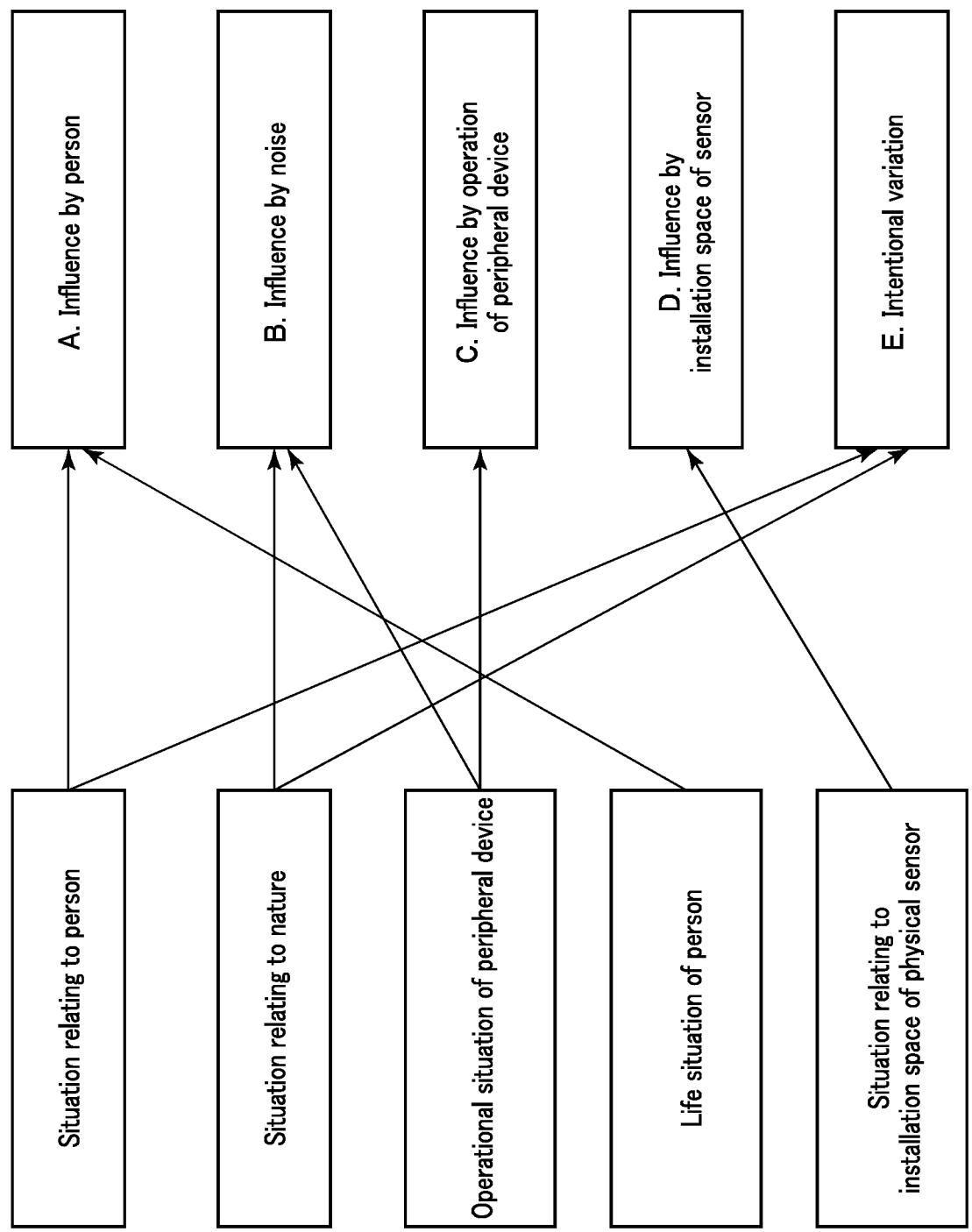
FIG. 53 is a view schematically illustrating a relationship between virtual sensing data and first reliability data.

The reliability calculator 331 estimates to what degree the situation indicated by the virtual sensing data 16 influences each of the factors defined as the reliability items. For example, the relationship between the middle items of the situation items described with reference to FIG. 6 to FIG. 10 and the reliability items of the above-described A to E can be rearranged as illustrated in FIG. 53.

Specifically, the "situation relating to person" relates to the reliability item "A. influence by person" and/or "E. intentional variation". The "situation relating to nature" relates to the reliability item "B. influence by noise" and/or "E. intentional variation". The "operational situation of peripheral device" relates to the reliability item "B. influence by noise" and/or "C. influence by operation of peripheral device". The "life situation of person" relates to the reliability item "A. influence by person". The "situation relating to installation space of physical sensor" relates to the reliability item "D. influence by installation space of sensor". FIG. 54 illustrates which reliability item of which physical sensing data each of the situation items described with reference to FIG. 6 to FIG. 10 relates to. For example, the value of the situation item "air-conditioning" affects the "C. influence by operation of peripheral device" of the physical sensing data "temperature", and affects the "B. influence by noise" of the physical sensing data "atmospheric pressure" and "sound pressure". Note that the relationships of FIG. 53 and FIG. 54 are merely examples, and relationships different from these may be found and utilized.

For example, if the value of a situation item "washing machine" of the virtual sensing data 16 indicates that a washing machine is in the ON state in the surrounding of the physical sensor, the reliability calculator 331 may calculate the reliability of the physical sensing data "sound pressure" with respect to the "B. influence by noise" as being 30%.

For example, if the value of the situation item "air-conditioning" of the virtual sensing data 16 indicates that the air-conditioning is in the ON state, for example, at a set temperature of 30° C., in the surrounding of the physical sensor, the reliability calculator 331 may calculate the reliability of the physical sensing data "temperature" with respect to the "C. influence by operation of peripheral device" as being 70%.

For example, if the value of a situation item "direction of installation" of the virtual sensing data 16 indicates that the sensor is stably installed, the reliability calculator 331 may calculate the reliability of the physical sensing data "illuminance" with respect to the "D. influence by installation space of sensor" as being 100%. On the other hand, if the value of the situation item "direction of installation" of the virtual sensing data 16 indicates that the incidence window of an illuminance sensor faces vertically downward, the reliability calculator 331 may calculate the reliability of the physical sensing data "illuminance" with respect to the "D. influence by installation space of sensor" as being 20%.

For example, if the value of the situation item "direction of installation" of the virtual sensing data 16 indicates that a sound hole of a sound pressure sensor faces a wall, the reliability calculator 331 may calculate the reliability of the physical sensing data "sound pressure" with respect to the "D. influence by installation space of sensor" as being 20%.

For example, if the value of any one of the situation items of the virtual sensing data 16 indicates that a person is breathing upon the sensor, the reliability calculator 331 may calculate the reliability of the physical sensing data "humidity" with respect to the "E. intentional variation" as being 30%. The fact that a person is breathing upon the sensor can be determined, for example, based on the physical sensing data "temperature" and "gas".

For example, if the value of any one of the situation items of the virtual sensing data 16 indicates that the raw data of the physical sensing data "temperature" is constant, the reliability calculator 331 may judge that a temperature sensor is faulty, and may calculate the reliability of the physical sensing data "temperature" with respect to all reliability items as being 0%. The fact that the raw data of the physical sensing data "temperature" is constant can be detected, for example, by comparing a maximum value and a minimum value of the physical sensing data "temperature" within a predetermined period.

As described above, the calculation criterion may include a weighting factor (a contribution rate filter coefficient) which is allocated to each of the situation items included in the virtual sensing data 16. The reliability calculator 331 may perform calculation by using the values of the respective situation items in the virtual sensing data 16 and the weighting factors allocated to the respective situation items, and may calculate the reliability of sensing data, based on the result of the calculation. Specifically, the reliability calculator 331 may calculate a weighted sum by multiplying the value of each situation item by the weighting factor, and may calculate the reliability of sensing data, based on the weighted sum.

As regards the reliability item "A. influence by person", contribution rate filter coefficients are allocated to the related situation items, as exemplarily illustrated in FIG. 55. As regards the reliability item "B. influence by noise", contribution rate filter coefficients are allocated to the related situation items, as exemplarily illustrated in FIG. 56. As regards the reliability item "C. influence by operation of peripheral device", contribution rate filter coefficients are allocated to the related situation items, as exemplarily illustrated in FIG. 57. As regards the reliability item "D. influence by installation space of sensor", contribution rate filter coefficients are allocated to the related situation items, as exemplarily illustrated in FIG. 58.

For example, using the contribution rate filter coefficients illustrated in FIG. 55, the reliability calculator 331 can calculate the reliability of the physical sensing data "temperature" with respect to the "A. influence by person", as exemplarily illustrated in FIG. 59. Specifically, with respect to each of the situation items relating to the "A. influence by person" of the physical sensing data "temperature", the reliability calculator 331 multiplies the value of the virtual sensing data 16 by the contribution rate filter coefficient, and totals multiplication results. Here, the sum of the multiplication results is "0.65", and the reliability calculator 331 calculates the reliability of the physical sensing data "temperature" with respect to the "A. influence by person" as being 35% (=1−0.65). Note that the reliability may be set as a multi-value of 3 or more, such as a probability value, a percentage or a score, as illustrated in FIG. 59, or may be set as a binary value, such as "1 (true)" or "0 (false)", which is indicative of, for example, "reliable/unreliable".

As described above, the calculation criterion may include a pre-trained model. When the calculation criterion includes a pre-trained model, the reliability calculator 331 may calculate the reliability by setting the pre-trained model in a neural network, preparing the value of the virtual sensing data 16, which is set as input data of the neural network, and giving the prepared data to the neural network.

The pre-trained model may be created by performing machine learning which calculates the reliability of sensing data from virtual sensing data for learning. For example, a pre-trained model for performing calculation with respect to a certain reliability item can be created by evaluating, by some means, the reliability with respect to the reliability item of sensing data acquired under a certain situation and creating a correct answer label, and by performing supervised learning by using, as learning data with the correct answer label, virtual sensing data for leaning which is indicative of the situation.

As described above, the reliability calculator 331 calculates the reliability for each reliability item with respect to each physical sensing data. As a result, as exemplarily illustrated in FIG. 60, the reliability data 13 includes values of the reliability items A to E with respect to each physical sensing data. Note that the data structure of FIG. 60 is an example, and it is not necessary that the physical sensing data and the reliability data 13 be combined as a set of data. Further, in addition to the reliability data 13, or in place of the reliability data 13, the reliability data 14 may be combined with the physical sensing data. Besides, the reliability item, which is a target of calculation of reliability, may be different between the physical sensing data.

Hereinafter, referring to FIG. 61 to FIG. 64, the second reliability data generator 340 will further be described.

As illustrated in FIG. 61, the second reliability data generator 340 includes a calculation criterion selector 341 and a reliability calculator 342.

The calculation criterion selector 341 receives the virtual sensing data 17 from the virtual sensing data acquisition unit 302, and receives the calculation criterion (second calculation criterion) from the calculation criterion acquisition unit 304. When a plurality of calculation criteria are determined for a given reliability item, the calculation criterion selector 341 selects one of the calculation criteria, which corresponds to the virtual sensing data 17. The calculation criteria may include, for example, a calculation criterion for a case where air-conditioning is ON in the surrounding of the physical sensor, and a calculation criterion for a case where a TV is ON in the surrounding of the physical sensor.

The reliability calculator 342 receives operating condition data from the operating condition data acquisition unit 305, and receives the selected calculation criterion from the calculation criterion selector 341. Using the selected calculation criterion, the reliability calculator 342 calculates the reliability of sensing data, based on the operating condition data, and generates reliability data 14. The reliability calculator 342 sends the reliability data 14 to the data output unit 350.

As described above, the reliability data 14 may indicate, for example, the reliability of physical sensing data with respect to noise, the physical sensing data being generated by the physical sensor which operates according to the operating condition indicated by the operating condition data (under the situation indicated by the virtual sensing data 17). For example, the reliability data 14 may include the reliability of the physical sensing data "temperature", "atmospheric pressure", "sound pressure" and "vibration" with respect to noise.

For example, it is assumed that the reliability calculator 342 acquired a noise chart illustrated in FIG. 63, as a calculation criterion selected by the calculation criterion selector 341. Here, the noise chart is, for example, a table of criterion values used for calculating the reliability with respect to noise. The criterion value can be designed, for example, by analyzing the characteristics of noise of each physical sensing data generated under a situation (e.g. when air-conditioning is ON in the surrounding of the physical sensor, or when the TV is ON in the surrounding of the physical sensor), the situation (indicated by the virtual sensing data 17) being associated with the calculation criterion. The characteristics of noise may be characteristics, such as a noise frequency, a noise width and variation width, which can be compared with each item of the operating condition data.

The reliability calculator 342 may prepare, as a data chart illustrated in FIG. 62, at least operating condition data whose criterion values are determined in FIG. 63. Here, the data chart is, for example, a table of operating condition data used for calculating the reliability.

The reliability calculator 342 compares the data chart of FIG. 62 and the noise chart of FIG. 63, and obtains a comparison result illustrated in FIG. 64. In FIG. 64, as regards "sampling frequency" and "resolution", "○" is added when a value in a corresponding field of the data chart is equal to or greater than the criterion value determined in the noise chart, and "x" is added when a value in a corresponding field of the data chart is less than the criterion value determined in the noise chart. As regards "precision", "○" is added when a value in a corresponding field of the data chart is equal to or less than the criterion value determined in the noise chart, "x" is added when a value in a corresponding field of the data chart is greater than the criterion value determined in the noise chart, and "-" is added when there is no criterion value determined in the noise chart.

The reliability calculator 342 converts, for example, "○" and "x" to "1 (true)" or "0 (false)", or vice versa, and sets a value of the reliability item by substituting the converted value in a logical expression or a relational expression, which is set as a part of the calculation criterion. The value of the reliability item may be set as a binary value, for example, "1 (true)" or "0 (false)", or as a multi-value of 3 or more, such as a probability value, a percentage or a score.

For example, as regards the physical sensing data "atmospheric pressure" and "sound pressure", since each of the operating condition data of comparison targets is a value within a range determined by the criterion value, the reliability calculator 342 may calculate the reliability with respect to noise as being "100 [%]". On the other hand, as regards the physical sensing data "temperature" and "vibration", since the operating condition data of comparison targets include a value which is out of the range determined by the criterion values, the reliability calculator 342 may calculate the reliabilities with respect to noise as being, for example, "50 [%]" and "30 [%]", respectively. Here, in particular, the reliability of the physical sensing data "vibration" is estimated to be low, since the sampling frequency is 100 [Hz], which is half the noise frequency of 200 [Hz], and there is a possibility that data may not be taken.

As described above, the calculation criterion may include a pre-trained model. When the calculation criterion includes a pre-trained model, the reliability calculator 342 may calculate the reliability by setting the pre-trained model in a neural network, preparing the value of the operating condition data, which is set as input data of the neural network, and giving the prepared data to the neural network.

The pre-trained model may be created by performing machine learning which calculates the reliability of sensing data from operating condition data for learning. For example, a pre-trained model for calculating the reliability of sensing data when the air-conditioning is ON in the surrounding of the physical sensor can be created by evaluating, by some means, the reliability with respect to noise of sensing data acquired by operating the sensor according to various operating conditions under the situation, and creating a correct answer label, and by performing supervised learning by using, as learning data with the correct answer label, operating condition data for leaning which is indicative of the operating condition of the physical sensor that generated the sensing data.

<Others>

A detailed description of the respective functions of the data generating apparatus 200 will be given in operation examples which will be described later. In the present embodiment, examples are described in which all functions of the data generating apparatus 200 are implemented by a general-purpose CPU. However, a part or all of the functions may be implemented by one or more exclusive processors. In addition, as regards the functional configuration of the data generating apparatus 200, omission, replacement and addition of functions may be made as appropriate according to embodiments.

§ 3 Operation Examples

Next, referring to FIG. 65 to FIG. 68, operation examples of the data generating apparatus 200 will be described. Process procedures to be described below are merely examples, and each process may be modified as much as possible. In addition, as regards the process procedures to be described below, omission, replacement and addition of steps may be made as appropriate according to embodiments.

FIG. 65 is a flowchart illustrating an example of the operation of the first virtual sensing data generator 310.

To start with, the physical sensing data acquisition unit 301 acquires physical sensing data, and the criterion acquisition unit 303 acquires a criterion (first criterion) (step S501). The situation determination unit 311 receives the physical sensing data and the criterion, and the process advances to step S502.

In step S502, the situation determination unit 311 selects a non-selected item from among the situation items (e.g. items illustrated in FIG. 6 to FIG. 10) included in the virtual sensing data 11. Note that, depending on a criterion, determination can simultaneously be performed with respect to a plurality of situation items. For example, the criterion may include a pre-trained module that is created by machine learning which simultaneously performs determination with respect to a plurality of situation items. In this case, a plurality of items may be selected in step S502.

The situation determination unit 311 prepares physical sensing data, and processed data thereof, which is necessary for applying a criterion that is determined for the situation item selected in step S502 (here, simply referred to as "selected item") (step S503). Here, the physical sensing data which is necessary for applying the criterion may be, for example, raw data, or processed data thereof, of the physical sensing data for which criterion values included in the criterion are determined, or may be raw data, or processed data thereof, of the physical sensing data which is set as input data of the neural network in which the pre-trained model included in the criterion is set.

The situation determination unit 311 determines whether the situation corresponds to the selected item, by applying the criterion determined for the selected item to the data prepared in step S503 (step S504). To apply the criterion to the data may be to compare the criterion values included in the criterion and the corresponding data, or may be to give data to the neural network in which the pre-trained model included in the criterion is set.

The situation determination unit 311 sets the value of the selected item in the virtual sensing data 11, in accordance with the determination result of step S504 (step S505). If the processes for all situation items are completed at the time point of the end of step S505, the operation of FIG. 65 is terminated, or, if not, the process returns to step S502 (step S506).

Figure 66:
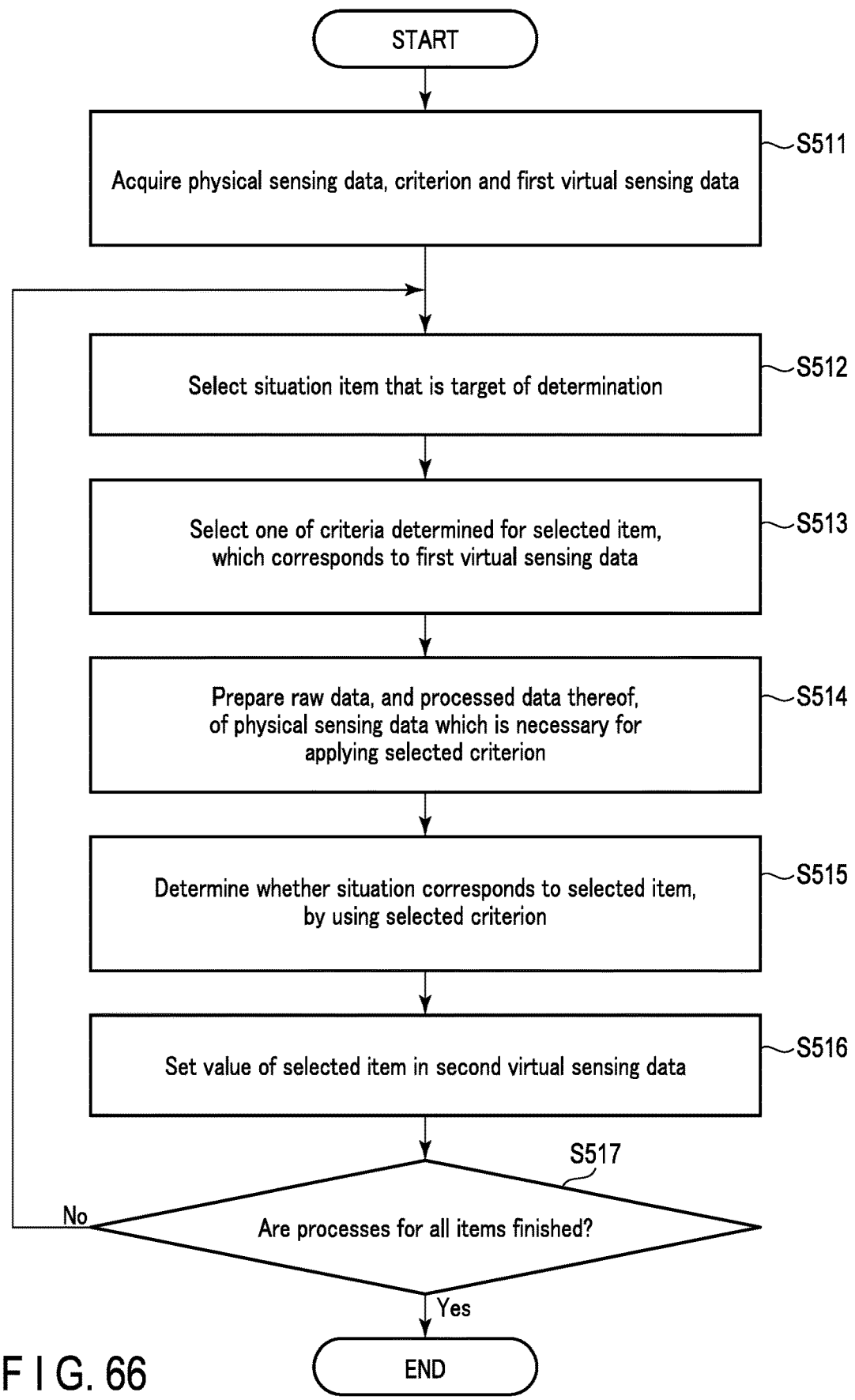
FIG. 66 is a flowchart exemplarily illustrating an operation of the second virtual sensing data generator of FIG. 46.

FIG. 66 is a flowchart illustrating an example of the operation of the second virtual sensing data generator 320.

To start with, the physical sensing data acquisition unit 301 acquires physical sensing data, the virtual sensing data acquisition unit 302 acquires virtual sensing data 15, and the criterion acquisition unit 303 acquires a criterion (second criterion) (step S511). The criterion selector 321 receives the virtual sensing data 15 and the criterion, and the situation determination unit 322 receives the physical sensing data, and the process advances to step S512.

In step S512, the criterion selector 321 selects a non-selected item from among the situation items (e.g. items illustrated in FIG. 6 to FIG. 10) included in the virtual sensing data 12. Note that, depending on a criterion, determination can simultaneously be performed with respect to a plurality of situation items. For example, the criterion may include a pre-trained module that is created by machine learning which simultaneously performs determination with respect to a plurality of situation items. In this case, a plurality of items may be selected in step S512.

When a plurality of criteria are determined for the situation item selected in step S512 (here, simply referred to as "selected item"), the criterion selector 321 selects one of the criteria, which corresponds to the virtual sensing data 15 acquired in step S511 (step S513). Note that when only one criterion is determined for the selected item, step S513 may be skipped.

The situation determination unit 322 prepares raw data, and processed data thereof, of physical sensing data which is necessary for applying the criterion selected in step S513 (step S514). Here, the physical sensing data which is necessary for applying the criterion may be, for example, raw data, or processed data thereof, of the physical sensing data for which criterion values included in the criterion are determined, or may be raw data, or processed data thereof, of the physical sensing data which is set as input data of the neural network in which the pre-trained model included in the criterion is set.

The situation determination unit 322 determines whether the situation corresponds to the selected item, by applying the criterion selected in step S513 to the data prepared in step S514 (step S515). To apply the criterion to the data may be to compare the criterion values included in the criterion and the corresponding data, or may be to give data to the neural network in which the pre-trained model included in the criterion is set.

The situation determination unit 322 sets the value of the selected item in the virtual sensing data 12, in accordance with the determination result of step S515 (step S516). If the processes for all situation items are completed at the time point of the end of step S516, the operation of FIG. 66 is terminated, or, if not, the process returns to step S512 (step S517).

FIG. 67 is a flowchart illustrating an example of the operation of the first reliability data generator 330.

To start with, the virtual sensing data acquisition unit 302 acquires virtual sensing data 16, and the calculation criterion acquisition unit 304 acquires a calculation criterion (first calculation criterion) (step S521). The reliability calculator 331 receives the virtual sensing data 16 and the calculation criterion, and the process advances to step S522.

In step S522, the reliability calculator 331 selects a non-selected item from among the reliability items (e.g. items illustrated in FIG. 53) included in the reliability data 13. Note that, depending on a calculation criterion, determination can simultaneously be performed with respect to a plurality of reliability items. For example, the calculation criterion may include a pre-trained module that is created by machine learning which simultaneously performs reliability calculation with respect to a plurality of reliability items. In this case, a plurality of items may be selected in step S522.

The reliability calculator 331 prepares virtual sensing data 16 (values of a part or all of situation items in virtual sensing data 16) which is necessary for applying the calculation criterion determined for the reliability item (here, simply referred to as "selected item") selected in step S522 (step S523). Here, the virtual sensing data 16 which is necessary for applying the calculation criterion may be, for example, values of the situation item to which weighting factors included in the calculation criterion are allocated, or may be values of the situation item, which are set as input data of the neural network in which the pre-trained model included in the calculation criterion is set.

The reliability calculator 331 calculates the reliability of the sensing data with respect to the selected item, by applying the calculation criterion determined for the selected item to the data prepared in step S523 (step S524). To apply the calculation criterion to the data may be to perform a calculation (e.g. multiplication) by using weighting factors included in the calculation criterion and the values of the corresponding data, and to perform further calculations (e.g. a calculation of a weighted sum, and a subtraction of the weighted sum from the upper-limit value of reliability) for integrating results of the calculation, or may be to give data to the neural network in which the pre-trained model included in the calculation criterion is set.

The reliability calculator 331 sets the value of the selected item in the reliability data 13, in accordance with the calculation result of step S524 (step S525). If the processes for all reliability items are completed at the time point of the end of step S525, the operation of FIG. 67 is terminated, or, if not, the process returns to step S522 (step S526).

Figure 68:
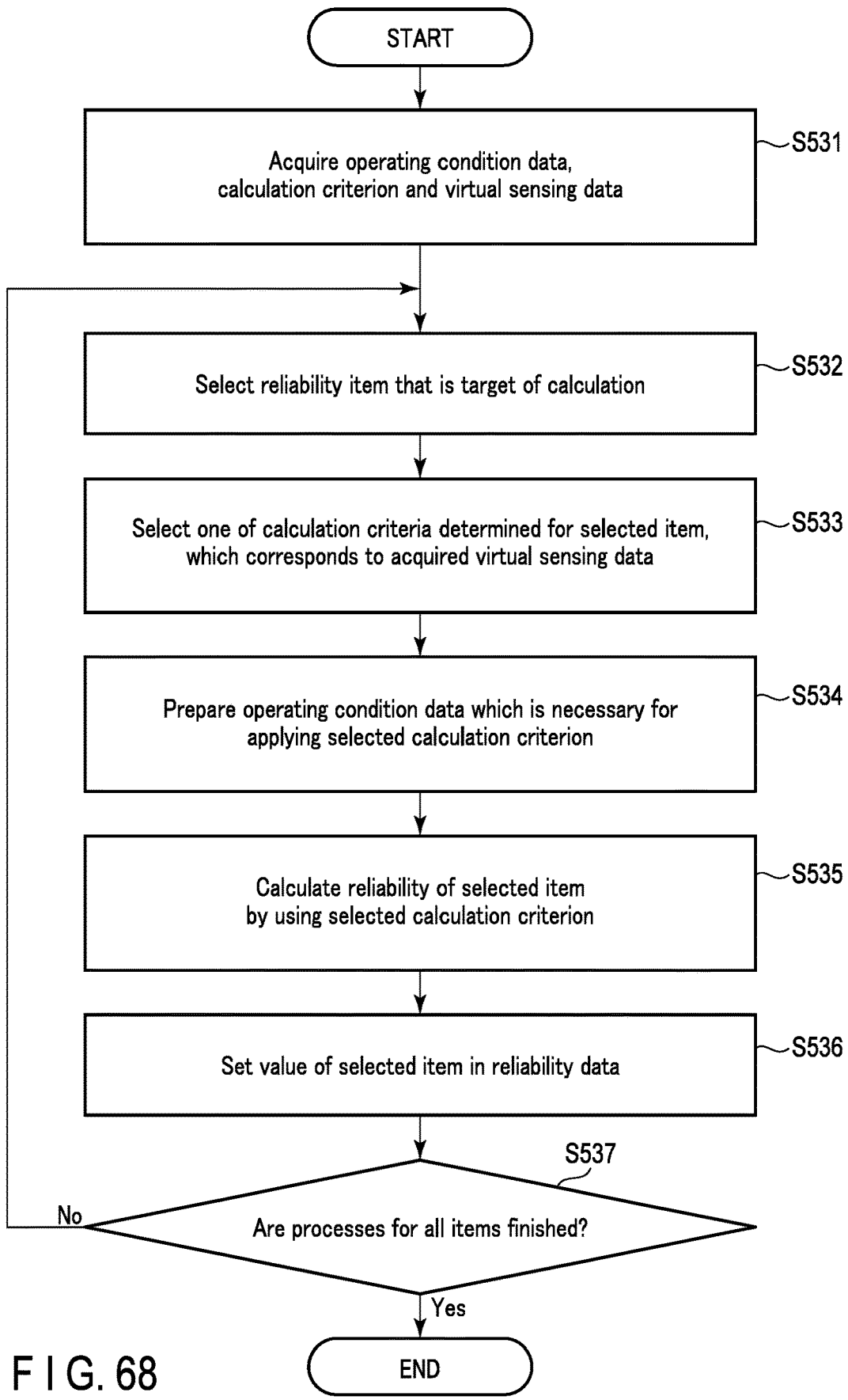
FIG. 68 is a flowchart exemplarily illustrating an operation of the second reliability data generator of FIG. 61.

FIG. 68 is a flowchart illustrating an example of the operation of the second reliability data generator 340.

To start with, the virtual sensing data acquisition unit 302 acquires virtual sensing data 17, the calculation criterion acquisition unit 304 acquires a calculation criterion (second calculation criterion), and the operating condition data acquisition unit 305 acquires operating condition data (step S531). The calculation criterion selector 341 receives the virtual sensing data 17 and the calculation criterion, and the reliability calculator 342 receives the operating condition data, and the process advances to step S532.

In step S532, the calculation criterion selector 341 selects a non-selected item from among the reliability items (e.g. "noise") that is a calculation target of the reliability data 14. Note that, depending on a calculation criterion, determination can simultaneously be performed with respect to a plurality of reliability items. For example, the calculation criterion may include a pre-trained module that is created by machine learning which simultaneously calculates the reliability with respect to a plurality of reliability items. In this case, a plurality of items may be selected in step S512. Note that when one or a plurality of calculation criteria are set for all reliability items, the present step S532 and step S537 (to be described later) may be skipped.

When a plurality of calculation criteria are determined for the reliability item selected in step S532 (here, simply referred to as "selected item"), the calculation criterion selector 341 selects one of the criteria, which corresponds to the virtual sensing data 17 acquired in step S531 (step S533). Note that when only one criterion is determined for the selected item, step S533 may be skipped.

The reliability calculator 342 prepares operating condition data which is necessary for applying the calculation criterion selected in step S533 (step S534). Here, the operating condition data which is necessary for applying the calculation criterion may be, for example, values of the operating condition data for which criterion values included in the calculation criterion are determined, or may be values of the operating condition data, which are set as input data of the neural network in which the pre-trained model included in the calculation criterion is set.

The reliability calculator 342 calculates the reliability of the selected item, by applying the calculation criterion selected in step S533 to the data prepared in step S534 (step S535). To apply the calculation criteria to the data may be to compare the criterion values included in the calculation criterion and the corresponding data, or may be to give data to the neural network in which the pre-trained model included in the calculation criterion is set.

The reliability calculator 342 sets the value of the selected item in the reliability data 14, in accordance with the determination result of step S535 (step S536). If the processes for all reliability items are completed at the time point of the end of step S536, the operation of FIG. 68 is terminated, or, if not, the process returns to step S532 (step S537).

[Operation and Advantageous Effects]

As described above, in the present embodiment, the data generating apparatus determines the situation, based on physical sensing data, by using the criterion. Therefore, according to this data generating apparatus, virtual sensing data, which indicates a determination result with respect to the situation, can be generated.

In addition, the data generating apparatus may select a criterion which is used for performing secondary determination of the situation, based on the first virtual sensing data representing the primary determination result of the situation, which was generated by the data generating apparatus itself or generated by an external apparatus. Thereby, since the criterion, in which the influence of noise, etc. due to the situation indicated by the first virtual sensing data is taken into account, can be used, the situation in the surrounding of the physical sensor can exactly be determined.

Besides, the data generating apparatus may calculate the reliability of sensing data, based on virtual sensing data which is generated by the data generating apparatus itself or generated by an external apparatus. Therefore, according to this data generating apparatus, reliability data can be generated which describes the reliability of sensing data with respect to a factor influencing the reliability of the sensing data, which is recognized from the virtual sensing data.

Further, this data generating apparatus may calculate the reliability of sensing data, based on operating condition data which is indicative of the operating condition of the physical sensor. Therefore, according to this data generating apparatus, reliability data can be generated which describes the reliability of physical sensing data with respect to noise, which is recognized from the operating condition of the physical sensor.

According to this data generating apparatus, virtual sensing data, which complies with a request on the user side, can flexibly be provided. In addition, according to the reliability data provided by the data generating apparatus, filtering, cleansing and normalization of sensing data are performed in accordance with the reliability, and the preprocess for utilizing the sensing data can be facilitated. Therefore, according to the virtual sensing data and/or the reliability data, there is a possibility that the utilization of sensing data on the user side is promoted.

§ 4 Modifications

Although the embodiments of the present disclosure have been described above in detail, the above description is merely an exemplary illustration of the present disclosure in all aspects. Needless to say, various improvements and modifications can be made without departing from the scope of the present disclosure. For example, modifications as described below can be made. In the description below, structural elements similar to those in the above embodiment are denoted by like reference signs, and a description of similar points to the above embodiment is omitted unless where necessary. Modifications described below can be combined as appropriate.

<4.1>

For example, the data generating apparatus 200 may be assembled in a sensing apparatus. FIG. 69 schematically illustrates an example of the functional configuration of the sensing apparatus in which the data generating apparatus 200 is assembled. Note that the hardware configuration of this sensing apparatus may be identical or similar to the configuration example illustrated in FIG. 2.

The sensing apparatus of FIG. 69 includes the data generating apparatus 200, a physical sensor controller 601, an operating condition data memory 602, a physical sensing unit 610, a transmitter 621, a decision criterion and calculation criterion memory 622, and a receiver 623.

The physical sensor controller 601 controls the operation of the physical sensing unit 610. The physical sensor controller 601 may read out, where necessary, operating condition data stored in the operating condition data memory 602, and may control the operation of the physical sensing unit 610, based on the operating condition data.

The operating condition data memory 602 stores operating condition data which is indicative of an operating condition of the physical sensing unit 610. The operating condition data stored in the operating condition data memory 602 is read out, where necessary, by the data generating apparatus 200 (the operating condition data acquisition unit 305 included in the data generating apparatus 200) and the physical sensor controller 601.

The physical sensing unit 610 is controlled by the physical sensor controller 601, measures one kind or a plurality of kinds of physical quantities, and generates physical sensing data indicative of the physical quantities. The physical sensing unit 610 sends the physical sensing data to the transmitter 621 and the data generating apparatus 200.

The physical sensing unit 610 may include, for example, an illuminance sensor 611 which measures illuminance, a sound pressure sensor 612 which measures sound pressure, an acceleration sensor 613 which measures acceleration, a gas sensor 614 which measures gas concentration of VOC, $CO_2$ or the like, and an atmospheric sensor 615 which measures atmospheric pressure. However, the various physical sensors listed here are merely examples, and the physical sensing unit 610 may include a sensor different from these sensors, or may not include a part or all of these sensors.

The transmitter 621 receives the physical sensing data from the physical sensing unit 610, and receives virtual sensing data and/or reliability data from the data generating apparatus 200. The transmitter 621 transmits the physical sensing data, virtual sensing data and/or reliability data to an upper-level communication device or a server, or to an application device. Note that the transmitter 621 may transmit the physical sensing data, virtual sensing data and/or reliability data by combining them, or may separately transmit the physical sensing data, virtual sensing data and/or reliability data. Besides, the transmitter 621 may make different the destinations and/or paths of the physical sensing data, virtual sensing data and/or reliability data.

The decision criterion and calculation criterion memory 622 stores decision criteria and calculation criteria which are used by the data generating apparatus 200. The decision criteria and calculation criteria stored in the decision criterion and calculation criterion memory 622 are read out, where necessary, by the data generating apparatus 200 (the criterion acquisition unit 303 and calculation criterion acquisition unit 304 included in the data generating apparatus 200). The decision criteria and/or calculation criteria may be preset in the decision criterion and calculation criterion memory 622, may be created in the inside of the sensing apparatus of FIG. 69, or may be created by an external apparatus (e.g. a server) and received by the receiver 623. Note that the decision criteria and calculation criteria may be stored in different memories.

The receiver 623 sends the decision criteria and/or calculation criteria, which are created by, for example, the external apparatus (e.g. a server), to the decision criterion and calculation criterion memory 622. The decision criteria and/or calculation criteria are stored in the decision criterion and calculation criterion memory 622. Besides, the receiver 623 may receive virtual sensing data from an external apparatus (e.g. an upper-level communication device or a server), and may send the virtual sensing data to the data generating apparatus 200. The virtual sensing data can also be used, for example, as the virtual sensing data 15, virtual sensing data 16, and/or virtual sensing data 17.

The data generating apparatus 200 acquires the operating condition data from the operating condition data memory 602, acquires the physical sensing data from the physical sensing unit 610, and acquires the decision criteria and calculation criteria from the decision criterion and calculation criterion memory 622. Further, the data generating apparatus 200 may acquire, from the receiver 623, the virtual sensing data generated by an external apparatus. By operating as described above, the data generating apparatus 200 generates a part or all of the virtual sensing data 11, virtual sensing data 12, reliability data 13 and reliability data 14, and sends the generated data to the transmitter 621.

As described above, in the modification <4.1>, the data generating apparatus 200 according to the embodiment is assembled in the sensing apparatus. Therefore, according to this modification, there can be provided an intelligent sensing apparatus which generates virtual sensing data and/or reliability data, in addition to physical sensing data. Furthermore, according to this modification, the data generating apparatus 200 can be realized by utilizing hardware resources such as a processor and a memory of the sensing apparatus.

<4.2>

For example, the data generating apparatus 200 may be assembled in a communication device. FIG. 70 schematically illustrates an example of the functional configuration of the communication device in which the data generating apparatus 200 is assembled. Note that the hardware configuration of this communication device may be identical or similar to the configuration example illustrated in FIG. 2.

The communication device of FIG. 70 may be, for example, a smartphone or any kind of PC. This communication device includes the data generating apparatus 200, a receiver 701, a decision criterion and calculation criterion memory 702, and a transmitter 703.

The receiver 701 receives physical sensing data from an external apparatus (e.g. a sensing apparatus), and sends the physical sensing data to the data generating apparatus 200 and transmitter 703. In addition, the receiver 701 may receive virtual sensing data from an external apparatus (e.g. an upper-level communication device or a server), and may send the virtual sensing data to the data generating apparatus 200. The virtual sensing data can also be used, for example, as the virtual sensing data 15, virtual sensing data 16, and/or virtual sensing data 17. Similarly, the receiver 701 may receive decision criteria and calculation criteria from an external apparatus (e.g. a server), and may send the decision criteria and calculation criteria to the decision criterion and calculation criterion memory 702. The decision criteria and/or calculation criteria are stored in the decision criterion and calculation criterion memory 702. Further, the receiver 701 may receive operating condition data from an external apparatus (e.g. a sensing apparatus), and may send the operating condition data to the data generating apparatus 200.

The decision criterion and calculation criterion memory 702 stores decision criteria and calculation criteria which are used by the data generating apparatus 200. The decision criteria and calculation criteria stored in the decision criterion and calculation criterion memory 702 are read out, where necessary, by the data generating apparatus 200 (the criterion acquisition unit 303 and calculation criterion acquisition unit 304 included in the data generating apparatus 200). The decision criteria and/or calculation criteria may be preset in the decision criterion and calculation criterion memory 702, may be created in the inside of the communication device of FIG. 70, or may be created by an external apparatus (e.g. a server) and received by the receiver 701. Note that the decision criteria and calculation criteria may be stored in different memories.

The transmitter 703 receives physical sensing data from the receiver 701, and receives virtual sensing data and/or reliability data from the data generating apparatus 200. The transmitter 703 transmits the physical sensing data, virtual sensing data and/or reliability data to an upper-level communication device or a server, or to an application device. Note that the transmitter 703 may transmit the physical sensing data, virtual sensing data, and/or reliability data by combining them, or may separately transmit the physical sensing data, virtual sensing data, and/or reliability data. Besides, the transmitter 703 may make different the destinations and/or paths of the physical sensing data, virtual sensing data, and/or reliability data.

The data generating apparatus 200 acquires the physical sensing data and the operating condition data from the receiver 701, and receives the decision criteria and calculation criteria from the decision criterion and calculation criterion memory 702. Further, the data generating apparatus 200 may acquire, from the receiver 701, the virtual sensing data generated by an external apparatus. By operating as described above, the data generating apparatus 200 generates a part or all of the virtual sensing data 11, virtual sensing data 12, reliability data 13 and reliability data 14, and sends the generated data to the transmitter 703.

As described above, in the modification <4.2>, the data generating apparatus 200 according to the embodiment is assembled in the communication device. Therefore, according to this modification, even when the sensing apparatus is unable to generate at least a part of the above-described virtual sensing data 11, virtual sensing data 12, reliability data 13 and reliability data 14, necessary virtual sensing data and/or reliability data can be supplemented. In addition, according to this modification, the data generating apparatus 200 can be realized by utilizing hardware resources such as a processor and a memory of the communication device.

<4.3>

For example, the data generating apparatus 200 may be assembled in a server. FIG. 71 schematically illustrates an example of the functional configuration of the server in which the data generating apparatus 200 is assembled. Note that the hardware configuration of this server may be identical or similar to the configuration example illustrated in FIG. 2.

The server of FIG. 71 includes the data generating apparatus 200, a receiver 801, a decision criterion and calculation criterion memory 802, a virtual sensing data and reliability data memory 803, a physical sensing data memory 804, a supplier-side data catalogue memory 805, a user-side data catalogue memory 806, a matching unit 807, a data management unit 808, and a transmitter 809.

The receiver 801 receives physical sensing data from an external apparatus (e.g. a sensing apparatus), and sends the physical sensing data to the data generating apparatus 200 and physical sensing data memory 804. In addition, the receiver 801 may receive virtual sensing data from the external apparatus, and may send the virtual sensing data to the data generating apparatus 200. The virtual sensing data can also be used, for example, as the virtual sensing data 15, virtual sensing data 16, and/or virtual sensing data 17. Similarly, the receiver 801 may receive decision criteria and calculation criteria from the external apparatus, and may send the decision criteria and calculation criteria to the decision criterion and calculation criterion memory 802. The decision criteria and/or calculation criteria are stored in the decision criterion and calculation criterion memory 802. Further, the receiver 801 may receive operating condition data from the external apparatus (e.g. a sensing apparatus), and may send the operating condition data to the data generating apparatus 200.

The receiver 801 may receive a supplier-side data catalogue, which is used for matching, from an external apparatus (e.g. a communication device), and may send the supplier-side data catalogue to the supplier-side data catalogue memory 805. The supplier-side data catalogue is stored in the supplier-side data catalogue memory 805. Similarly, the receiver 801 may receive a user-side data catalogue, which is used for matching, from an external apparatus (e.g. an application device), and may send the user-side data catalogue to the user-side data catalogue memory 806. The user-side data catalogue is stored in the user-side data catalogue memory 806.

The decision criterion and calculation criterion memory 802 stores decision criteria and calculation criteria which are used by the data generating apparatus 200. The decision criteria and calculation criteria stored in the decision criterion and calculation criterion memory 802 are read out, where necessary, by the data generating apparatus 200 (the criterion acquisition unit 303 and calculation criterion acquisition unit 304 included in the data generating apparatus 200). The decision criteria and/or calculation criteria may be preset in the decision criterion and calculation criterion memory 802, may be created in the inside of the server of FIG. 71, or may be created by an external apparatus and received by the receiver 801. Note that the decision criteria and calculation criteria may be stored in different memories.

The virtual sensing data and reliability data memory 803 stores virtual sensing data and/or reliability data which is generated by the data generating apparatus 200. The virtual sensing data and/or reliability data stored in the virtual sensing data and reliability data memory 803 is read out, where necessary, by the data management unit 808.

The physical sensing data memory 804 stores physical sensing data which is received by the receiver 801. The physical sensing data stored in the physical sensing data memory 804 is read out, where necessary, by the data management unit 808.

The supplier-side data catalogue memory 805 stores, for example, a supplier-side data catalogue which is received by the receiver 801 or is directly input. The supplier-side data catalogue stored in the supplier-side data catalogue memory 805 is read out, where necessary, by the matching unit 807.

The user-side data catalogue memory 806 stores, for example, a user-side data catalogue which is received by the receiver 801 or is directly input. The user-side data catalogue stored in the user-side data catalogue memory 806 is read out, where necessary, by the matching unit 807.

The matching unit 807 reads the supplier-side data catalogue from the supplier-side data catalogue memory 805, and reads the user-side data catalogue from the user-side data catalogue memory 806. The matching unit 807 performs buying-and-selling matching between the supplier-side data catalogue and the user-side data catalogue. For example, the matching unit 807 compares at least a part of items included in the user-side data catalogue and a corresponding item included in the supplier-side data catalogue, and extracts a supplier-side data catalogue which complies with the request of the user side. When buying-and-selling matching is established, the matching unit 807 informs the data management unit 808 to that effect. Note that when a supplier-side data catalogue which complies with the request of the user side was found, the matching unit 807 may inform the data management unit 808 of the establishment of the buying-and-selling matching after obtaining an approval of data buying-and-selling by the user side and/or the supplier side.

Upon being informed of the establishment of the buying-and-selling matching by the matching unit 807, the data management unit 808 reads out the supplier-side's physical sensing data, virtual sensing data, and/or reliability data from the physical sensing data memory 804 and/or the virtual sensing data and reliability data memory 803, and sends the read-out data to the transmitter 809.

The transmitter 809 receives the physical sensing data, virtual sensing data, and/or reliability data from the data management unit 808, and transmits the data to the application device. Note that the transmitter 809 may transmit the physical sensing data, virtual sensing data, and/or reliability data by combining them, or may separately transmit the physical sensing data, virtual sensing data, and/or reliability data. Besides, the transmitter 809 may make different the destinations and/or paths of the physical sensing data, virtual sensing data, and/or reliability data.

The data generating apparatus 200 acquires the physical sensing data and the operating condition data from the receiver 801, and receives the decision criteria and calculation criteria from the decision criterion and calculation criterion memory 802. Further, the data generating apparatus 200 may acquire, from the receiver 801, the virtual sensing data generated by an external apparatus. By operating as described above, the data generating apparatus 200 generates a part or all of the virtual sensing data 11, virtual sensing data 12, reliability data 13 and reliability data 14, and sends the generated data to the virtual sensing data and reliability data memory 803. The virtual sensing data and/or the reliability data is stored in the virtual sensing data and reliability data memory 803.

As described above, in the modification <4.3>, the data generating apparatus 200 according to the embodiment is assembled in the server. Therefore, according to this modification, even when a lower-level apparatus, such as a sensing apparatus, is unable to generate at least a part of the above-described virtual sensing data 11, virtual sensing data 12, reliability data 13 and reliability data 14, necessary virtual sensing data and/or reliability data can be supplemented. In addition, according to this modification, the data generating apparatus 200 can be realized by utilizing hardware resources such as a processor and a memory of the server.

Note that the server according to the modification <4.3> may not directly perform buying-and-selling matching, and may entrust buying-and-selling matching to a matching server (not shown). Alternatively, buying-and-selling matching may not be performed. In these cases, the structural elements relating to the buying-and-selling matching, for instance, the supplier-side data catalogue memory 805, user-side data catalogue memory 806 and matching unit 807, can be omitted.

<4.4>

For example, the data generating apparatus 200 may be assembled in an application device. The functional configuration of the application device may correspond to, for example, a configuration in which the transmitter 703 in the communication device illustrated in FIG. 70 is replaced with a structural element for utilizing physical sensing data, virtual sensing data, and/or reliability data.

According to the application device relating to the modification <4.4>, even when data, which does not include at least a part of the above-described virtual sensing data 11, virtual sensing data 12, reliability data 13 and reliability data 14, is supplied, necessary virtual sensing data and/or reliability data can be supplemented and utilized. In addition, according to this modification, the data generating apparatus 200 can be realized by utilizing hardware resources such as a processor and a memory of the application device.

<4.5>

The virtual sensing data 11 and/or the virtual sensing data 12 can also be treated as metadata indicative of a measurement environment of physical sensing data and/or virtual sensing data. By using the metadata, a preprocess for utilizing the physical sensing data and/or virtual sensing data can be facilitated. In addition, by utilizing the metadata, the rearrangement of physical sensing data and/or virtual sensing data, for example, the generation of a table, becomes easier. Furthermore, by utilizing the metadata, the detection of an event is enabled.

<4.6>

In the description of the embodiment, the example was introduced in which the determination of the situation and/or the calculation of reliability is calculated by using the neural network in which a pre-trained model is set. In an approach using such AI (Artificial Intelligence), it is also possible to utilize a causal relationship model, a decision tree, a support vector machine (SVM), etc.

However, all embodiments described above are merely exemplary illustrations of the present disclosure in all aspects. Needless to say, various improvements and modifications can be made without departing from the scope of the present disclosure. Specifically, in implementing the present disclosure, concrete configurations corresponding to embodiments may be adopted as appropriate. Note that the data appearing in each embodiment is described by natural language, the data is designated by, to be more specific, pseudo-language, commands, parameters, machine language, etc., which computers can recognize.

A part or all of the above-described embodiments can be described as illustrated below, as well as described in the patent claims, but the embodiments are not limited to these.

A data generating apparatus including:

a first acquisition unit (101) configured to acquire physical sensing data acquired by a physical sensor observing a sensing target;

a second acquisition unit (102) configured to acquire first virtual sensing data representative of a first determination result with respect to a situation in a surrounding of the physical sensor;

a third acquisition unit (103) configured to acquire a plurality of criteria determined for situation items which are determination targets;

a first selector (111) configured to select one of the acquired criteria, which corresponds to the first virtual sensing data; and a determination unit (112) configured to determine the situation in the surrounding of the physical sensor with respect to each of the situation items, based on the acquired physical sensing data, by using the selected criterion, and to generate second virtual sensing data representative of a second determination result with respect to the situation.

REFERENCE SIGNS LIST 11, 12, 15, 16, 17 . . . Virtual sensing data
13, 14 . . . Reliability data
100, 200 . . . Data generating apparatus
101, 301 . . . Physical sensing data acquisition unit
102, 302 . . . Virtual sensing data acquisition unit
103, 303 . . . Criterion acquisition unit
111, 321 . . . Criterion selector
112, 311, 322 . . . Situation determination unit
211 . . . Controller
212 . . . Memory
213 . . . Communication interface
214 . . . Input device
215 . . . Output device
216 . . . External interface
217 . . . Drive
218 . . . Storage medium
304 . . . Calculation criterion acquisition unit
305 . . . Operating condition data acquisition unit
310 . . . First virtual sensing data generator
320 . . . Second virtual sensing data generator
330 . . . First reliability data generator
331, 342 . . . Reliability calculator
340 . . . Second reliability data generator
341 . . . Calculation criterion selector
350 . . . Data output unit
400 . . . Sensing apparatus
410 . . . Communication device
420 . . . Server
430 . . . Application device
601 . . . Physical sensor controller
602 . . . Operating condition data memory
610 . . . Physical sensing unit
611 . . . Illuminance sensor
612 . . . Sound pressure sensor
613 . . . Acceleration sensor
614 . . . Gas sensor
615 . . . Atmospheric pressure sensor
621, 703, 809 . . . Transmitter
622, 702, 802 . . . Decision criterion and calculation criterion memory
623, 701, 801 . . . Receiver
803 . . . Virtual sensing data and reliability data memory
804 . . . Physical sensing data memory
805 . . . Supplier-side DC memory
806 . . . User-side DC memory
807 . . . Matching unit
808 . . . Data management unit

The invention claimed is:

1. A data generating apparatus comprising a processor configured with a program to perform operations comprising:

acquiring physical sensing data acquired by a physical sensor observing a sensing target;

acquiring first virtual sensing data representative of a first determination result with respect to a situation surrounding the physical sensor, the first virtual sensing data including at least one of values of situation items, the situation items being items for segmentalizing and describing the situation;

acquiring third virtual sensing data representative of a third determination result with respect to the situation surrounding the physical sensor;

calculating a reliability of sensing data, based on the acquired third virtual sensing data, by using an acquired first calculation criterion, and generating first reliability data;

acquiring a plurality of criteria determined for situation items which are determination targets;

selecting one of the acquired criteria, which corresponds to the first virtual sensing data; and determining the situation surrounding the physical sensor with respect to each of the situation items, based on the acquired physical sensing data, by using the selected criterion, and to generate second virtual sensing data representative of a second determination result with respect to the situation.

2. The apparatus according to claim 1, wherein the criterion includes a criterion value for at least one of raw data, and processed data thereof, of the physical sensing data.

3. The apparatus according to claim 1, wherein the criterion includes a pre-trained model created by performing machine learning that determines the situation from physical sensing data for learning, which is generated under the situation indicated by the first virtual sensing data associated with the criterion.

4. The apparatus according to claim 1, wherein the first reliability data is indicative of the reliability with respect to at least one of factors influencing the reliability.

5. The apparatus according to claim 1, wherein
the first calculation criterion includes at least one of weighting factors which are allocated to situation items included in the third virtual sensing data, and
the processor is configured with the program to perform operations such that calculating a reliability of sensing data, based on the acquired third virtual sensing data comprises calculating the reliability of the sensing data by using at least one of values of situation items in the third virtual sensing data and at least one of the weighting factors allocated to the situation items, and calculating the reliability, based on a result of the calculation.

6. The apparatus according to claim 1, wherein the first calculation criterion includes a pre-trained model created by performing machine learning which calculates, from virtual sensing data for learning, a reliability of sensing data generated under a situation indicated by the virtual sensing data for learning.

7. The apparatus according to claim 1, wherein the processor is configured with the program to perform operations:

such that acquiring first virtual sensing data further comprises acquiring fourth virtual sensing data representative of a fourth determination result with respect to the situation surrounding the physical sensor;

such that acquiring the first calculation criterion further comprises acquiring a plurality of second calculation criteria;

further comprising:

acquiring operating condition data indicative of an operating condition of the physical sensor;

selecting one of the second calculation criteria, which corresponds to the fourth virtual sensing data; and calculating the reliability, based on the acquired operating condition data, by using the selected second calculation criterion, and to generate second reliability data.

8. The apparatus according to claim 7, wherein the second reliability data is indicative of the reliability of the physical sensing data with respect to noise, the physical sensing data being generated by a physical sensor which operates according to an operating condition indicated by the operating condition data under a situation indicated by the fourth virtual sensing data.

9. The apparatus according to claim 7, wherein the second calculation criterion includes a criterion value for at least one of operating conditions indicated by the operating condition data.

10. The apparatus according to claim 7, wherein the second calculation criterion includes a pre-trained model created by performing machine learning which calculates, from operating condition data for learning, a reliability of sensing data generated by a physical sensor complying with an operating condition indicated by the operating condition data for learning.

11. A sensing apparatus comprising:
the apparatus according to claim 1; and the physical sensor.

12. A data generating method comprising:
acquiring, by a computer, physical sensing data acquired by a physical sensor observing a sensing target;
acquiring, by the computer, first virtual sensing data representative of a first determination result with respect to a situation surrounding the physical sensor, the first virtual sensing data including at least one of values of situation items, the situation items being items for segmentalizing and describing the situation;
acquiring, by the computer, third virtual sensing data representative of a third determination result with respect to the situation surrounding the physical sensor;
calculating, by the computer, a reliability of sensing data, based on the acquired third virtual sensing data, by using an acquired first calculation criterion, and generating first reliability data;
acquiring, by the computer, a plurality of criteria determined for situation items which are determination targets;
selecting, by the computer, one of the acquired criteria, which corresponds to the first virtual sensing data; and
determining, by the computer, the situation surrounding the physical sensor with respect to each of the situation items, based on the acquired physical sensing data, by using the selected criterion, and generating second virtual sensing data representative of a second determination result with respect to the situation.

13. A non-transitory computer readable medium storing a computer program which is executed by a computer to provide the steps of:
acquiring physical sensing data acquired by a physical sensor observing a sensing target;
acquiring first virtual sensing data representative of a first determination result with respect to a situation surrounding the physical sensor, the first virtual sensing data including at least one of values of situation items, the situation items being items for segmentalizing and describing the situation;
acquiring third virtual sensing data representative of a third determination result with respect to the situation surrounding the physical sensor;

calculating a reliability of sensing data, based on the acquired third virtual sensing data, by using an acquired first calculation criterion, and generating first reliability data;
acquiring a plurality of criteria determined for situation items which are determination targets;
selecting one of the acquired criteria, which corresponds to the first virtual sensing data; and
determining the situation surrounding the physical sensor with respect to each of the situation items, based on the acquired physical sensing data, by using the selected criterion, and generating second virtual sensing data representative of a second determination result with respect to the situation.

14. The apparatus according to claim 2, wherein the processor is configured with the program to perform operations:
such that acquiring first virtual sensing data further comprises acquiring third virtual sensing data representative of a third determination result with respect to the situation surrounding the physical sensor;
further comprising:
acquiring a first calculation criterion; and
calculating a reliability of sensing data, based on the acquired third virtual sensing data, by using the acquired first calculation criterion, and to generate first reliability data.

15. The apparatus according to claim 3, wherein the processor is configured with the program to perform operations:
such that acquiring first virtual sensing data further comprises acquiring third virtual sensing data representative of a third determination result with respect to the situation surrounding the physical sensor;
further comprising:
acquiring a first calculation criterion; and
calculating a reliability of sensing data, based on the acquired third virtual sensing data, by using the acquired first calculation criterion, and to generate first reliability data.

16. The apparatus according to claim 4, wherein
the first calculation criterion includes at least one of weighting factors which are allocated to situation items included in the third virtual sensing data, and
the processor is configured with the program to perform operations such that calculating the reliability of sensing data, based on the acquired third virtual sensing data comprises calculating the reliability of the sensing data by using at least one of values of situation items in the third virtual sensing data and at least one of the weighting factors allocated to the situation items, and calculates the reliability, based on a result of the calculation.

17. The apparatus according to claim 4, wherein the first calculation criterion includes a pre-trained model created by performing machine learning which calculates, from virtual sensing data for learning, a reliability of sensing data generated under a situation indicated by the virtual sensing data for learning.

18. The apparatus according to claim 4, wherein the processor is configured with the program to perform operations:
such that acquiring first virtual sensing data further comprises acquiring fourth virtual sensing data representative of a fourth determination result with respect to the situation surrounding the physical sensor;

such that acquiring the first calculation criterion further comprises acquiring a plurality of second calculation criteria;

further comprising:

acquiring operating condition data indicative of an operating condition of the physical sensor;

selecting one of the second calculation criteria, which corresponds to the fourth virtual sensing data; and calculating the reliability, based on the acquired operating condition data, by using the selected second calculation criterion, and to generate second reliability data.

19. The apparatus according to claim 8, wherein the second calculation criterion includes a criterion value for at least one of operating conditions indicated by the operating condition data.

20. A data generating apparatus comprising a processor configured with a program to perform operations comprising:

acquiring physical sensing data acquired by a physical sensor observing a sensing target;

acquiring first virtual sensing data representative of a first determination result with respect to a situation surrounding the physical sensor;

acquiring a plurality of criteria determined for situation items which are determination targets;

selecting one of the acquired criteria, which corresponds to the first virtual sensing data; and determining the situation surrounding the physical sensor with respect to each of the situation items, based on the acquired physical sensing data, by using the selected criterion, and to generate second virtual sensing data representative of a second determination result with respect to the situation, wherein the processor is configured with the program to perform operations:

such that acquiring first virtual sensing data further comprises acquiring third virtual sensing data representative of a third determination result with respect to the situation surrounding the physical sensor; and further comprising:

acquiring a first calculation criterion; and calculating a reliability of sensing data, based on the acquired third virtual sensing data, by using the acquired first calculation criterion, and to generate first reliability data.

\* \* \* \* \*